(12) United States Patent
Nakai et al.

(10) Patent No.: US 8,009,248 B2
(45) Date of Patent: Aug. 30, 2011

(54) LIQUID CRYSTAL DISPLAY AND TELEVISION RECEIVER

(75) Inventors: Nobuhiko Nakai, Tsu (JP); Mitsuaki Hirata, Taki-gun (JP); Mitsuhiro Shigeta, Uji (JP); Naoshi Yamada, Tsu (JP); Toshihide Tsubata, Tsu (JP); Shigeaki Mizushima, Ikoma (JP); Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 204 days.

(21) Appl. No.: 11/990,072

(22) PCT Filed: Sep. 27, 2006

(86) PCT No.: PCT/JP2006/319203
§ 371 (c)(1),
(2), (4) Date: Feb. 6, 2008

(87) PCT Pub. No.: WO2007/040127
PCT Pub. Date: Apr. 12, 2007

(65) Prior Publication Data
US 2009/0147186 A1 Jun. 11, 2009

(30) Foreign Application Priority Data
Sep. 30, 2005 (JP) ................. 2005-289427

(51) Int. Cl.
*G02F 1/13471* (2006.01)
(52) U.S. Cl. ................. 349/74; 349/89; 349/117
(58) Field of Classification Search .............. 349/74, 349/89, 117, 123; 359/494, 690
See application file for complete search history.

(56) References Cited

U.S. PATENT DOCUMENTS

| | | | |
|---|---|---|---|
| 5,070,326 | A | 12/1991 | Yoshimoto et al. |
| 5,091,784 | A | 2/1992 | Someya et al. |
| 5,216,414 | A | 6/1993 | Fukutani et al. |
| 5,250,932 | A | 10/1993 | Yoshimoto et al. |
| 5,303,073 | A | 4/1994 | Shirota et al. |
| 6,512,564 | B1 | 1/2003 | Yoshida et al. |
| 6,661,488 | B1 | 12/2003 | Takeda et al. |
| 6,724,452 | B1 | 4/2004 | Takeda et al. |
| 6,906,762 | B1 | 6/2005 | Witehira et al. |
| 7,167,224 | B1 | 1/2007 | Takeda et al. |
| 7,224,421 | B1 | 5/2007 | Takeda et al. |

(Continued)

FOREIGN PATENT DOCUMENTS

JP  63-25629  2/1988

(Continued)

OTHER PUBLICATIONS

International Search Report mailed Dec. 12, 2006.

(Continued)

*Primary Examiner* — Akm E Ullah
(74) *Attorney, Agent, or Firm* — Nixon & Vanderhye P.C.

(57) ABSTRACT

A liquid crystal display of the present invention contains a first panel and a second panel being stacked. Adjacent pairs of polarizers (A to C) disposed on the panels form crossed Nicols. When the first panel produces a display according to a first display signal, the second panel produces a display according to a second display signal obtained from the first display signal. Each of the two joined panels is provided with a light diffusion layer having a light diffusing property. The provision of the light diffusion layers enables reducing moire pattern occurrences which would otherwise markedly increase when two liquid crystal panels are stacked. As a result, the liquid crystal display has high display quality.

32 Claims, 47 Drawing Sheets

U.S. PATENT DOCUMENTS

| | | |
|---|---|---|
| 7,227,606 B2 | 6/2007 | Takeda et al. |
| 7,253,861 B2 * | 8/2007 | Niiyama et al. ............... 349/123 |
| 7,304,703 B1 | 12/2007 | Takeda et al. |
| 2004/0119924 A1 | 6/2004 | Takeda et al. |
| 2004/0183972 A1 | 9/2004 | Bell |
| 2004/0239866 A1 | 12/2004 | Sasabayashi et al. |
| 2004/0252257 A1 | 12/2004 | Wen et al. |
| 2005/0041179 A1 | 2/2005 | Suzuki |
| 2006/0125745 A1 | 6/2006 | Evanicky |
| 2006/0290594 A1 | 12/2006 | Engel et al. |
| 2007/0064187 A1 | 3/2007 | Takeda et al. |
| 2008/0165314 A1 | 7/2008 | Takeda et al. |
| 2008/0303995 A1 * | 12/2008 | Shimodaira et al. .......... 349/117 |
| 2008/0303997 A1 | 12/2008 | Takeda et al. |
| 2009/0046212 A1 | 2/2009 | Tsubata et al. |
| 2009/0051707 A1 * | 2/2009 | Hirata et al. .................. 345/690 |
| 2009/0109351 A1 | 4/2009 | Shiomi |
| 2009/0153780 A1 | 6/2009 | Takata |
| 2009/0273743 A1 | 11/2009 | Sawabe et al. |
| 2010/0033655 A1 | 2/2010 | Nakamoto |

FOREIGN PATENT DOCUMENTS

| | | |
|---|---|---|
| JP | 64-49021 | 2/1989 |
| JP | 01-222586 A | 9/1989 |
| JP | 10222576 A | 9/1989 |
| JP | 1-277215 | 11/1989 |
| JP | 1-309024 A | 12/1989 |
| JP | 2-23 | 1/1990 |
| JP | 2-253231 A | 10/1990 |
| JP | 3-94589 A | 4/1991 |
| JP | 4-97134 A | 3/1992 |
| JP | 4-79330 U | 7/1992 |
| JP | 5-2194 | 1/1993 |
| JP | 5-88197 | 4/1993 |
| JP | 5-88197 A | 4/1993 |
| JP | 2005-31552 A | 4/1993 |
| JP | 5-142519 A | 6/1993 |
| JP | 5-257124 A | 10/1993 |
| JP | 06-43516 A | 2/1994 |
| JP | 06-110076 A | 4/1994 |
| JP | 6-186583 A | 7/1994 |
| JP | 6-306266 A | 11/1994 |
| JP | 8-76139 A | 3/1996 |
| JP | 8-292429 A | 11/1996 |
| JP | 8-305301 A | 11/1996 |
| JP | 9-005773 A | 1/1997 |
| JP | 10-254376 A | 9/1998 |
| JP | 11-167106 | 6/1999 |
| JP | 11-167106 A | 6/1999 |
| JP | 11-271709 A | 10/1999 |
| JP | 2001-0083523 A | 3/2001 |
| JP | 2001-188120 | 7/2001 |
| JP | 2001-188120 A | 7/2001 |
| JP | 2002-504764 A | 2/2002 |
| JP | 2002-90536 | 3/2002 |
| JP | 2002-90536 A | 3/2002 |
| JP | 2002-528743 A | 9/2002 |
| JP | 2003-20255 A | 1/2003 |
| JP | 2003-40649 A | 2/2003 |
| JP | 2003-149730 A | 5/2003 |
| JP | 2003-195343 A | 7/2003 |
| JP | 2003-279963 A | 10/2003 |
| JP | 2004-13121 A | 1/2004 |
| JP | 3523239 B2 | 2/2004 |
| JP | 3524540 B2 | 2/2004 |
| JP | 2004-301878 A | 10/2004 |
| JP | 2004-309553 A | 11/2004 |
| JP | 2004-357253 A | 12/2004 |
| JP | 2005-164692 A | 6/2005 |
| JP | 2005-533275 A | 11/2005 |

OTHER PUBLICATIONS

U.S. Appl. No. 12/449,992, filed Sep. 4, 2009, entitled "Display Apparatus, Driving Apparatus of Display Apparatus, and Electronic Device".

International Search Report mailed Mar. 4, 2008 in PCT application PCT/JP2008/050910.

International Search Report mailed Oct. 24, 2006 in PCT application PCT/JP2006/319501.

* cited by examiner

Viewing Angle vs. Contrast Transmittance [Azimuth = 45° (550 nm)]

Nicol Angle vs. Cross Transmittance (Ideal Polarizer)

FIG. 17

Result 1 (Left) 37-inch WXGA / (Right) 37-inch Full HD

| Layer C: Haze 0 %, Exp. Sys. Fig. 18 | Layer A: Haze Value (%) | | | | | |
|---|---|---|---|---|---|---|
| | 0 | 36 | 43 | 50 | 56 | 72 |
| Layer B: Haze Value (%) 0 | F/F | F/F | F/F | C/C | A/C | A/A |
| 36 | F/n.a. | C/n.a. | C/n.a. | C/n.a. | A/C | A/A |
| 43 | F/n.a. | C/n.a. | C/n.a. | C/n.a. | A/C | A/A |
| 50 | F/n.a. | C/n.a. | C/n.a. | B/n.a. | A/B | A/A |
| 56 | C/n.a. | C/n.a. | B/n.a. | B/n.a. | A/A | A/A |
| 64 | C/n.a. | B/n.a. | B/n.a. | B/n.a. | A/A | A/A |
| 72 | C/n.a. | B/n.a. | B/n.a. | B/n.a. | A/A | A/A |

Result 2: 37-inch Full HD

| Haze of layer A | Haze of layer B | Haze of layer C | Pixel moire | Black depth | Exp. Sys. |
|---|---|---|---|---|---|
| 42% | 0% | 0% | F | A | Fig. 18 |
| 50% | 0% | 0% | C | A | Fig. 18 |
| 56% | 0% | 0% | C | A | Fig. 18 |
| 73% | 0% | 0% | A | A | Fig. 18 |
| 56% | 42% | 0% | C | A | Fig. 18 |
| 56% | 50% | 0% | B | A | Fig. 18 |
| 56% | 56% | 0% | A | B | Fig. 18 |
| 56% | 80% | 0% | A | C | Fig. 18 |

Result 3: Optimal specs.: polarizers sandwiching light diffusion layer of layer B

| Haze of layer A | Haze of layer B | Haze of layer C | Pixel moire | Black depth | Exp. Sys. |
|---|---|---|---|---|---|
| 56% | 56% | 0% | A | A | FIG.19 |

Criteria (visual evaluation)

| A | Very good. Moire patterns were not a problem. |
|---|---|
| B | Good. Moire patterns were not a problem, but visible to some strict observers |
| C | Fair. Moire patterns were visible, but not serious. |
| F | Poor. Moire patterns were a problem. |

1 Dot for Color Panel

1 Dot for B&W
(1.4 Times Size of Color Dot in Both Length and Width)

LIQUID CRYSTAL DISPLAY AND TELEVISION RECEIVER

This application is the U.S. national phase of International Application No. PCT/JP2006/319203, filed 27 Sep. 2006, which designated the U.S. and claims priority to JP 2005-289427, filed 30 Sep. 2005, the entire contents of each of which are hereby incorporated by reference.

TECHNICAL FIELD

The present invention relates to liquid crystal displays with improved contrast and television receivers incorporating the devices.

BACKGROUND ART

There exist various techniques for improving the contrast of a liquid crystal display. The following is examples disclosed in patent documents 1 to 7.

Patent document 1 discloses a technique of optimizing the relative amount and surface area ratio of the yellow component of pigment in a color filter to improve the contrast ratio. The technique successfully addresses the problem of poor contrast ratio of a liquid crystal display caused by pigment molecules in the color filter scattering and depolarizing polarized light. Patent document 1 states that the contrast ratio of a liquid crystal display improves from 280 to 420.

Patent document 2 discloses a technique of increasing the transmittance and polarizing capability of a polarizer to improve the contrast ratio. Patent document 2 states that the contrast ratio of a liquid crystal display improves from 200 to 250.

Patent documents 3 and 4 disclose a technique for improving contrast in guest-host mode which exploits absorption of light by a dichroic pigment.

Patent document 3 describes a method of improving contrast by way of a structure in which two guest-host liquid crystal cells are provided with a quarter-wave plate interposed between the two cells. Patent document 3 discloses omission of polarizers.

Patent document 4 discloses a liquid crystal display element in which a dichroic pigment is mixed with a liquid crystal used in dispersive liquid crystal mode. Patent document 4 states a contrast ratio of 101.

The techniques disclosed in patent documents 3 and 4 show relatively low contrast when compared to the other schemes. To further improve the contrast, various methods may be available: the light absorption by the dichroic pigment may be improved, the pigment content increased, or the thickness of the guest-host liquid crystal cell(s) increased. All these methods however lead to new problems, such as technical problems, poor reliability, and poor response properties.

Patent documents 5 and 6 disclose a method of improving contrast by an optical compensation scheme. The documents describe a liquid crystal panel and a liquid crystal display panel provided between a pair of polarizers. The liquid crystal panel performs optical compensation.

Patent document 5 improves a retardation contrast ratio from 14 to 35 in STN mode using a display cell and a liquid crystal cell which is provided to perform optical compensation.

Patent document 6 improves a contrast ratio from 8 to 100 by disposing a liquid crystal cell for optical compensation. The cell compensates for wavelength dependence of a liquid crystal display cell in, for example, TN mode when the display cell is displaying black.

Although the techniques disclosed in the patent documents achieve a 1.2- to 10-fold or even greater increase in contrast ratio, the absolute value of contrast ratio is no higher than about 35 to 420.

Another contrast enhancing technique is disclosed in patent document 7, for example. The document teaches a complex liquid crystal display in which two liquid crystal panels are stacked in such a manner that polarizers form crossed Nicols. Patent document 7 states that the stacking of two panels increases the contrast ratio to three to four digit values whilst the panel, if used alone, shows a contrast ratio of 100.

Patent document 1: Japanese Unexamined Patent Publication (Tokukai) 2001-188120 (published Jul. 10, 2001)
Patent document 2: Japanese Unexamined Patent Publication (Tokukai) 2002-90536 (published Mar. 27, 2002)
Patent document 3: Japanese Unexamined Patent Publication 63-25629/1988 (Tokukaisho 63-25629; published Feb. 3, 1988)
Patent document 4: Japanese Unexamined Patent Publication 5-2194/1993 (Tokukaihei 5-2194; published Jan. 8, 1993)
Patent document 5: Japanese Unexamined Patent Publication 64-49021/1989 (Tokukaisho 64-49021; published Feb. 23, 1989)
Patent document 6: Japanese Unexamined Patent Publication 2-23/1990 (Tokukaihei 2-23; published Jan. 5, 1990)
Patent document 7: Japanese Unexamined Patent Publication 5-88197/1993 (Tokukaihei 5-88197; published Apr. 9, 1993)

DISCLOSURE OF INVENTION

Patent document 7 is aimed at achieving increased gray levels by stacking two liquid crystal panels without increasing the gray levels of the individual liquid crystal panels; no concrete measures are taken to address moire pattern problems which could seriously degrade display quality.

The present invention, conceived in view of these problems, has an objective of reducing moire pattern occurrences which markedly increase when two liquid crystal panels are stacked, so as to realize a liquid crystal display with high display quality.

A liquid crystal display in accordance with the present invention, to address the problems, is characterized in that it includes two or more liquid crystal panels being stacked, at least one of the panels including a light diffusion layer having a light diffusing property.

According to the arrangement, the provision of a light diffusion layer having a light diffusing property in at least one the combination of liquid crystal panels spatially smudge the light having transmitted the light diffusion layer. This enables mitigating the magnitude of mutual non-synchronous interference by, for example, fine structures with equivalent cycles on adjacent panels (bus lines, a black matrix, alignment controlling projections, etc.). As a result, moire pattern occurrences attributable to structural interference are reduced, and the degradation of display quality due to moire pattern occurrences is prevented.

There may be provided polarized light absorbing layers sandwiching the liquid crystal panels so as to form crossed Nicols.

In this case, in the front direction, light leaks along the transmission axis of a polarized light absorbing layer, but the leak is blocked off by the absorption axis of the next polarized light absorbing layer. At oblique angles, if the Nicol angle, or the angle at which the polarization axes of the adjacent polarized light absorbing layers intersect, deviates somewhat from an original design, no increase in light intensity due to light leakage occurs. Black is less likely to lose its depth with an increase in the Nicol angle at oblique viewing angles.

When two or more liquid crystal panels are stacked, and polarized light absorbing layers are disposed across the liquid crystal panels to form crossed Nicols as above, at least three polarized light absorbing layers are included. The three polarized light absorbing layers disposed to form crossed Nicols allow for an improved shutter performance both in the front and oblique directions. That in turn greatly improves contrast.

Under the above conditions, if each liquid crystal panel produces a display according to a display signal, contrast is further improved.

The light diffusion layer may be provided on a display plane side of the stacked liquid crystal panels. When that is the case, the periodic information of moire patterns produced by the stack of liquid crystal panels is smudged so much by the light diffusion layer that the information disappears or alleviated. Thus, no moire patterns are observable.

If the light diffusion layer provided on the display plane side has a haze value of 50% or greater, moire pattern occurrences are reduced. If the light diffusion layer provided on the display plane side has a haze value of 56% or greater, moire pattern occurrences are further reduced. If the light diffusion layer provided on the display plane side has a haze value of 72% or greater, almost no moire patterns occur.

The light diffusion layer may be provided between the stacked liquid crystal panels. When that is the case, the light diffusion layer smudges the periodic information of fine structures on the lower panel so much that the information disappears or alleviated. Thus, moire pattern occurrences are prevented.

If the light diffusion layer provided between the panels has a haze value of 56% or greater, moire pattern occurrences are reduced.

There may be provided two light diffusion layers, one on a display plane side of the stack of liquid crystal panels and the other between the stacked liquid crystal panels. If both the light diffusion layers have a haze value of 36%, moire patterns are mitigated. If both have a haze value of 50% or greater, moire patterns are further mitigated. If both have a haze value of 56% or greater, almost no moire patterns occur. In this case, The use of a light diffusion layer with low haze value between the stack of liquid crystal panels lowers contrast deterioration caused by depolarization which accompanies moire prevention when compared to a light diffusion layer provided only between the stacked liquid crystal panels.

A light diffusion layer may be provided between the stack of liquid crystal panels, and another one may be provided between two or more polarized light absorbing layers disposed between the panels so that the absorption axes of the layers are parallel (i.e., the layers form parallel Nicols). When that is the case, depolarization that accompanies diffusion between panels is prevented. Contrast decrease which accompanies moire prevention becomes less likely to occur.

A light diffusion layer may be provided both between the stack of liquid crystal panels and on the display plane. In this case, moire patterns are more preferably mitigated.

The light diffusion layer(s) preferably contain(s) particles being dispersed therein, the particles having a different refractive index from a base material.

The light diffusion layer preferably has a base material subjected to a steric surface treatment, for example, roughening.

The base material of the light diffusion layer is, for example, acrylic, PET, or TAC material. Use of a resin layer with a refractive index of about 1.5 facilitates manufacture.

The base material of the light diffusion layer needs to have an average particle diameter of 370 nm or longer and contain diffusion particles dispersed therein, the particles having a different refractive index from the base material. The base material preferably has an average particle diameter of 520 nm or longer and contains diffusion particles dispersed therein, the particles having a different refractive index from the base material. More preferably, the base material has an average particle diameter of 3.7 µm or longer and contains diffusion particles dispersed therein, the particles having a different refractive index from the base material.

Use of inorganic baked particles, such as silica beads, as the diffusion particles facilitates manufacture.

The diffusion particles are preferably made of aluminum oxide which is colorless and transparent and has a relatively high refractive index of about 1.7 and various other transparent metal compounds (oxide of titanium, oxide of magnesium, etc.).

Another liquid crystal display of the present invention, to address the problems, is characterized in that it includes two or more liquid crystal panels being stacked, at least one of the panels including a light diffusion layer having a light diffusing property, wherein at least one of substrates constituting the stacked liquid crystal panels, the particular substrate facing an adjacent panel, is thinner than the substrates which do not face the adjacent panel.

According to the arrangement, at least one of substrates constituting the stacked liquid crystal panels, the particular substrate facing an adjacent panel, is thinner than the substrates which do not face the adjacent panel. That reduces light transmitting to adjacent dots, or "pixels," in other words, color mixture caused by parallax. This lower moire pattern occurrences attributable to light transmitting adjacent pixels. Moire pattern occurrences at oblique angles are reduced.

Besides, the total weight of the liquid crystal display is reduced because the substrates are thin. Mechanical strength can be maintained because the substrates which do not adjacent to each other are relatively thick.

Another liquid crystal display of the present invention, to address the problems, is characterized in that it includes two or more liquid crystal panels being stacked, at least one of the panels including a light diffusion layer having a light diffusing property, wherein adjacent liquid crystal panels have dots constituted by like elements, the elements in one of the adjacent panels being formed symmetrical to the elements in the other panel.

According to the arrangement, adjacent liquid crystal panels have dots constituted by like elements, the elements in one of the adjacent panels being formed symmetrical to the elements in the other panel. That reduces change in light transmittance attributable to displacement of the stack of liquid crystal panels.

Accordingly, moire pattern occurrences attributable to change in light transmittance are lowered.

Especially, as mentioned earlier, occurrences observable at oblique angles when the inner substrate is made thin are effectively lowered.

Another liquid crystal display of the present invention, to address the problems, is characterized in that it includes two or more liquid crystal panels being stacked, at least one of the panels including a light diffusion layer having a light diffusing property, wherein only either one of the liquid crystal panels includes a color filter.

According to the arrangement, only either one of the liquid crystal panels includes a color filter. Light, after having transmitted one of the liquid crystal panels, passes through the other liquid crystal panel without causing color mixture. That mitigates moire pattern occurrences attributable to color mixture.

Since only either one of the liquid crystal panels has a color filter, there is no need to provide a color filter to the other liquid crystal panel. As a result, the manufacture of the liquid crystal display requires only a single color filter manufacturing step. Manufacture cost therefore is lowered.

Preferably, the liquid crystal panel containing no color filter contains an active matrix substrate, and the opposite substrate facing the active matrix substrate has at least a black matrix formed thereon.

The arrangement reduces leak current induced by radiation of light to the TFT and other switching elements formed on the active matrix substrate.

The opposite substrate preferably has a light-transmitting resin layer in openings of the black matrix.

The light-transmitting resin layer planarizes the edges of the black matrix on the opposite substrate and makes alignment less likely to be disturbed at the edges of the black matrix. Display quality degradation attributable to alignment disturbance is reduced.

A mask used to form the color filter can be used to form the light-transmitting resin layer.

The light-transmitting resin layer is preferably formed to cover the black matrix and the openings of the black matrix.

Accordingly, the opposite substrate is planarized. Display quality degradation attributable to alignment disturbance is further reduced.

In this case, the light-transmitting resin layer is formed to cover the black matrix and the openings of the black matrix. Patterning is not necessary. As a result, exposure and development steps which involve use of a mask can be omitted in forming the light-transmitting resin layer.

Preferably, the liquid crystal panel containing no color filter contains dots each having dimensions n×m times those of each dot in the liquid crystal panel containing the color filter, where n, m are real numbers, at least either one of n and m is greater than 1, n is a ratio taken parallel to gate bus lines, and m is a ratio taken parallel to source bus lines.

The arrangement reduces the number of source bus lines of the liquid crystal panel containing no color filter and hence reduces the number of source drivers to 1/n times that of the liquid crystal panel containing a color filter. Also, the arrangement reduces the number of gate bus lines of the liquid crystal panel containing no color filter and hence reduces the number of gate drivers to 1/m times that of the liquid crystal panel containing a color filter. Accordingly, the cost of the liquid crystal display is greatly reduced.

The liquid crystal display may include display control means for outputting gray level data as display signals to the liquid crystal panels so as to control display by the liquid crystal panels, wherein the display control means controls gray level data for each dot in the liquid crystal panel containing no color filter to be equal to maximum gray level data for corresponding n×m dots in the liquid crystal panel containing the color filter, where n, m are real numbers, at least either one of n and m is greater than 1, n is a ratio taken parallel to gate bus lines, and m is a ratio taken parallel to source bus lines and also to be equal to gray level data indicated by results of computing reflecting the maximum gray level.

Another liquid crystal display of the present invention, to address the problems, is characterized in that it includes: a first and a second liquid crystal panel being stacked, each of the panels containing a polarized light absorbing layer, the second liquid crystal panel producing a display according to a second display signal whilst the first liquid crystal panel produces a display according to a first display signal; and display control means for blurring so that the second liquid crystal panel displays a blurred image when compared to an image display on the first liquid crystal panel.

According to the arrangement, the display control means performs blurring on the image displayed on the second liquid crystal panel so that the image appears blurred when compared to the image displayed on the first liquid crystal panel. Interference occurring between the liquid crystal panels is mitigated.

Specifically, interference occurring between the liquid crystal panels is mitigated by rendering the spatial frequency of display data supplied to the first liquid crystal panel and the spatial frequency of display data supplied to the second liquid crystal panel different from each other. That mitigates moire pattern occurrences attributable interference between the liquid crystal panels and improves display quality.

Concrete means for rendering the spatial frequencies of display data different from each other will be described next.

The display control means may contain a lowpass filter for filtering the display data for low frequency components and supply the low frequency component (display data) obtained from the lowpass filter to a liquid crystal panel which produces a display according to the second display signal.

In addition, the display control means may contain a bandwidth dividing filter for separating the display data into high frequency components and low frequency components and supply the high frequency components (display data) obtained from the bandwidth dividing filter to the first liquid crystal panel and the low frequency components (display data) to a liquid crystal panel which produces a display according to the second display signal.

Another liquid crystal display of the present invention, to address the problems, is characterized in that it contains two liquid crystal panels being stacked, each of the panels containing a polarized light absorbing layer, one of the liquid crystal panels producing a display according to a first display signal whilst the other liquid crystal panel produces a display according to a second display signal, wherein at least one of liquid crystal panels contains an island-shaped black matrix.

According to the arrangement, at least one of the first and other liquid crystal panels contains an island-shaped black matrix. That allows provision of the black matrix only at the locations corresponding to TFT elements and other absolutely necessary locations. Accordingly, moire pattern occurrences attributable the black matrix are reduced.

A liquid crystal panel used in the liquid crystal display of the present invention is characterized in that it contains: a vertical alignment liquid crystal layer; a first substrate and a second substrate facing each other across the liquid crystal layer; a first electrode provided on a side, of the first substrate, which faces the liquid crystal layer and a second electrode provided on a side, of the second substrate, which faces the liquid crystal layer; and at least one alignment film provided to contact the liquid crystal layer, wherein: pixel regions are each divided into a first, a second, a third, and a fourth liquid crystal domain, liquid crystal molecules in the liquid crystal layer near a center with respect to a layer plane and a thickness direction exhibiting a tilt direction parallel to a predetermined, first direction in the first liquid crystal domain, a predetermined, second direction in the second liquid crystal domain, a predetermined, third direction in the third liquid crystal domain, and a predetermined, fourth direction in the fourth liquid crystal domain when a voltage is applied across the first and second electrodes; a difference between any given pair of the first, second, third, and fourth directions is substantially equal to an integral multiple of 90°; and the first, second, third, and fourth liquid crystal domains are adjacent to other liquid crystal domains and are arranged in a 2×2 matrix.

According to the arrangement, alignment controlling force for the liquid crystal, and hence response speed, are improved when compared to the provision of alignment controlling projections and electrode openings (slits).

The liquid crystal display of the present invention may be used as a display inn a television receiver containing: a tuner section for receiving television broadcast; and a display for displaying the television broadcast received by the tuner section.

BRIEF DESCRIPTION OF DRAWINGS

FIG. 17 shows results of experiments on a relationship between moire pattern occurrences and haze in a light diffusion layer and also on crispness of a black display under those conditions.

BEST MODE FOR CARRYING OUT INVENTION

A typical liquid crystal display contains a liquid crystal panel and polarizers A, B attached to the panel. The panel contains a color filter substrate and a driver substrate. The description here will focus on the MVA (multidomain vertical alignment) liquid crystal display.

Figure 8:
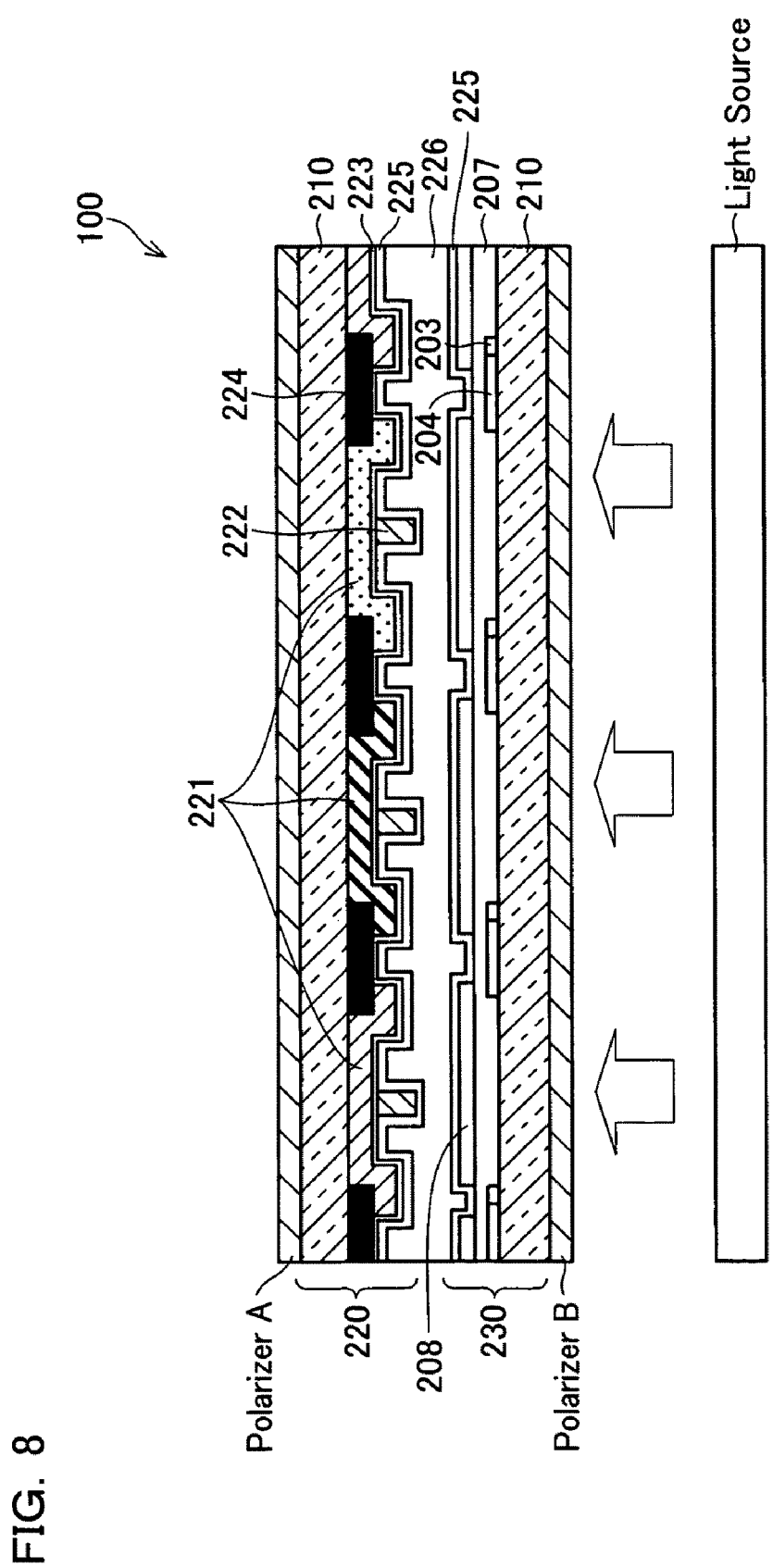
FIG. 8 is a schematic cross-sectional view of a liquid crystal display with a single liquid crystal panel.
Figure 9:
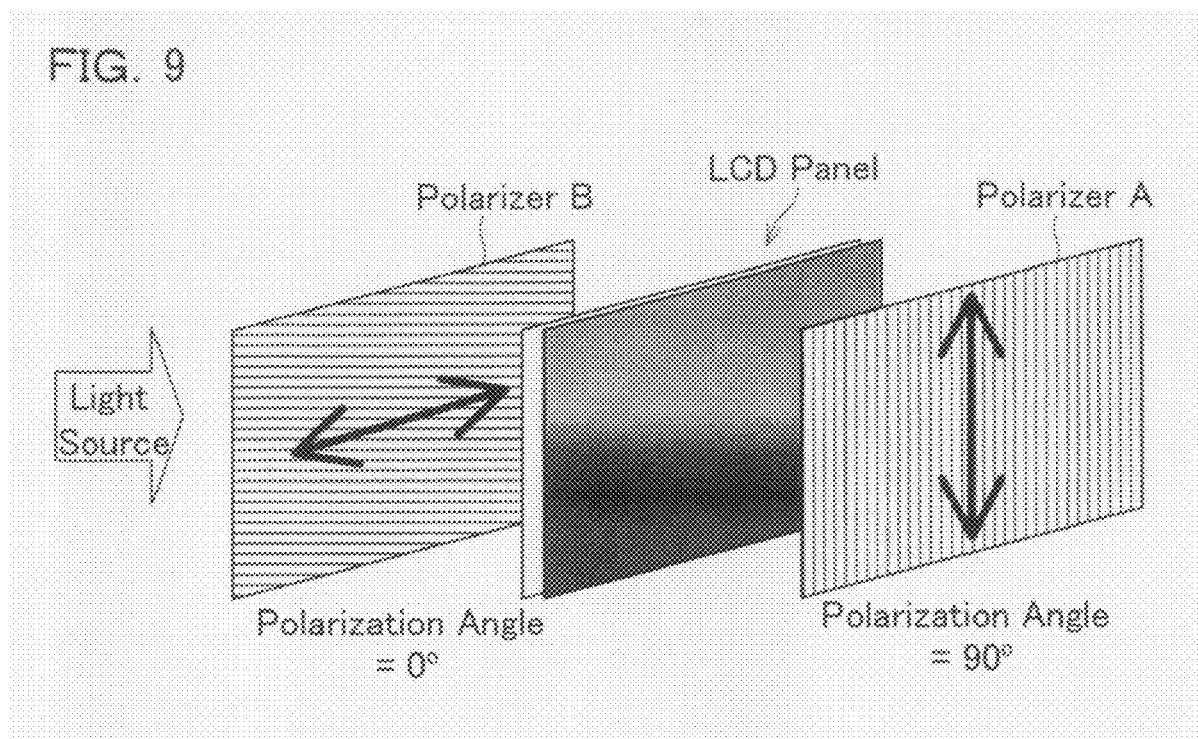
FIG. 9 illustrates the positional relationship of polarizers and panels in the liquid crystal display shown in FIG. 8.

The polarizers A, B, as shown in FIG. 9, are positioned so that their polarized light axes are orthogonal to each other. The azimuth of the direction in which the liquid crystal aligns when a threshold voltage is applied to pixel electrodes 8 (FIG. 8) is set to 45° with respect to the polarized light axes of the polarizers A, B. Under these conditions, the liquid crystal layer in the liquid crystal panel rotates the axis of incident light which has been polarized by the polarizer A; the light thus comes out of the polarizer B. When the voltage applied to the pixel electrodes is less than or equal to the threshold voltage, the liquid crystal aligns vertical to the substrate. The polarization angle of the incident light does not change, producing a black display. In MVA mode, the liquid crystal under applied voltage aligns in four directions (multidomain) to deliver a large viewing angle.

Vertical alignment ("VA") refers to a state in which liquid crystal molecules align in such a manner that their axes (axis orientation) point at about 85° or greater to the surface of a vertical alignment film.

The following will describe MVA mode in more detail.

Figure 51:
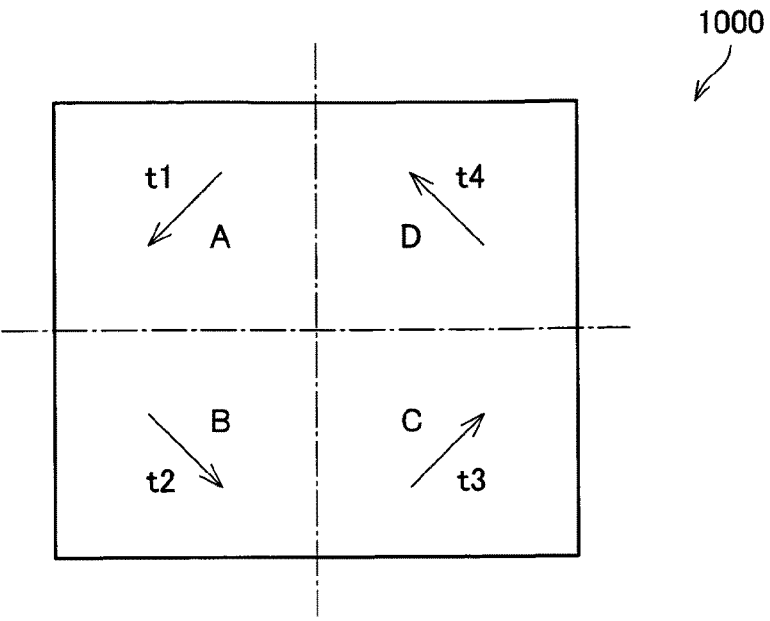
FIG. 51 illustrates the relationship of domains in MVA mode.

A pixel region 1000 in FIG. 51 is divided into four segments. FIG. 51 shows the pixel region 1000 corresponding to a substantially square-shaped pixel electrode for the sake of simplicity. However, the present invention is by no means limited by the shape of pixel regions.

The pixel region 1000 contains four domains A, B, C, and D of liquid crystal. Each domain has a different tilt direction (reference alignment direction) denoted by t1, t2, t3, and t4 in the figure. The difference between any given pair of the tilts is substantially equal to an integral multiple of 90°. The domains A, B, C, and D have equal areas. They provide an example of optimal 4-segment structure in terms of viewing angle performance. The four domains form a 2×2 matrix.

The VA liquid crystal layer, taken as an example in this embodiment, contains a nematic liquid crystal material with negative dielectric anisotropy. An alignment film is provided on each side of the liquid crystal layer. There is about a 90° difference between the pre-tilt direction furnished by one of the alignment films and the pre-tilt direction furnished by the other alignment film. The tilt angle (reference alignment direction) is set to halfway between the two pre-tilt directions. No chiral agent is added. When a voltage is applied to the liquid crystal layer, the liquid crystal molecules in the neighborhood of the alignment film are twisted by alignment controlling forces of the alignment film. Chiral agents may be added where necessary. This particular type of VA mode in which a pair of vertical alignment films, which give orthogonal pre-tilt directions (alignment treatment directions), is used to twist the liquid crystal molecules is sometimes called VATN (Vertical Alignment Twisted Nematic) mode.

The pre-tilt direction refers to the alignment direction of a liquid crystal molecule imparted by an alignment film, in particular, the azimuth in the display plane. In this situation, the angle between the liquid crystal molecule and the surface of the alignment film is termed the pre-tilt angle. The pre-tilt direction is defined by rubbing or optically treating the alignment film. A combination of two alignment films, disposed across the liquid crystal layer, which define different pre-tilt directions enables the construction of the 4-segment structure. The pixel region, divided into four segments, has four liquid crystal domains (or simply "domains"). Each liquid crystal domain defines a distinct tilt direction (or "reference alignment direction") of liquid crystal molecules near the center of the liquid crystal layer with respect to the in-plane and thickness directions when a voltage is applied to the liquid crystal layer. The tilt direction (reference alignment direction) dominantly affects the viewing angle dependence of the domain.

The tilt direction is expressed in its azimuth. The azimuth is referenced to the horizontal direction of the displayed image and measured anticlockwise (comparing the display plane to the face of a clock, the 3 o'clock direction is the 0° azimuth; the anticlockwise rotation is positive). The viewing angle performance is averaged out for good display by setting the tilt directions of the four liquid crystal domains so that the difference between any given pair of the tilt directions is substantially equal to an integral multiple of 90° (for example, 12, 9, 6, and 3 o'clock directions). In addition, in view of uniform viewing angle performance, the four liquid crystal domains preferably occupy substantially equal areas in the pixel region. Specifically, the difference between the largest and smallest of the four liquid crystal domains is preferably 25% or less of the largest one.

The alignment film comes to be able to define pre-tilt directions for liquid crystal molecules by, for example, rubbing or optical treatment. Other known methods include transferring fine structures formed in advance on the bed of the alignment film to the surface of the alignment film and forming fine structures on the surface of the alignment film by oblique vapor deposition of SiO or a like inorganic substance. Rubbing and optical treatment are favorable in view of mass production capability. Optical treatment is especially preferred because it is a non-contact process; unlike rubbing, it involves no friction, hence no electrostatic charge, and provides a better yield. Use of an optical alignment film containing a photosensitive group lowers the irregularities of the pre-tilt angle within 1° or less. The photosensitive group is preferably at least one of photosensitive groups of the 4-chalcone group, the 4'-chalcone group, the coumarin group, and the cinnamoyl group.

Contrast improvement has a limit with the double polarizer structure shown in FIG. 9. The inventors of the present invention have found that three polarizers, disposed to form crossed Nicols, used in combination with two liquid crystal display panels provides an improved shutter performance both in the front and oblique directions.

The following will discuss a contrast improvement mechanism.

Specifically, the inventors have made the following findings.

(1) Front Direction

Light leaked in the transmission axis of crossed Nicols due to depolarization (scattering of CF, for example) in the panel. In the triple polarizer structure, the third polarizer is positioned so that its absorption axis matches with the light leaking in the transmission axis direction of the second polarizer. The leakage is thus eliminated.

(2) Oblique Directions

Changes in leakage become less sensitive to an increasing Nicol angle φ of a polarizer, that is, black is less likely to lose its depth with an increasing Nicol angle φ at oblique viewing angles.

From these findings, the inventors have confirmed that the triple polarizer structure greatly improves the contrast of the liquid crystal display. The following will discuss a contrast improvement mechanism in reference to FIGS. 10(a) to 10(c), FIGS. 11(a) to 11(d), FIGS. 12(a) to 12(c), FIG. 13(a), FIG. 13(b), FIGS. 14(a) to 14(c), FIG. 15(a), FIG. 15(b), FIG. 16(a), FIG. 16(b), and Table 1. A double polarizer structure will be referred to as structure I, and a triple polarizer structure as structure II. The contrast improvements in oblique directions are attributable essentially to polarizer structure. The modeling here is based only on polarizers, involving no liquid crystal panel.

Figure 10:
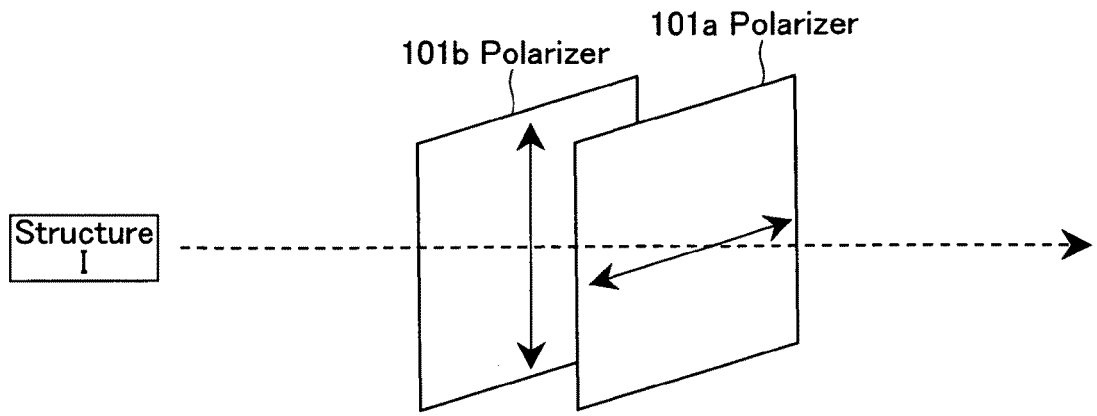
FIG. 10(a) illustrates a contrast improvement mechanism.
FIG. 10(b) illustrates a contrast improvement mechanism.
FIG. 10(c) illustrates a contrast improvement mechanism.
Figure 10:
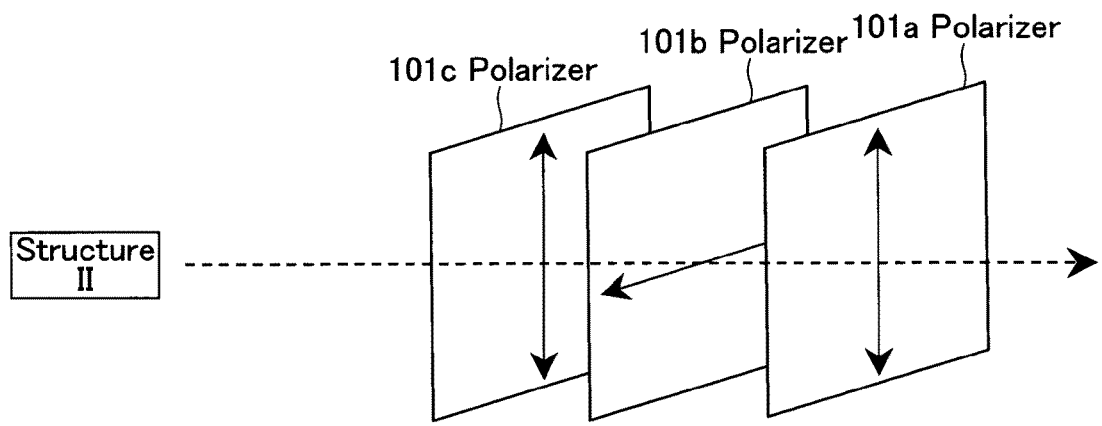
Figure 10:
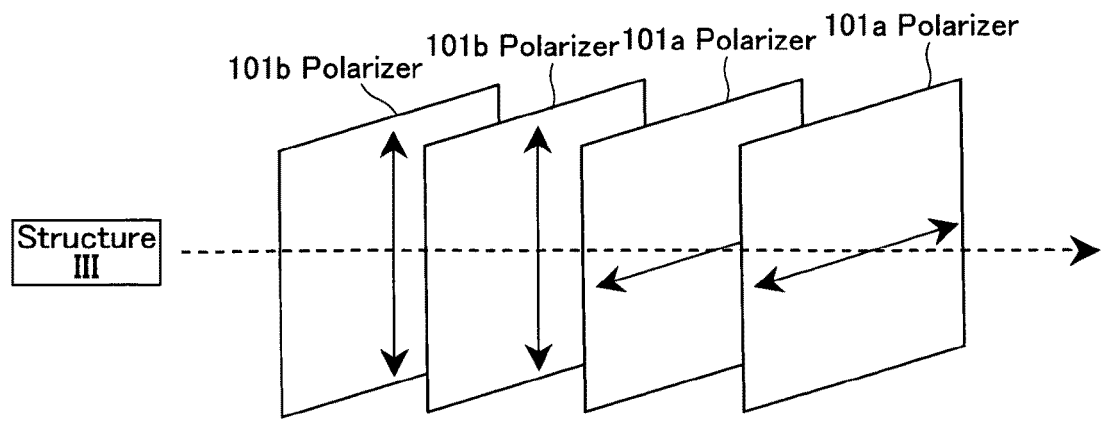

FIG. 10(a) depicts structure I with a single liquid crystal display panel, an example of two polarizers 101a, 101b disposed to form crossed Nicols. FIG. 10(b) depicts structure II, an example of three polarizers 101a, 101b, 101c disposed to form crossed Nicols. Since structure II includes two liquid crystal display panels, there are two pairs of polarizers which are disposed to form crossed Nicols. FIG. 10(c) depicts an example of a polarizer 101a and a polarizer 101b disposed face to face to form crossed Nicols; an additional polarizer of the same polarization direction is disposed outside each of the polarizers. Although FIG. 10(c) shows four polarizers, those polarizers which form crossed Nicols are only two of them that sandwich a liquid crystal display panel.

The transmittance with which the liquid crystal display panel produces a black display is modeled by treating that transmittance as the transmittance when polarizers are disposed to form crossed Nicols without a liquid crystal display panel, that is, a cross transmittance. The resultant transmittance model is referred to as a black display. Meanwhile, the transmittance with which the liquid crystal display panel produces a white display is modeled by treating that transmittance as the transmittance when polarizers are disposed to form parallel Nicols without a liquid crystal display panel, that is, a parallel transmittance. The resultant transmittance model is referred to as a white display. FIGS. 11(a) to 11(d) are graphs representing examples of the wavelength vs. transmittance relationship of a transmission spectrum when the polarizer is viewed from the front and at oblique angles. The modeled transmittances are ideal values of transmittances in white and black displays for polarizers disposed to form crossed Nicols which sandwiches the liquid crystal display panel.

Figure 11:
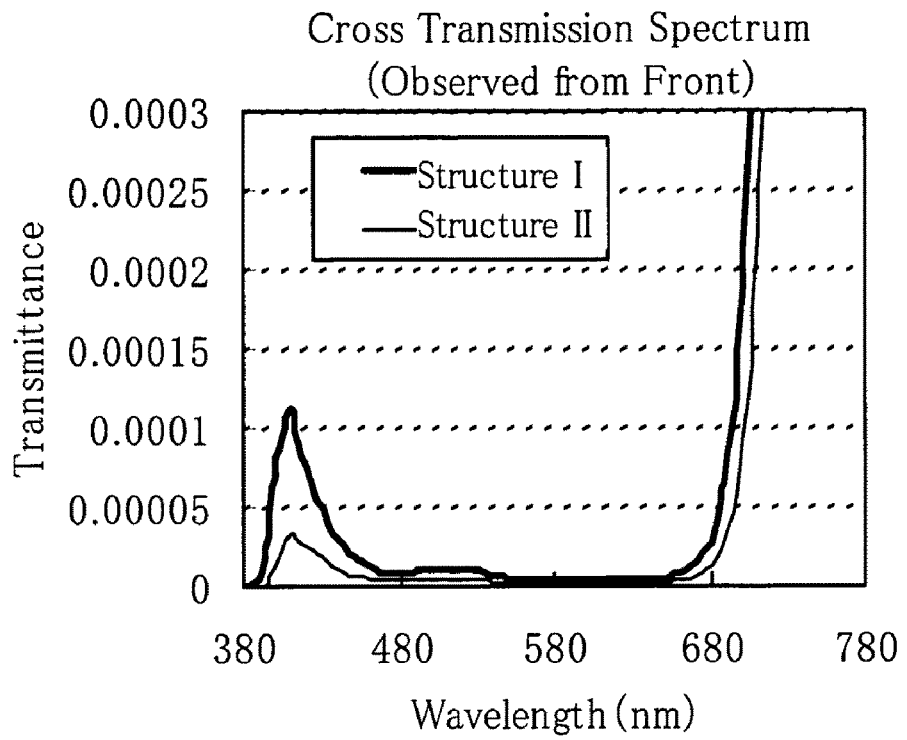
FIG. 11(a) illustrates a contrast improvement mechanism.
FIG. 11(b) illustrates a contrast improvement mechanism.
FIG. 11(c) illustrates a contrast improvement mechanism.
FIG. 11(d) illustrates a contrast improvement mechanism.
Figure 11:
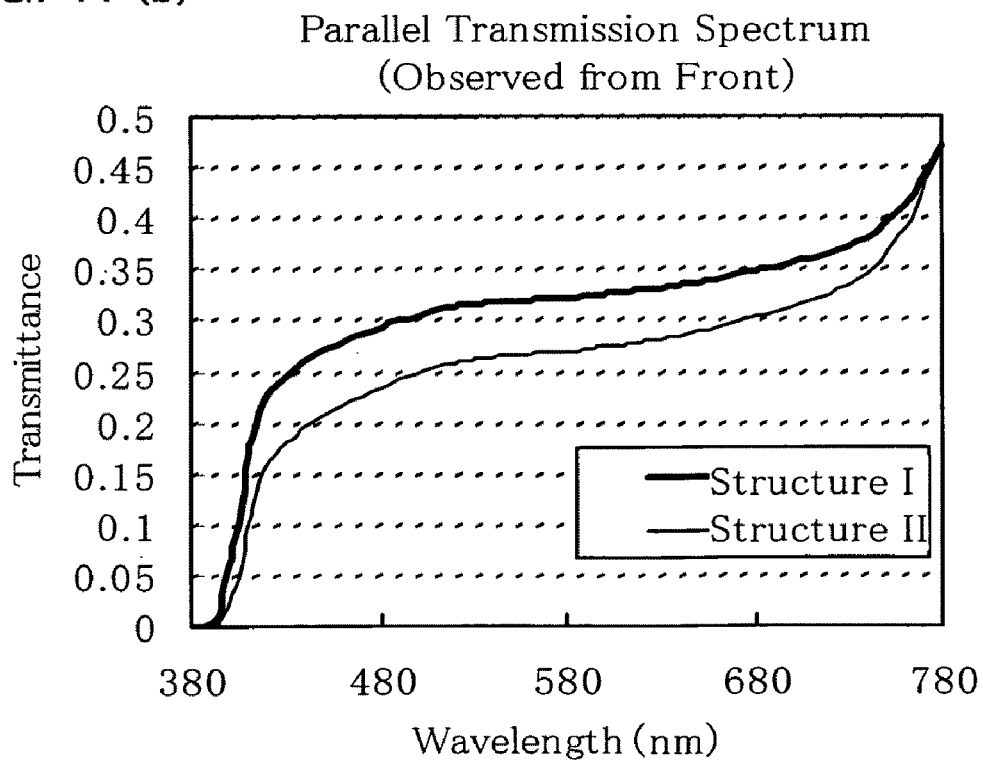
Figure 11:
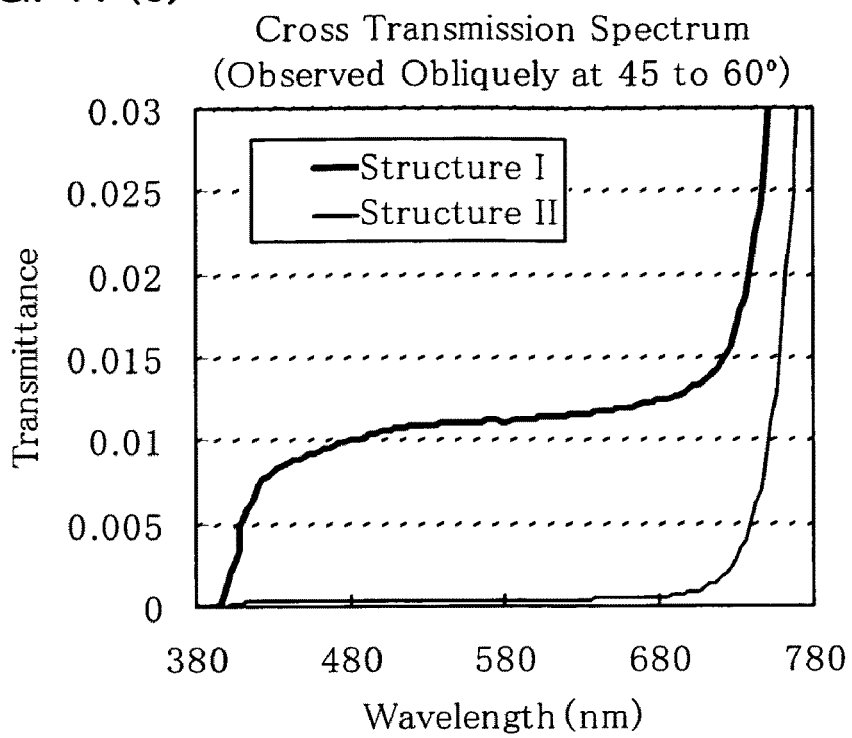
Figure 11:
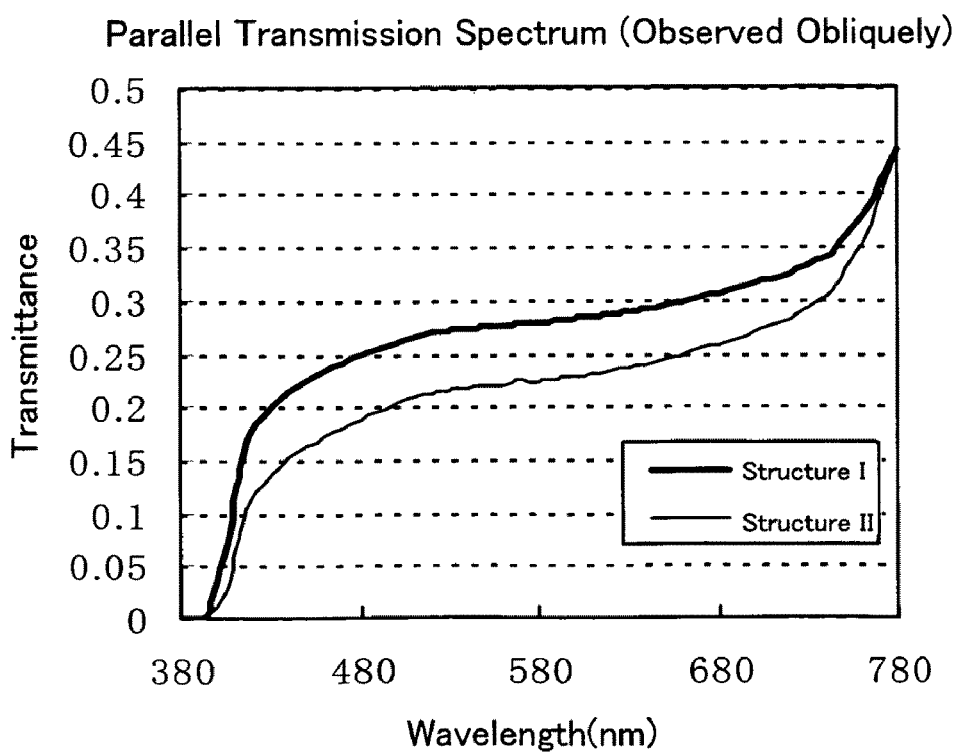

FIG. 11(a) is a graph showing the wavelength vs. cross transmittance relationship of a transmission spectrum for structures I, II for comparison when polarizers are viewed from the front. The graph demonstrates that structures I, II exhibit similar transmittance properties when a black display is viewed from the front.

FIG. 11(b) is a graph showing the wavelength vs. parallel transmittance relationship of a transmission spectrum for structures I, II for comparison when polarizers are viewed from the front. The graph demonstrates that structures I, II exhibit similar transmittance properties when a white display is viewed from the front.

FIG. 11(c) is a graph showing the wavelength vs. cross transmittance relationship of a transmission spectrum for structures I, II for comparison when polarizers are viewed at oblique angles (azimuth=45°–polar angle 60°). The graph demonstrates that structure II exhibits an almost zero transmittance at many of the wavelengths shown, whilst structure I transmits a small amount of light at many of the wavelengths shown when a black display is viewed at oblique angles. To put it differently, the double polarizer structure suffers light leakage (hence, loses crispness in blacks) when a black display is viewed at oblique viewing angles. On the other hand, the triple polarizer structure successfully restrains light leakage (hence, retains crispness in blacks) when a black display is viewed at oblique viewing angles.

FIG. 11(d) is a graph showing the wavelength vs. parallel transmittance relationship of a transmission spectrum for structures I, II for comparison when polarizers are viewed at oblique angles (azimuth=45°–polar angle 60°). The graph demonstrates that structures I, II exhibit similar transmittance properties when a white display is viewed at oblique angles.

As shown in FIGS. 11(b), 11(d), white appears almost the same regardless of the number of polarizers used, in other words, the number of Nicol pairs provided by polarizers and also regardless of whether the display is viewed from the front or at oblique angles.

However, as shown in FIG. 11(c), black appears less crisp on structure I (one Nicol pair) at oblique viewing angles, but remains crisp on structure II (two Nicol pairs) at oblique viewing angles.

Table 1 shows, as an example, the values of transmittance at 550 nm for the front and oblique angles (azimuth=45°–polar angle 60°).

TABLE 1

|  | Front | | | Oblique position (45° to 60°) | | |
| --- | --- | --- | --- | --- | --- | --- |
|  | Structure I | Structure II | II/I | Structure I | Structure II | II/I |
| Parallel | 0.319 | 0.265 | 0832 | 0.274499 | 0.219084 | 0.798 |
| Crossed | 0.000005 | 0.000002 | 0.4 | 0.01105 | 0.000398 | 0.0360 |
| Parallel/Crossed | 63782 | 132645 | 2.1 | 24.8 | 550.5 | 22.2 |

In Table 1, "Parallel" denotes parallel transmittance, or the transmittance in white display; "Cross" denotes cross transmittance, or the transmittance in black display; and "Parallel/Cross" therefore denotes contrast.

Table 1 demonstrates that the contrast for the front on structure II is about twice as high as that on structure I and also that the contrast for oblique angles on structure II is about 22 times as high as that on structure I. The contrast for oblique angles shows great improvements.

Now, referring to FIGS. 12(a) to 12(c), viewing angle performance will be described for white display and black display. Assume in the description an azimuth of 45° with respect to polarizers and a wavelength of 550 nm.

Figure 12:
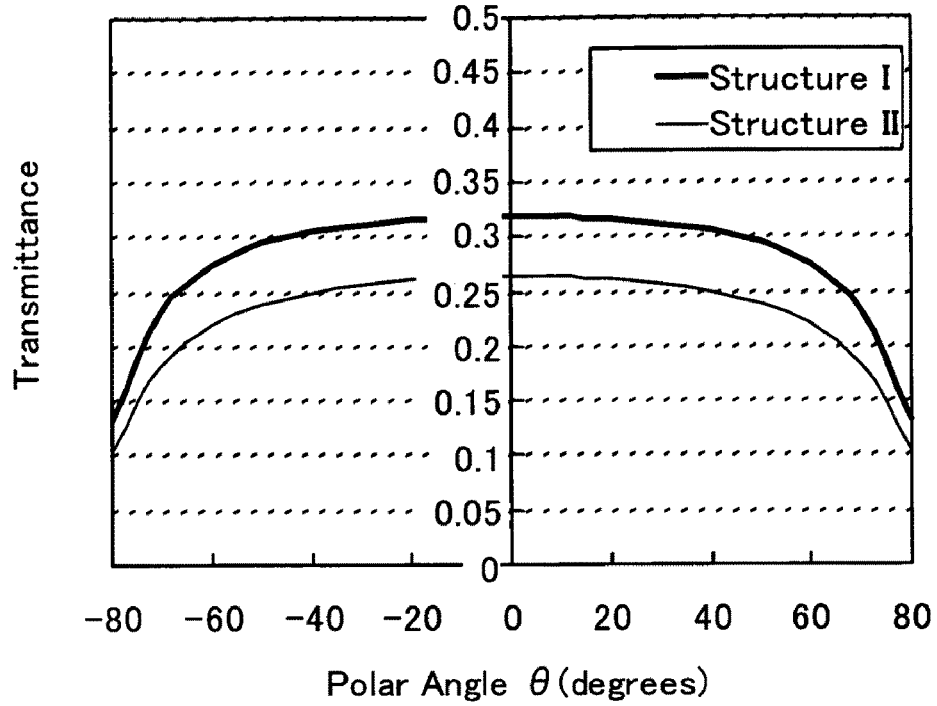
FIG. 12(a) illustrates a contrast improvement mechanism.
FIG. 12(b) illustrates a contrast improvement mechanism.
FIG. 12(c) illustrates a contrast improvement mechanism.
Figure 12:
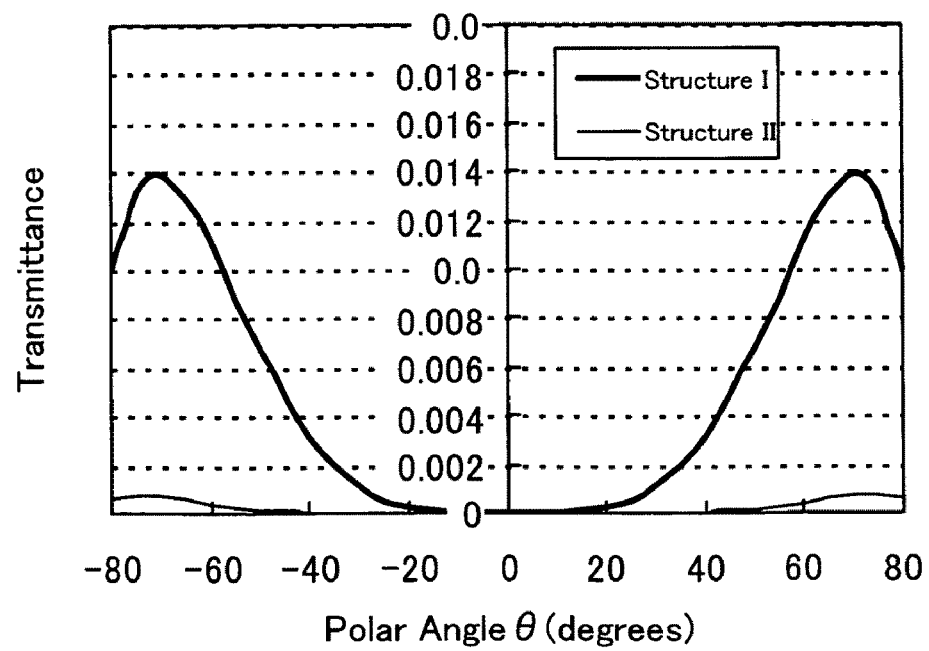
Figure 12:
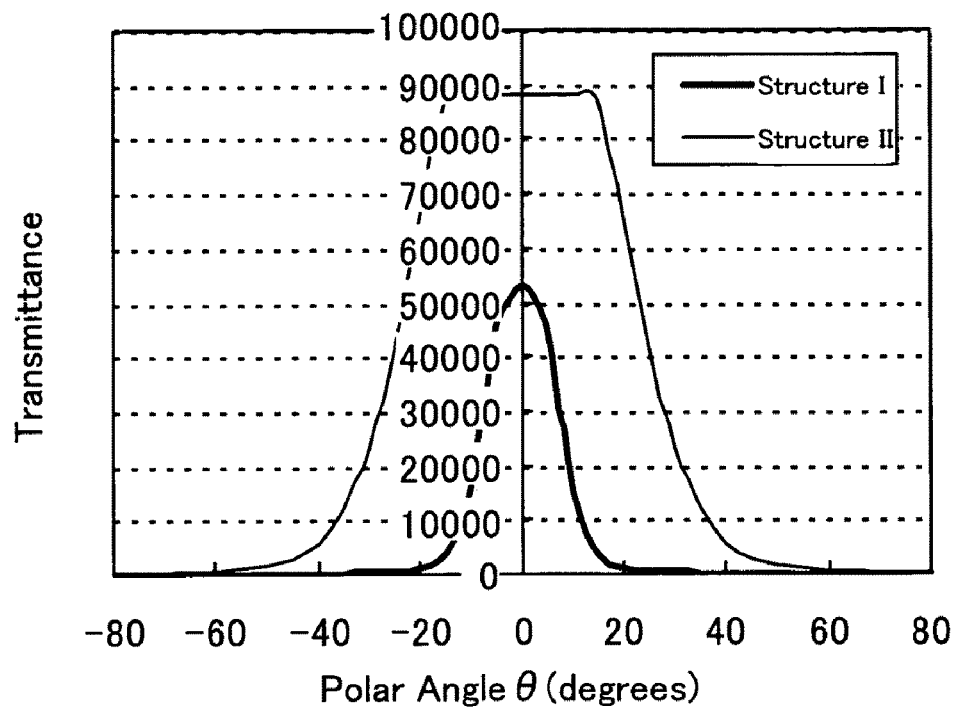

FIG. 12(a) is a graph representing the relationship between the polar angle and the transmittance in white display. The graph demonstrates that structures I and II share similar viewing angle performance (parallel viewing angle performance), albeit with structure II exhibiting a lower transmittance than structure I across the range.

FIG. 12(b) is a graph representing the relationship between the polar angle and the transmittance in black display. The graph demonstrates that structure II well restrains the transmittance at oblique viewing angles (≈polar angle±80°). On the other hand, structure I exhibits an increased transmittance at oblique viewing angles. At oblique viewing angles, blacks appear markedly less crisp on structure I than on structure II.

FIG. 12(c) is graph representing the relationship between the polar angle and the contrast. The graph demonstrates that structure II exhibits far better contrast than structure I. The graph for structure II in FIG. 12(c) is "clipped off" near 0°. This particular part of the graph is actually a smooth curve; it is clipped because the transmittance for black drops so sharply by orders of magnitude and renders calculation impractical.

Figure 13:
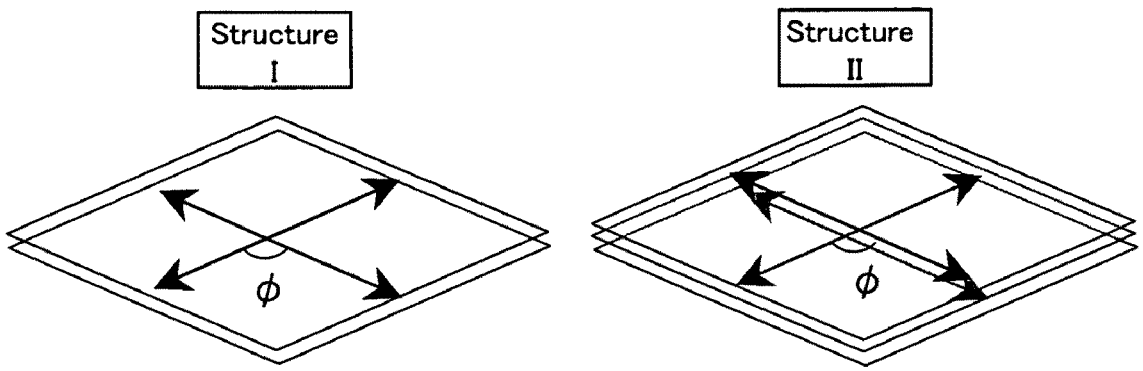
FIG. 13(a) illustrates a contrast improvement mechanism.
FIG. 13(b) illustrates a contrast improvement mechanism.
Figure 13:
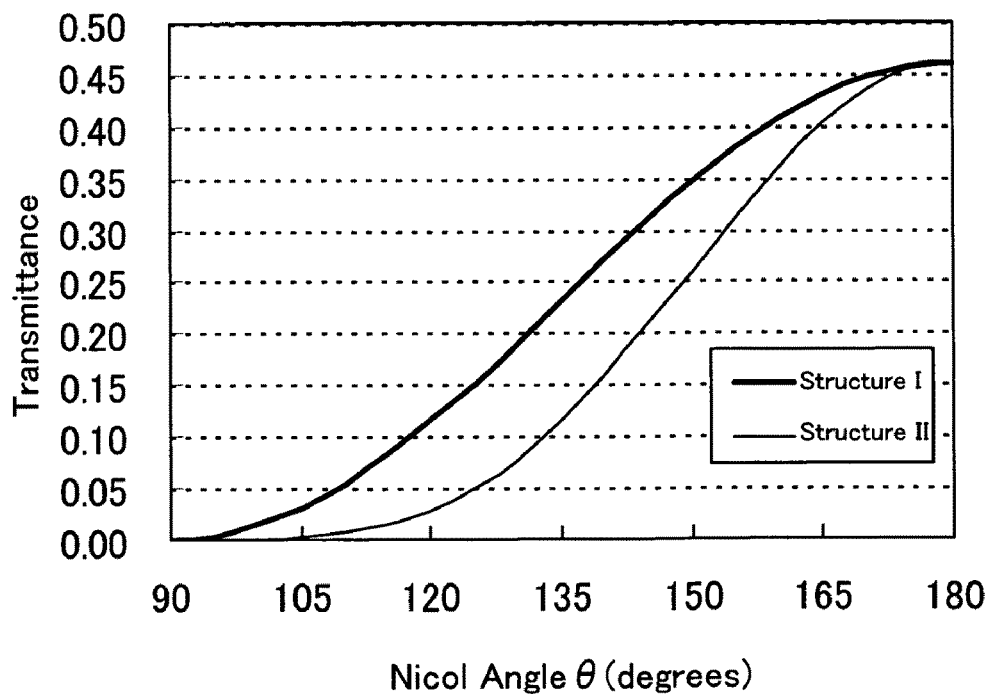

Next will be described the phenomenon that changes in leakage become less sensitive to an increasing Nicol angle φ of a polarizer, that is, black is less likely to lose its crispness with an increasing Nicol angle φ at oblique viewing angles, in reference to FIGS. 13(a), (b). The polarizer Nicol angle φ is an angle in a state that, as shown in FIG. 13(a), the polarization axes of the oppositely positioned polarizers are skew. FIG. 13(a) is a perspective view of polarizers which are positioned to form crossed Nicols; the figure shows the Nicol angle φ deviating from 90° (the deviation is the change in the Nicol angle).

FIG. 13(b) is a graph representing the relationship between the Nicol angle φ and the cross transmittance. Calculations are carried out based on an ideal polarizer (parallel Nicols transmittance=50%; crossed Nicols transmittance=0%). The graph demonstrates that the transmittance changes less with a change in the Nicol angle φ in structure II than in structure I in producing black display. In other words, the triple polarizer structure is less affected by a change in the Nicol angle φ than the double polarizer structure.

Next, the thickness dependence of the polarizer will be described in reference to FIGS. 14(a) to 14(c). The thickness of the polarizer is adjusted as in structure III in which, as shown in FIG. 10(c), polarizers of the same polarization axis direction are added one by one on a pair of crossed Nicols polarizers. FIG. 10(c) shows an example of a pair of crossed Nicols polarizers 101a, 101b with another pair of polarizers 101a, 101b of the same polarization axis directions sandwiching the first pair. In this case, the structure contains a pair of crossed Nicols polarizers and two other polarizers; thus, "one crossed pair—2." Likewise, with each additional polarizer, "one crossed pair—3," "one crossed pair—4," . . . . To draw the graphs in FIGS. 14(a) to 14(c), measurements are made on an assumption that azimuth=45° and polar angle=60°.

Figure 14:
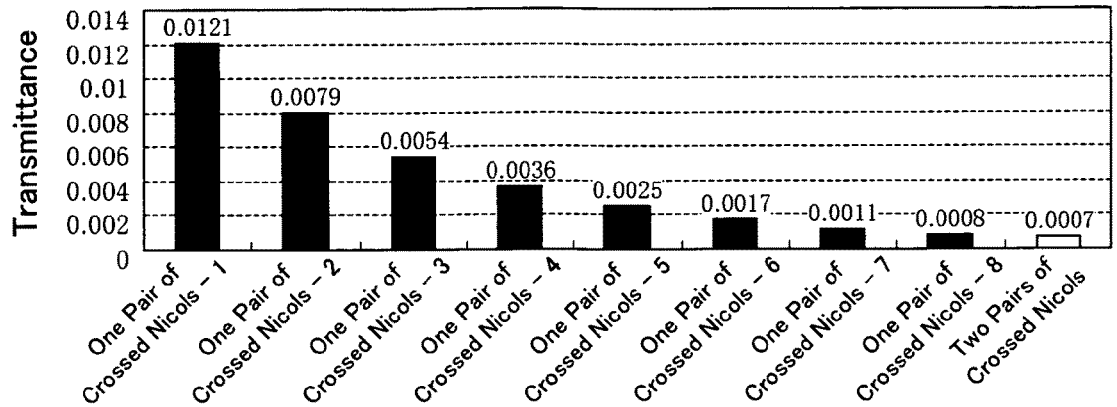
FIG. 14(a) illustrates a contrast improvement mechanism.
FIG. 14(b) illustrates a contrast improvement mechanism.
FIG. 14(c) illustrates a contrast improvement mechanism.
Figure 14:
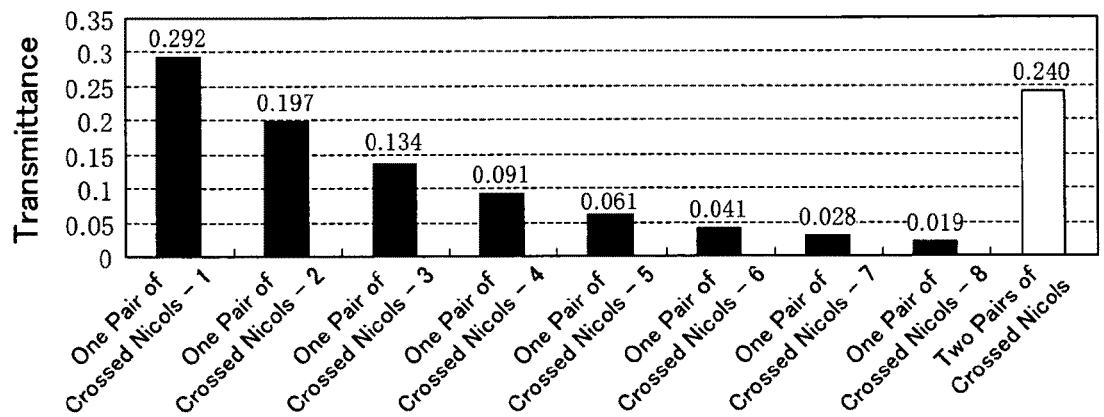
Figure 14:
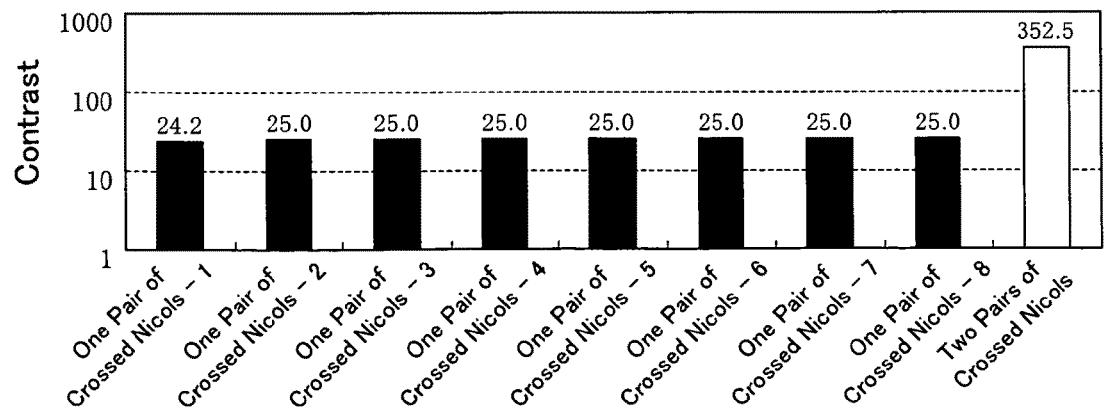

FIG. 14(a) is a graph representing the relationship between the thickness and the transmittance (cross transmittance) of a pair of crossed Nicols polarizers in producing black display. The graph also shows a transmittance for a structure with two pairs of crossed Nicols polarizers for comparison.

FIG. 14(b) is a graph representing the relationship between the thickness and the transmittance (parallel transmittance) of a pair of crossed Nicols polarizers in producing white display. The graph also shows a transmittance for a structure with two pairs of crossed Nicols polarizers for comparison.

The graph in FIG. 14(a) demonstrates that stacking polarizers reduces the transmittance in black display. Meanwhile, the graph in FIG. 14(b) demonstrates that stacking polarizers reduces the transmittance in white display. Simply stacking polarizers for the sake of prevention of reduced crispness in black display leads, undesirably, a decrease in the transmittance in white display.

FIG. 14(c) is a graph representing the relationship between the thickness and the contrast of a pair of crossed Nicols polarizers. The graph also shows contrast for two pairs of crossed Nicols polarizers for comparison.

As discussed above, the graphs in FIGS. 14(a) to 14(c) demonstrate that the structure with two pairs of crossed Nicols polarizers restrains loss of crisp blacks in black display and at the same time prevents reduced transmittance in white display. Besides, the two pairs of crossed Nicols polarizers consists of three polarizers; the pairs improves contrast by large amounts, as well as do not add to the total thickness of the liquid crystal display.

Figure 15:
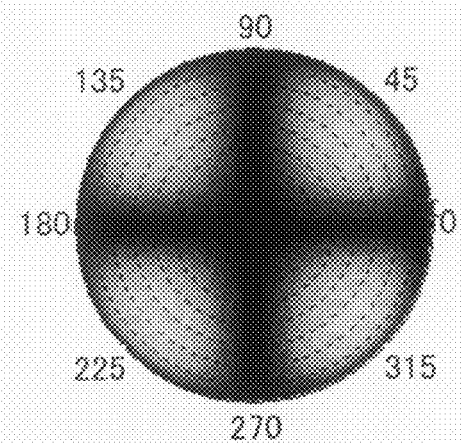
FIG. 15(a) illustrates a contrast improvement mechanism.
FIG. 15(b) illustrates a contrast improvement mechanism.
Figure 15:
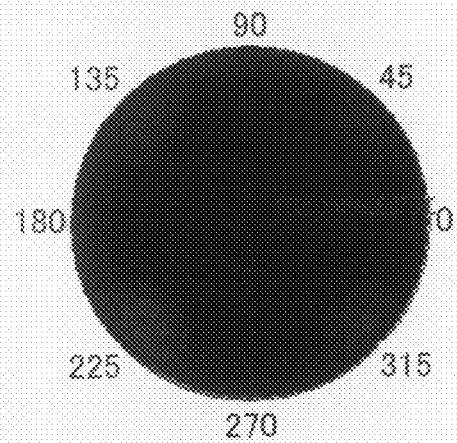

FIGS. 15(a), (b) show viewing angle characteristics of crossed Nicol transmittance in a specific manner. FIG. 15(a) shows the viewing angle characteristics of crossed Nicols in structure I, i.e., a double polarizer structure with a pair of crossed Nicols. FIG. 15(b) shows the viewing angle characteristics of crossed Nicols in structure II, i.e., a triple polarizer structure with two pairs of crossed Nicols.

The diagrams in FIGS. 15(a), (b) demonstrate that the structure with two pairs of crossed Nicols is almost free from degrading crispness in blacks (attributable to little increase in the transmittance in black display). This advantage of the structure is evident at 45°, 135°, 225°, and 315°.

Figure 16:
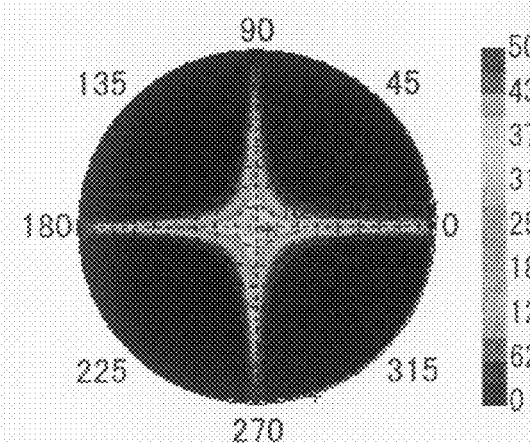
FIG. 16(a) illustrates a contrast improvement mechanism.
FIG. 16(b) illustrates a contrast improvement mechanism.
Figure 16:
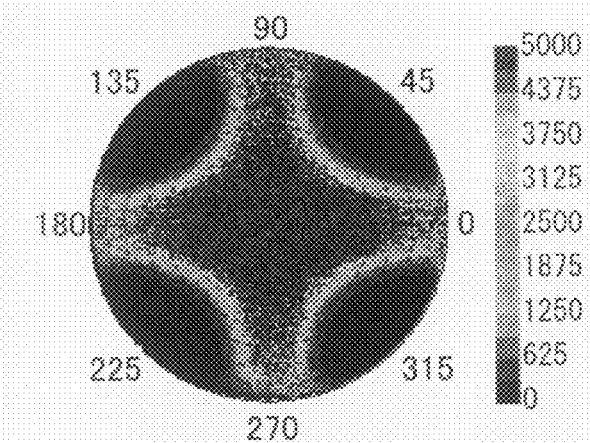

FIGS. 16(a), (b) shows viewing angle characteristics of contrast (parallel/cross luminance) in a specific manner. FIG. 16(a) shows the viewing angle characteristics of contrast of structure I, i.e., a double polarizer structure with a pair of crossed Nicols. FIG. 16(b) shows the viewing angle characteristics of contrast of structure II, i.e., a triple polarizer structure with two pairs of crossed Nicols.

The diagrams in FIGS. 16(a), (b) demonstrate that the structure with two pairs of crossed Nicols exhibits better contrast than the structure with a pair of crossed Nicols.

Now, referring to FIGS. 1 to 9, the following will describe this contrast improvement mechanism being applied to the liquid crystal display. For simplicity, two liquid crystal panels are used.

Figure 1:
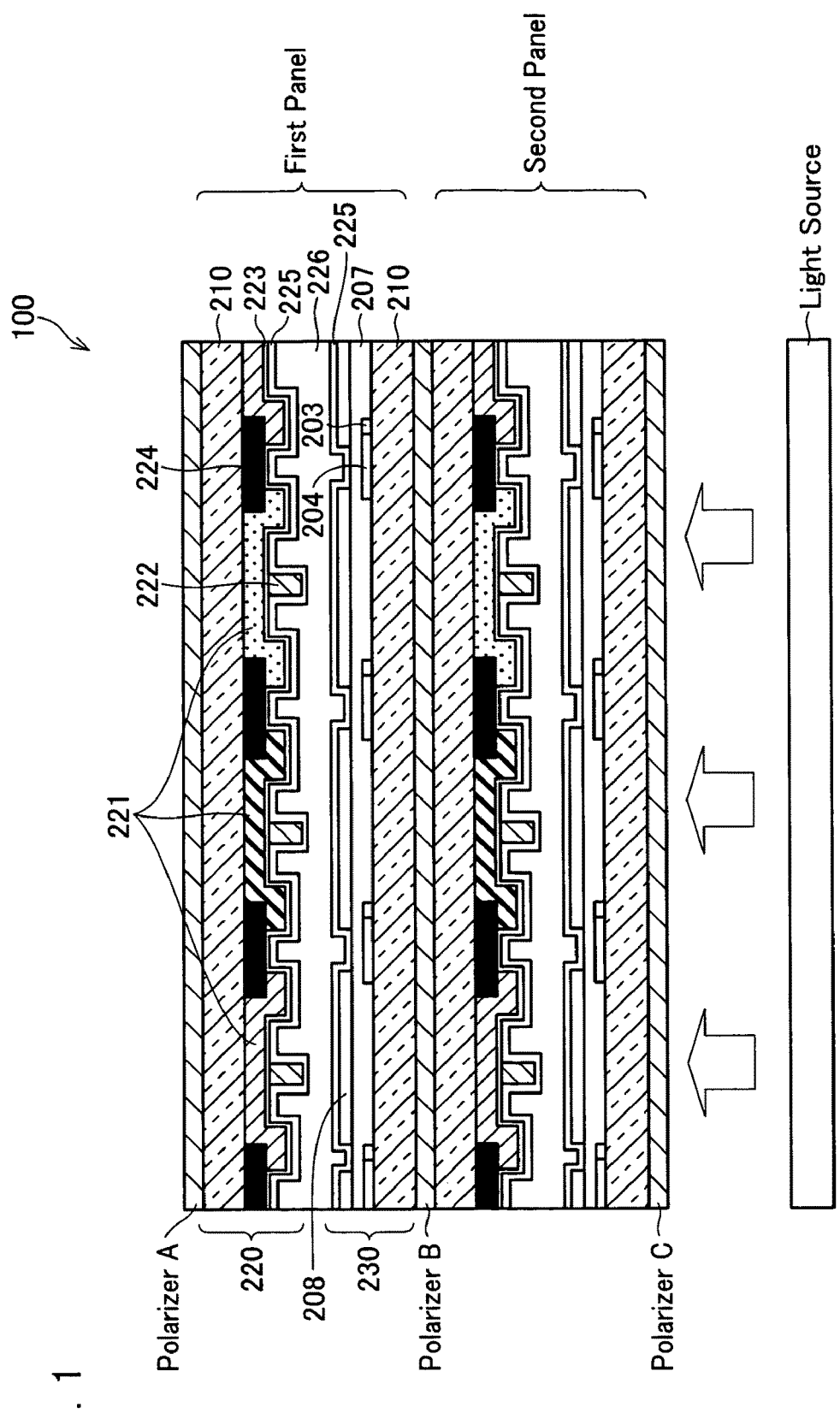
FIG. 1 is a schematic cross-sectional view of a liquid crystal display, illustrating an embodiment of the present invention.

FIG. 1 is a schematic cross-section of a liquid crystal display 100 in accordance with the present embodiment.

The liquid crystal display 100 includes panels and polarizers being stacked alternately on top of each other as shown in FIG. 1. The two panels are termed a first and a second. The three polarizers are termed A, B, and C.

Figure 2:
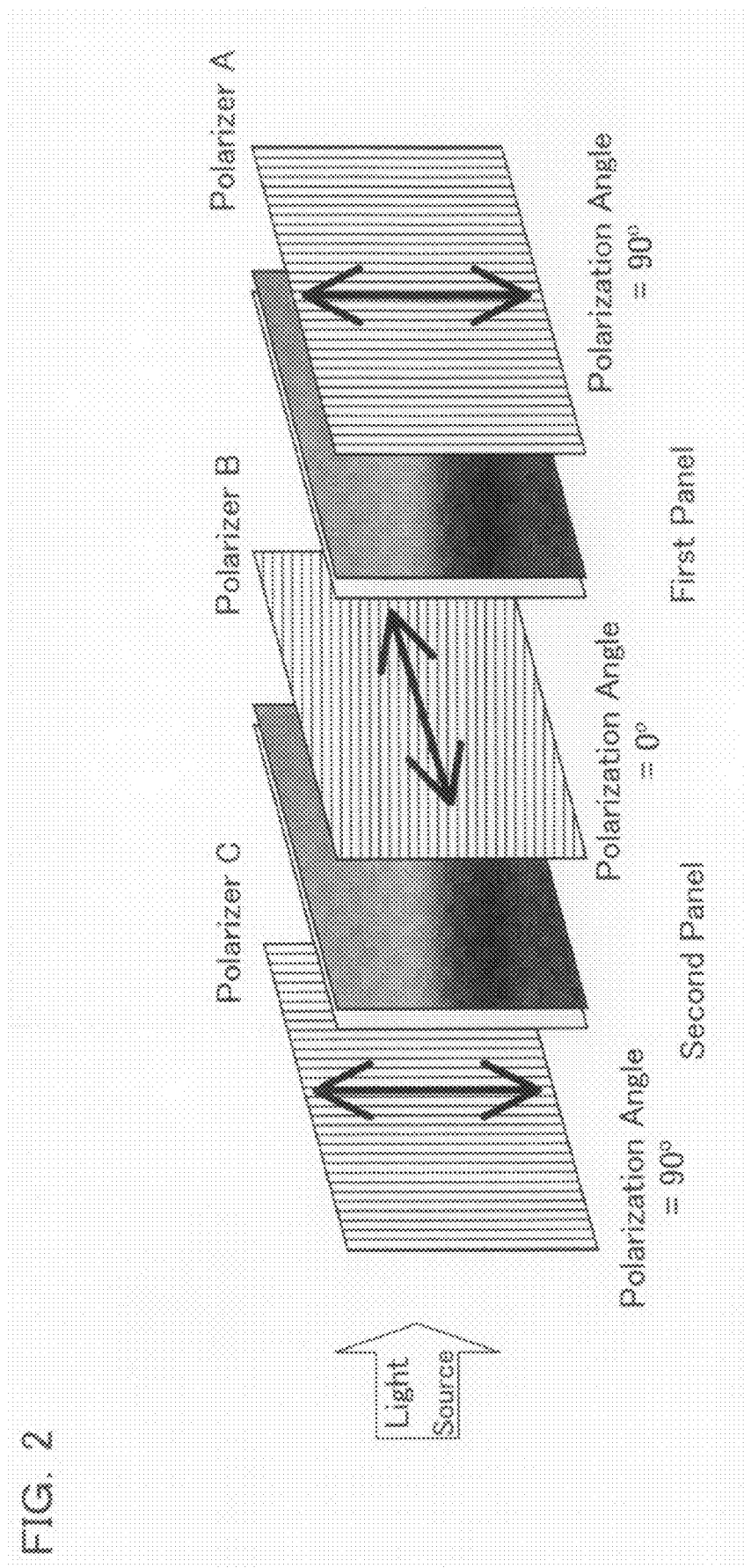
FIG. 2 illustrates the positional relationship of polarizers and panels in the liquid crystal display shown in FIG. 1.

FIG. 2 is an illustration of the joining of the polarizers and the liquid crystal panels in the liquid crystal display 100 shown in FIG. 1. In FIG. 2, the polarizers A, B, C are positioned so that the polarization axis of the polarizer B is perpendicular to those of the polarizers A, C. The polarizers A and B form a pair of crossed Nicols, and the polarizers B and C form another pair.

Each of the first and second panels is a pair of transparent substrates (a color filter substrate 220 and an active matrix substrate 230) with liquid crystal being sealed in between. Each panel has a means of switching between a state in which the polarized light incident to the polarizer A from the light source is rotated by about 90°, a state in which the polarized light is not rotated, and any intermediate states as desired, by electrically changing the alignment of the liquid crystal.

The first and second panels each have a color filter and are capable of producing an image using a plurality of pixels. This display function is achieved by some display modes: TN (twisted nematic) mode, VA (vertical alignment) mode, IPS (in-plain switching) mode, FFS (fringe field switching) mode, and combinations of these modes. Among these modes, VA is suitable because the mode exhibits high contrast without combining with any other modes. Although the description here will focus on MVA (multidomain vertical alignment) mode. IPS and FFS modes are also sufficiently effective because both operate in normally black mode. The liquid crystal is driven by active matrix driving using TFTs (thin film transistors). For a detailed description of MVA manufacturing methods, see Japanese Unexamined Patent Publication 2001-83523 (Tokukaihei 2001-83523), for example.

The first and second panels in the liquid crystal display 100 have the same structure. Each panel includes a color filter substrate 220 and an active matrix substrate 230 positioned face to face as mentioned above and also contains spacers (not shown) to maintain the substrates at a specific distance from each other. The spacers are, for example, plastic beads or resin columns erected on the color filter substrate 220. Liquid crystal is sealed between the two substrates (the color filter substrate 220 and the active matrix substrate 230). A vertical alignment film 225 is formed on the surface of each substrate which comes in contact with the liquid crystal. The liquid crystal is nematic liquid crystal with negative dielectric anisotropy.

The color filter substrate 220 includes a transparent substrate 210 with a color filter 221, a black matrix 224, and other components built on the substrate 210. The substrate 220 is provided also with alignment controlling projections 222 which control the alignment direction of the liquid crystal.

Figure 3:
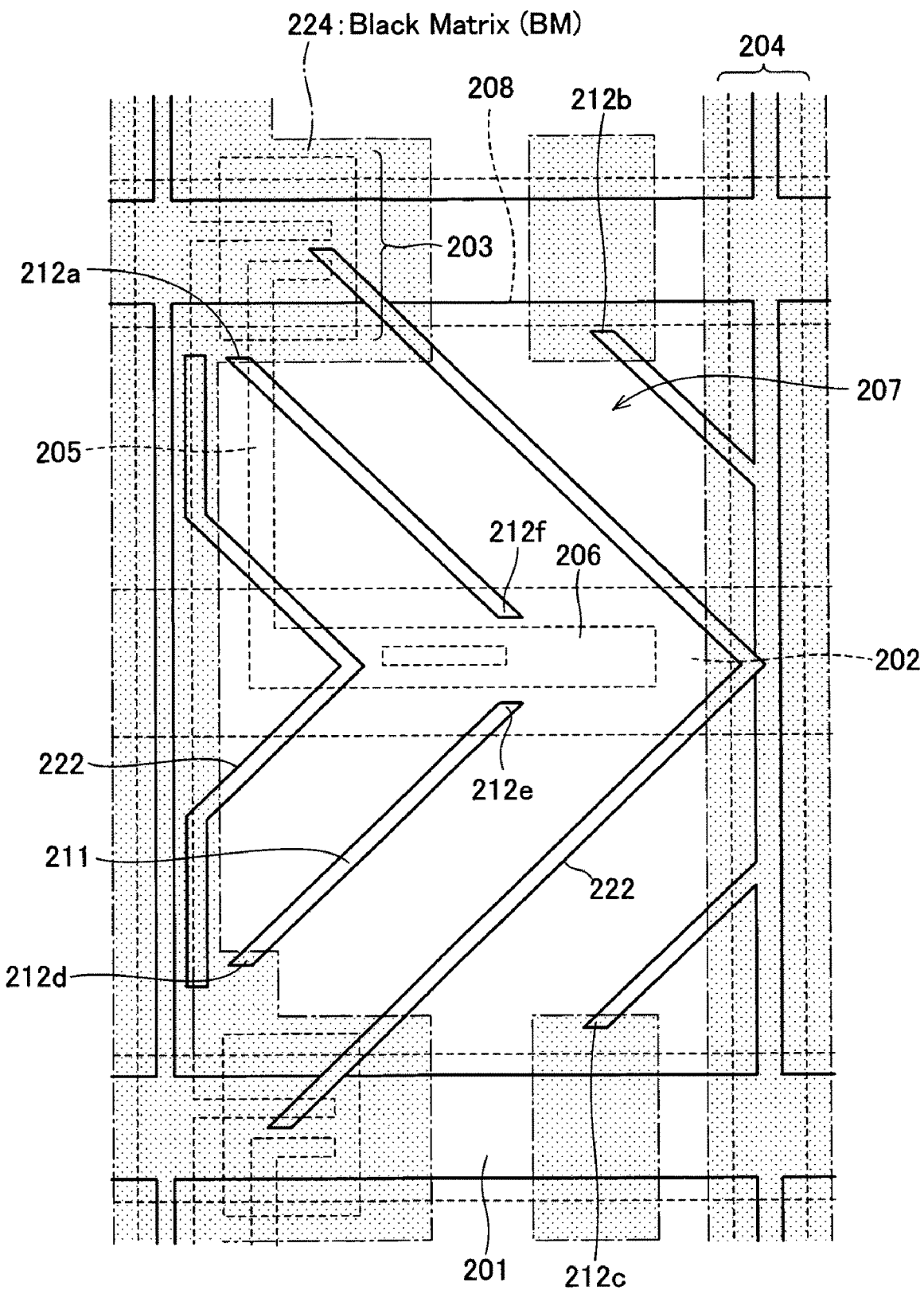
FIG. 3 is a plan view of a pixel electrode and its neighborhood in the liquid crystal display shown in FIG. 1.

The active matrix substrate 230 includes, as shown in FIG. 3, a transparent substrate 210 with TFT elements 203, pixel electrodes 208, and other components built on the substrate 210. The substrate 230 is provided also with alignment control slit patterns 211 which control the alignment direction of the liquid crystal. Note that the alignment controlling projections 222 and the black matrix 224 shown in FIG. 3 are projection of real patterns formed on the color filter substrate 220 onto the active matrix substrate 230. The black matrix 224 blocks unnecessary light which, if transmitted, would degrade display quality. As a threshold or greater voltage is applied to the pixel electrodes 208, liquid crystal molecules fall perpendicular to the projections 222 and the slit patterns 211. In the present embodiment, the projections 222 and the slit patterns 211 are formed so that liquid crystal molecules align at an azimuth of 45° with respect to the polarization axis of the polarizer.

As described in the foregoing, the first and second panels are constructed so that the red (R), green (G), and blue (B) pixels of one of the color filters 221 match those of the other color filter 221 when viewed normal to the panels. Specifically, the R pixels of the first panel match those of the second panel; the G pixels of the first panel match those of the second panel; and the B pixels of the first panel match those of the second panel, when viewed normal to the panels.

Figure 4:
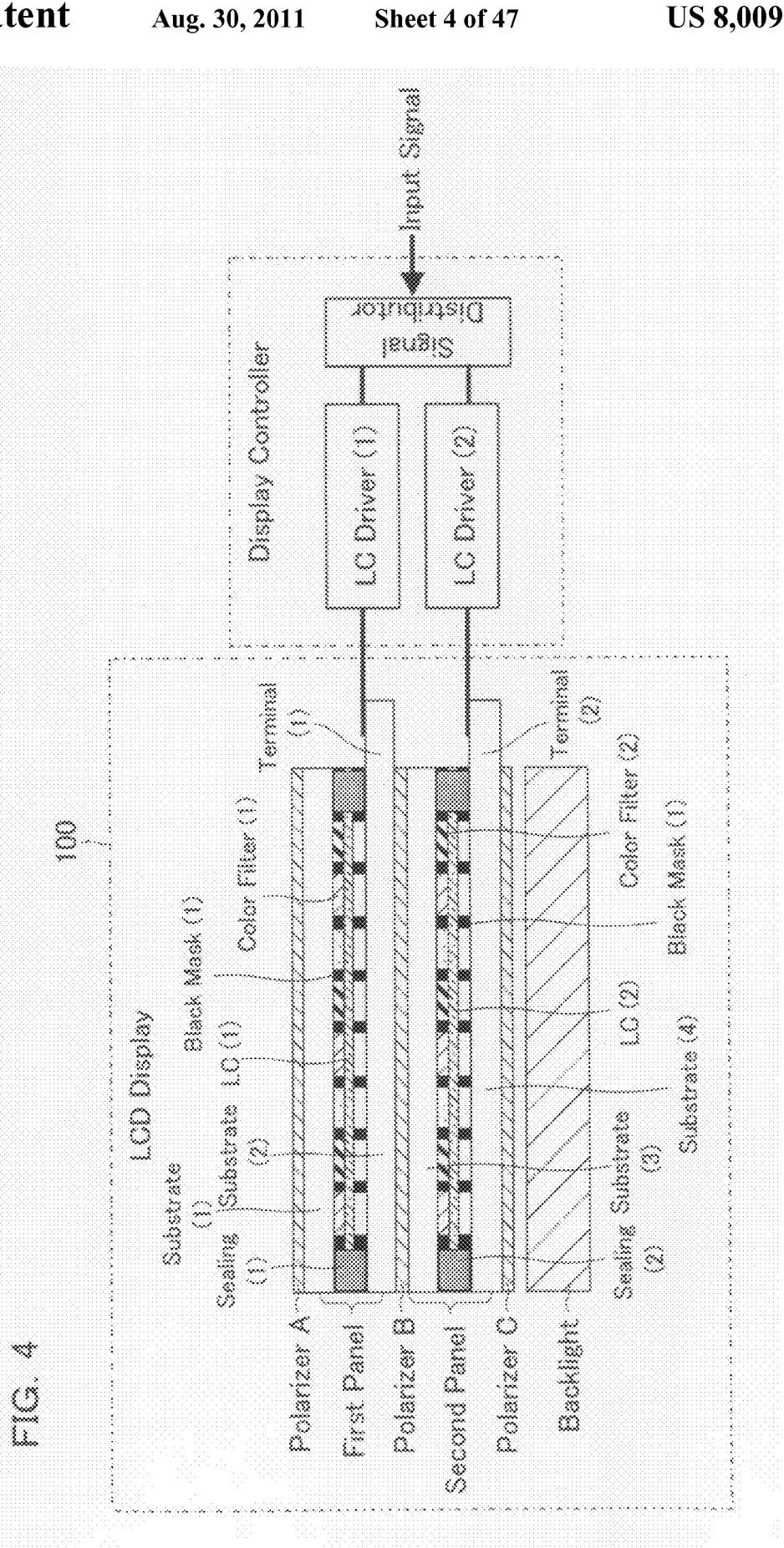
FIG. 4 is a schematic structural diagram of a drive system which drives the liquid crystal display shown in FIG. 1.

FIG. 4 is a schematic of a drive system for the liquid crystal display 100 constructed as above.

The drive system contains a display controller required to display video on the liquid crystal display 100.

As a result, the liquid crystal panel is capable of outputting suitable images according to input signals.

The display controller contains a first and a second panel drive circuit (1), (2) which drive the first and the second panel respectively with predetermined signals. The display controller also contains a signal distribution circuit section which distributes video source signals to the first and second panel drive circuits (1), (2).

The input signals refer not only to video signals from a TV receiver, VTR, or DVD player, but also to those produced by processing these signals.

Therefore, the display controller is adapted to send signals to the panels in such a manner that the liquid crystal display 100 can display suitable images.

The display controller sends suitable electric signals to the panels according to incoming video signals and is composed of drivers, circuit boards, panel drive circuits, and other components.

Figure 5:
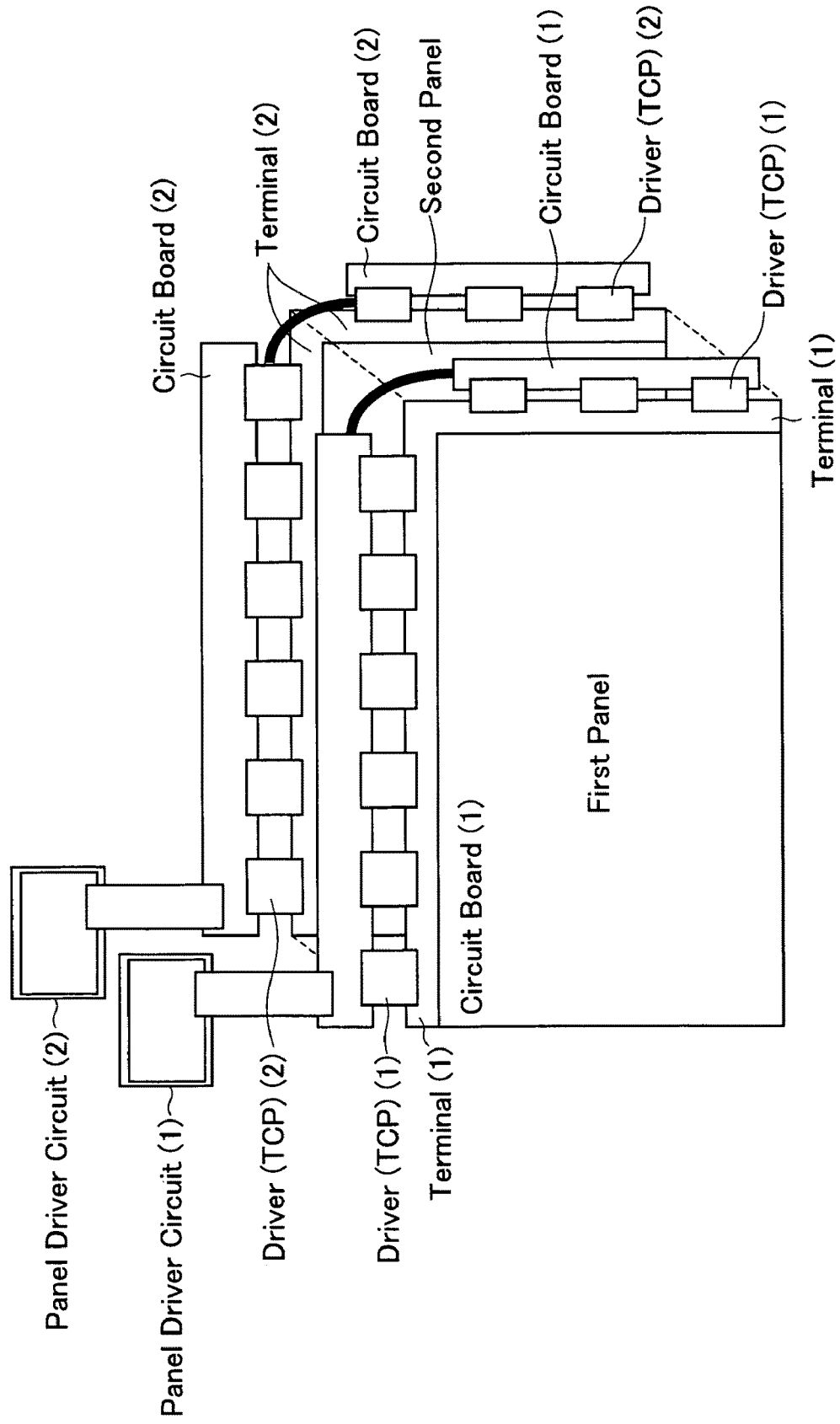
FIG. 5 illustrates connections between drivers and panel drive circuits in the liquid crystal display shown in FIG. 1.

FIG. 5 illustrates connections between the first and second panels and the respective panel drive circuits. The polarizers are omitted in FIG. 5.

The first panel drive circuit (1) is connected via a driver (TCP) (1) to terminals (1) provided on the circuit board (1) of the first panel. In other words, the driver (TCP) (1) is connected to the first panel, coupled by the circuit board (1), and connected to the panel drive circuit (1).

The second panel drive circuit (2) is connected to the second panel in the same manner as the first panel drive circuit (1) is to the first panel; no further description is given.

Next will be described an operation of the liquid crystal display 100 constructed as above.

The pixels in the first panel are driven according to display signals. The corresponding pixels in the second panel (those which appear overlapping the pixels in the first panel when viewed normal to the panels) are driven in association with the first panel. When the combination of the polarizer A, the first panel, and the polarizer B (construction 1) transmits light, so does the combination of the polarizer B, the second panel, and the polarizer C (construction 2) transmits light; when construction 1 does not transmit light, nor does the construction 2.

The first and second panels may be fed with identical image signals or associated, but different signals.

Next will be described a manufacturing method for the active matrix substrate 230 and the color filter substrate 220.

A manufacturing method for the active matrix substrate 230 will be first described.

Metal films (e.g. Ti/Al/Ti) are stacked by sputtering on a transparent substrate 10 to form scan signal lines (gate wires, gate lines, gate voltage lines, or gate bus lines) 201 and auxiliary capacitance lines 202 as shown in FIG. 3. A resist pattern is formed on the films by photolithography and dry etched in an etching gas (e.g. chlorine-based gas) to remove the resist. That simultaneously forms the scan signal lines 201 and the auxiliary capacitance lines 202 on the transparent substrate 210.

Thereafter a gate insulating film is formed of a silicon nitride (SiNx) and other materials, an active semiconductor layer of amorphous silicon and other materials, and a low resistance semiconductor layer of amorphous silicon and other materials doped with, for example, phosphor, all by CVD. Then, to form data signal lines (source wires, source lines, source voltage lines, or source bus lines) 204, drain lead-out lines 205, auxiliary capacitance forming electrodes 206, metal films (e.g. Al/Ti) are stacked by sputtering. A resist pattern is formed on the films by photolithography and dry etched in an etching gas (e.g. chlorine-based gas) to remove the resist. That simultaneously forms the data signal lines 204, the drain lead-out lines 205, and the auxiliary capacitance forming electrodes 206.

An auxiliary capacitance is formed between an auxiliary capacitance line 202 and an auxiliary capacitance forming electrode 206 with an intervening gate insulating film about 4000 angstrom thick.

Thereafter, the low resistance semiconductor layer is dry etched, for example, in a chlorine gas to form TFT elements 203 and thus separate the sources from the drains.

Next, an interlayer insulating film 207 of an acrylic-based photosensitive resin is formed by spin coating. Contact holes (not shown) which electrically connect the drain lead-out lines 205 to the pixel electrodes 208 are formed by photolithography. The interlayer insulating film 207 is about 3-μm thick.

Furthermore, pixel electrodes 208 and a vertical alignment film (not shown) are formed in this order to complete the manufacture.

The present embodiment is an MVA liquid crystal display as mentioned earlier and has slit patterns 211 in the pixel electrodes 208 made of ITO and other materials. Specifically, a film is formed by sputtering, followed by a resist pattern being formed by photolithography. Then, etching is carried out in an etching solution, e.g. iron chloride, to form pixel electrode patterns as shown in FIG. 3.

That concludes the manufacture of the active matrix substrate 230.

The reference numerals 212a, 212b, 212c, 212d, 212e, 212f in FIG. 3 represent electrical connection sections of the slit in the pixel electrode 8. In the electrical connection sections of the slit, alignment is disturbed, resulting in alignment anomaly. Besides, a positive voltage is applied to the gate wire to turn on the TFT element 203 generally for periods on the order of microseconds, whereas a negative voltage is applied to turn off the TFT element 203 generally for periods on the order of milliseconds; a negative voltage is applied for most of the time. Thus, if the slits 212a to 212d are disposed on the gate wires, ionic impurities contained in the liquid crystal may concentrate due to a gate negative DC application component. The alignment anomaly and ionic impurity concentration may cause the slits 212a to 212d to be spotted as display non-uniformities. The slits 212a to 212d therefore need to be disposed so that they do not overlap the gate wires. The slits 212a to 212d are better hidden with the black matrix 224 as shown in FIG. 3.

Next will be described a manufacturing method for the color filter substrate 220.

The color filter substrate 220 contains a color filter layer, an opposite electrode 223, a vertical alignment film 225, and an alignment controlling projections 222 on the transparent substrate 210. The color filter layer contains the color filters (three primary colors [red, green, and blue]) 221 and the black matrix (BM) 224.

First, a negative, acrylic-based photosensitive resin solution containing dispersed fine carbon particles is applied onto the transparent substrate 210 by spin coating and dried to form a black photosensitive resin layer. Subsequently, the black photosensitive resin layer is exposed to light using a photo mask and developed to form the black matrix (BM) 224. The BM is formed so as to have respective openings for a first color layer (e.g. red layer), a second color layer (e.g. green layer), and a third color layer (e.g. blue layer) in areas where the first, second, and third color layers will be provided (the openings are provided corresponding to the pixel electrodes). More specifically, referring to FIG. 3, a BM pattern is formed like an island, and a light blocking section (BM) is formed on the TFT elements 203. The BM pattern shields from light anomalous alignment regions which occur in the slits 212a to 212d of electrical connection sections in the slit 212a to 212f in the pixel electrodes 208. The light blocking section prevents increases in leak current induced by external light hitting the TFT elements 203.

After applying a negative, acrylic-based photosensitive resin solution containing a dispersed pigment by spin coating, the solution is dried, exposed to light using a photo mask, and developed to form a red layer.

The same steps are repeated to form the second color layer (e.g. green layer) and the third color layer (e.g. blue layer). That completes the manufacture of the color filters 221.

Furthermore, the opposite electrode 223 is formed of a transparent electrode, such as ITO, by sputtering. A positive, phenolnovolak-based photosensitive resin solution is then applied by spin coating. The solution is dried, exposed to light using a photo mask, and developed to form the vertical alignment controlling projections 222. Then, columnar spacers (not shown) are formed to establish a cell gap for the liquid crystal panel by applying an acrylic-based photosensitive resin solution, exposing the solution to light using a photo mask, and developing and curing the resin.

That completes the manufacture of the color filter substrate 220.

The present embodiment uses a BM made of resin. The BM may be made of metal. The three primary colors of the color layers may not be red, green, and blue; they may be cyan, magenta, and yellow as an example, and there also may be provided a white layer.

Now, the color filter substrate 220 and the active matrix substrate 230 manufactured as above are joined to form a liquid crystal panel (first and second panels) by the following method.

First, a vertical alignment film 225 is formed on the surfaces of the color filter substrate 220 and the active matrix substrate 230 which come in contact with the liquid crystal. Specifically, before the formation of the alignment film, the substrate is baked for degassing and washed. The alignment film is then applied and baked. After that, the substrate is washed and baked for degassing. The vertical alignment films 225 establish the alignment direction of the liquid crystal 226.

Next will be described a method for sealing the liquid crystal between the active matrix substrate 230 and the color filter substrate 220.

One of available liquid crystal sealing methods is vacuum injection, which is described here briefly: A thermosetting sealing resin is disposed around the substrate with an injection hole being left open for the injection of liquid crystal. The injection hole is immersed in liquid crystal in vacuum to drive out air from the closed space so that the liquid crystal can move in instead. Finally, the injection hole is also sealed using, for example, a UV-setting resin. The vacuum injection however is undesirably time-consuming for the manufacture of a liquid crystal panel for vertical alignment mode, compared to the manufacture of a horizontal alignment panel. Dropwise liquid crystal dispensing/joining is employed here.

A UV-setting sealing resin is applied to the periphery of the active matrix substrate whilst liquid crystal is dispensed dropwise onto the color filter substrate. An optimal amount of liquid crystal is dispensed dropwise regularly inside the sealing so that the liquid crystal establishes a desired cell gap.

The pressure inside the joining device is reduced to 1 Pa to join the color filter substrate which has the sealing resin disposed thereon and the active matrix substrate which has the liquid crystal dispensed dropwise thereon. After the substrates are joined to each other at the low pressure, The pressure is changed back to the atmospheric pressure to collapse the sealing, leaving a desired gap in the sealing section.

The resultant structure with a desired cell gap in the sealing section is irradiated with UV radiation in a UV projection device for preliminary setting of the sealing resin. The structure is then baked in order to completely set the sealing resin. At this stage, the liquid crystal moves into every corner inside the sealing resin, filling up the cell. After the baking, the structure is separated into individual liquid crystal panels. That completes the manufacture of the liquid crystal panel.

In the present embodiment, the first and second panels are manufactured by the same process.

Next will be described the mounting of components to the first and second panels manufactured as above.

Here, the first and second panels are washed, and polarizers are attached to the panels. Specifically, polarizers A and B are attached respectively to the front and the back of the first panel as shown in FIG. 4. A polarizer C is attached to the back of the second panel. The polarizers may be stacked together with other layers, such as optical compensation sheets, where necessary.

Then drivers (liquid crystal driver LSI) are connected. Here, the drivers are connected using TCPs (tape career packages).

For example, An ACF (anisotropic conductive film) is attached to the terminals (1) of the first panel by preliminary compression as shown in FIG. 5. The TCPs (1) carrying the drivers are punched out of the carrier tape and aligned with panel terminal electrodes, and heated for complete compression/attachment. Thereafter, the input terminals (1) of the TCPs (1) are connected to the circuit board (1) using an ACF. The circuit board (1) is provided to couple the driver TCPs (1) together.

Next, two panels are joined. The polarizer B has an adhesive layer on each side. The surface of the second panel is washed, and the laminates of the adhesive layers of the polarizer B on the first panel are peeled off. The first panel and second panels, after being precisely aligned, are joined. Bubbles may be trapped between the panel and the adhesive layer during the joining process; it is therefore desirable to join the panels in vacuum.

Alternatively, the panels may be joined by another method as follows. An adhesive agent which sets at normal temperature or at a temperature not exceeding the panel's thermal resistance temperature (e.g. epoxy adhesive agent) is applied to the periphery of the panels. Plastic spacers are scattered, and, for example, fluorine oil is sealed. Preferred materials are optically isotropic liquids with a refractive index close to that of a glass substrate and as stable as liquid crystal.

The present embodiment is applicable to cases where the terminal face of the first panel and that of the second panel are at the same position as illustrated in FIGS. 4 and 5. The terminals may be disposed in any direction with respect to the panel and attached to the panel by any method. For example, they may be fixed mechanically without using adhesive.

To reduce the parallax caused by the thickness of the internal glass, the substrates of the two panels which face each other are preferably reduced in thickness to a minimum.

If glass substrates are used, thin substrates are straightly available on the market. Feasible substrate thicknesses may vary from one manufacturing line to another and depending on the dimensions of the liquid crystal panel and other conditions. An example is 0.4-mm thick glass for inner substrates.

The glass may be polished or etched. Glass can be etched by publicly known techniques (e.g. Japanese Patents 3524540 and 3523239). Typically, a chemical treatment solution such as a 15% aqueous solution of hydrofluoric acid is used. Any parts which should not be etched including the terminal face are coated with an acid-proof, protective material. The glass is then immersed in the chemical treatment solution for etching, after which the protective material is removed. The etching reduces the thickness of the glass to about 0.1 mm to 0.4 mm.

After joining the two panels, a lighting system called a backlight is attached to complete the manufacture of the liquid crystal display 100.

Now, the following will describe concrete examples of the lighting system which are suitable to the present invention. The present invention is however not limited to the arrangement of the lighting system discussed below; any changes may be made where necessary.

Figure 6:
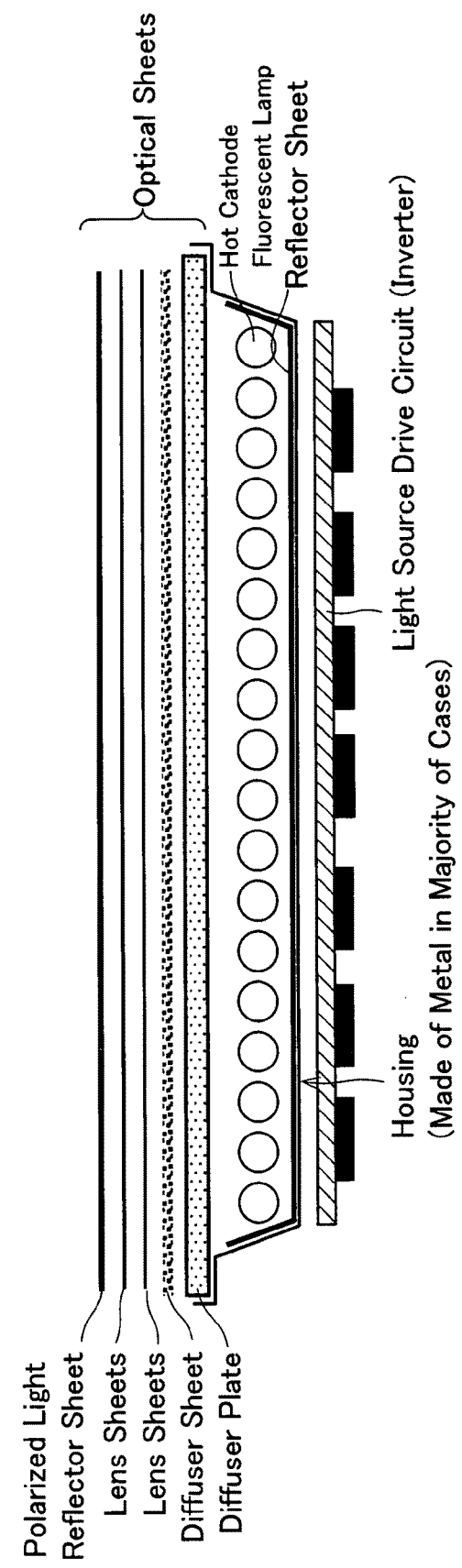
FIG. 6 is a schematic structural diagram of a backlight provided in the liquid crystal display shown in FIG. 1.

The liquid crystal display 100 of the present invention, due to its display mechanism, needs a more powerful backlight than conventional panels. In addition, the display 100 absorbs notably more of short wavelengths than conventional panels; the light source should be a blue one that emits more intense light at short wavelengths. FIG. 6 shows an example of the lighting system which meets these conditions.

Hot cathode fluorescent lamps are used for the liquid crystal display 100 of the present invention to obtain luminance similar to conventional panels. The prominent feature of the hot cathode fluorescent lamp is that it outputs about 6 times as intense light as a cold cathode fluorescent lamp with typical specifications.

Taking a 37-inch WXGA-format display as an example of the standard liquid crystal display, 18 of the lamps are arranged on an aluminum housing. Each lamp has an external diameter (=φ) of 15 mm. The housing includes a white reflector sheet made of resin foam for efficient usage of the light emitted backward from the lamps. The power supply for the lamps is provided on the back of the housing to drive the lamps on the household power supply.

Next, a translucent white resin plate is necessary to eliminate images of the lamps in the housing because the lamps are used for direct backlighting. A 2-mm thick plate member made primarily of polycarbonate is placed on the housing for the lamps. Polycarbonate exhibits high resistance to wet warping and heat deformation. On top of the member are provided optical sheets (namely, from the bottom, a diffuser sheet, two lens sheets, and a polarized light reflector sheet), so as to achieve predetermined optical effects. With these specifications, the backlight is about 10 times as bright as typical conventional specifications: i.e., 18 cold cathode fluorescent lamps ($\phi$=4 mm), two diffuser sheets, and a polarized light reflector sheet. The 37-inch liquid crystal display of the present invention is hence capable of about 400 cd/m² luminance.

The backlight dissipates as much as 5 times more heat than a conventional backlight. The heat is progressively dissipated to air from a fin and forcefully ejected through air flow created by a fan, both being provided on the back of the back chassis.

The mechanical members of the lighting system double as major mechanical members for a whole liquid crystal module. The fabricated panels which already have a complete set of components mounted thereto is attached to the backlight. A liquid crystal display controller (including panel drive circuits and signal distributors), a light source power supply, and in some cases a general household power supply are also attached to completes the manufacture of the liquid crystal module. The backlight is attached to the fabricated panels which already have a complete set of components mounted thereto, and a frame work is disposed to hold the panels together. That completes the manufacture of the liquid crystal display of the present invention.

The present embodiment uses a direct backlighting system using a hot cathode fluorescent lamp. Alternatively, the lighting system, depending on application, may be of a projection type or an edge-lit type. The light source may be cold cathode fluorescent lamps, LEDs, OELs, or electron beam fluorescence tubes. Any optical sheets may be selected for a suitable combination.

In the embodiment above, the slits are provided in the pixel electrodes of the active matrix substrate, and the alignment controlling projections are provided on the color filter substrate, so as to control the alignment direction of the vertical alignment liquid crystal molecules. As another embodiment, the slits and projections may be transposed. Furthermore, slits may be provided in the electrodes of both substrates. An MVA liquid crystal panel may be used which has alignment controlling projections on the surfaces of the electrodes of both the substrates.

Figure 52:
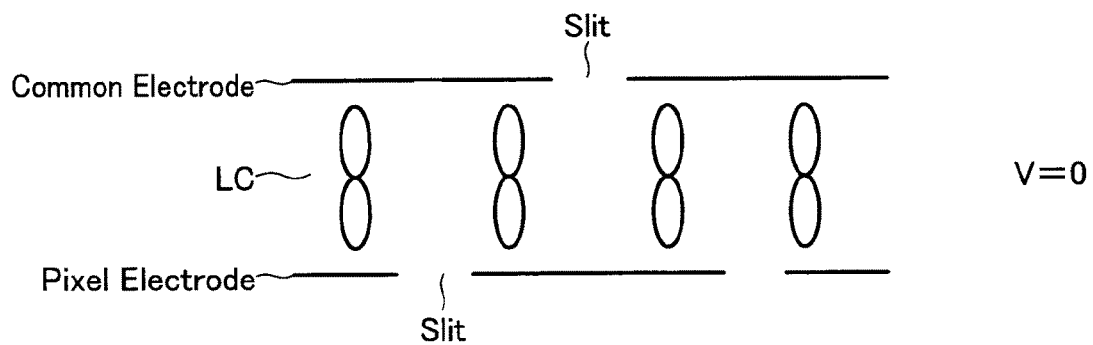
FIG. 52(a) illustrates PVA mode when no voltage is being applied to electrodes.
FIG. 52(b) illustrates PVA mode when no voltage is being applied to electrodes.
Figure 52:
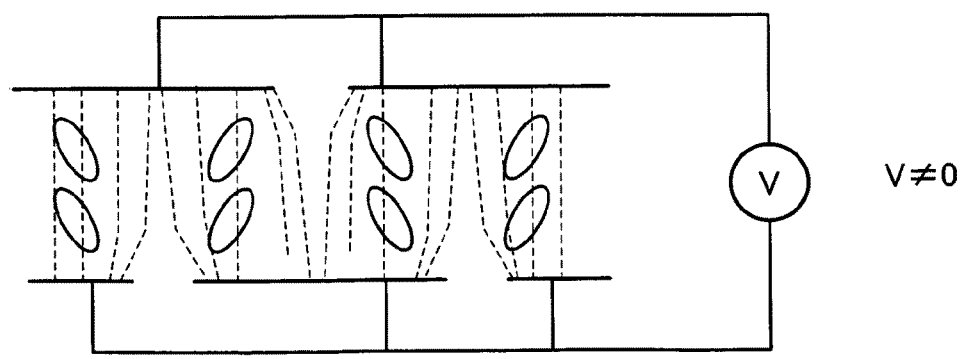

FIGS. 52(a), (b) shows schematic cross-sectional views of a structure in which the electrodes of both substrates have slits, or PVA (patterned vertical alignment) mode. The alignment film is a vertical alignment film. The liquid crystal has negative dielectric anisotropy. FIG. 52(a) shows a state where no voltage is being applied; the liquid crystal is standing upright. FIG. 52(b) shows a state where a voltage is being applied; the tilt direction of the liquid crystal is specified through an oblique electric field produced by the slits in the electrodes. The same polarizer angles can be used in PVA mode as in MVA mode.

Besides the MVA type, a pair of vertical alignment films may be used which establish orthogonal pre-tilt directions (alignment treatment directions). Alternatively, VA mode in which liquid crystal molecules twist-aligned may be used. VATN mode, mentioned earlier, may also be used. VATN mode is preferable in the present invention because contrast is not reduced by the light leaking through the alignment controlling projections. The pre-tilt is established by, for example, optical alignment.

Figure 7:
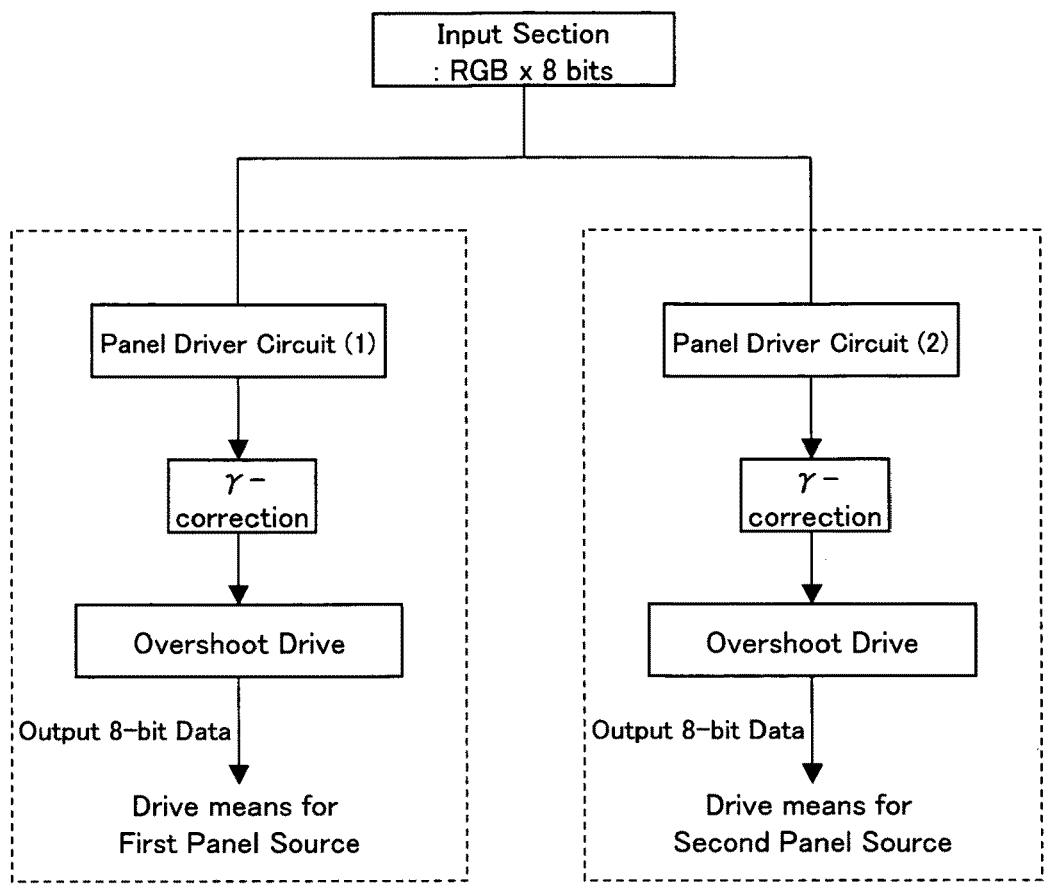
FIG. 7 is a block diagram of a display controller, a drive circuit which drives the liquid crystal display shown in FIG. 1.

Referring to FIG. 7, the following will describe a concrete example of a driving method implemented by the display controller of the liquid crystal display 100 constructed as above. Assume 8-bit (256 gray levels) inputs and 8-bit liquid crystal drivers.

The panel drive circuit (1) in the display controller section performs γ-correction, overshooting, and other drive signal processing on input signals (video source) to output 8-bit gray level data to a source driver (source drive means) for the first panel.

Meanwhile, the panel drive circuit (2) performs γ-correction, overshooting, and other signal processing to output 8-bit gray level data to a source driver (source drive means) for the second panel.

Both the first and second panels are able to handle 8-bit data; the resultant output is 8-bit images. The output and input signals have a one-to-one relationship. Input signals are faithfully reproduced.

According to patent document 7, when the gray level changes from a low to a high, the gray level on each panel does not increase continuously. For example, when the luminance increases from 0 to 1, 2, 3, 4, 5, 6, . . . , the gray levels on the first and second panels change from (0, 0) to (0, 1), (1, 0), (0, 2), (1, 1), (2, 0) . . . . Notation (n, m) indicates that the gray level on the first panel is n, whilst the gray level on the second panel is m. Thus, the gray level on the first panel changes from 0 to 0, 1, 0, 1, 2. The gray level on the second panel changes from 0 to 1, 0, 2, 1, 0. Neither gray levels increase monotonously. However, overdrive and many other signal processing technologies for liquid crystal displays require that gray level changes to be monotonous because the technologies use algorithm which involves interpolation calculations. To handle the non-monotonous changes, all the gray level data should be stored in memory. That may lead to increased circuit complexity and cost for display control circuitry and ICs.

Joining the first and second panels as described above leads to noticeable moire pattern occurrences due to relative dislocation of pixels of the two panels. Joining two panels with exact pixel matching is generally very difficult. Since glass and other materials have non-zero thickness, parallax is another cause for moire patterns.

The present invention will discuss prevention of moire patterns which accompany the joining of two panels in the following embodiments.

Embodiment 1

The present embodiment will describe lowering moire pattern occurrences by providing a light diffusion layer in the liquid crystal display 100.

First will be described the results of experiments on the relationship between moire pattern occurrences and haze in a light diffusion layer and also on the crispness of a black display under those conditions.

Figure 18:
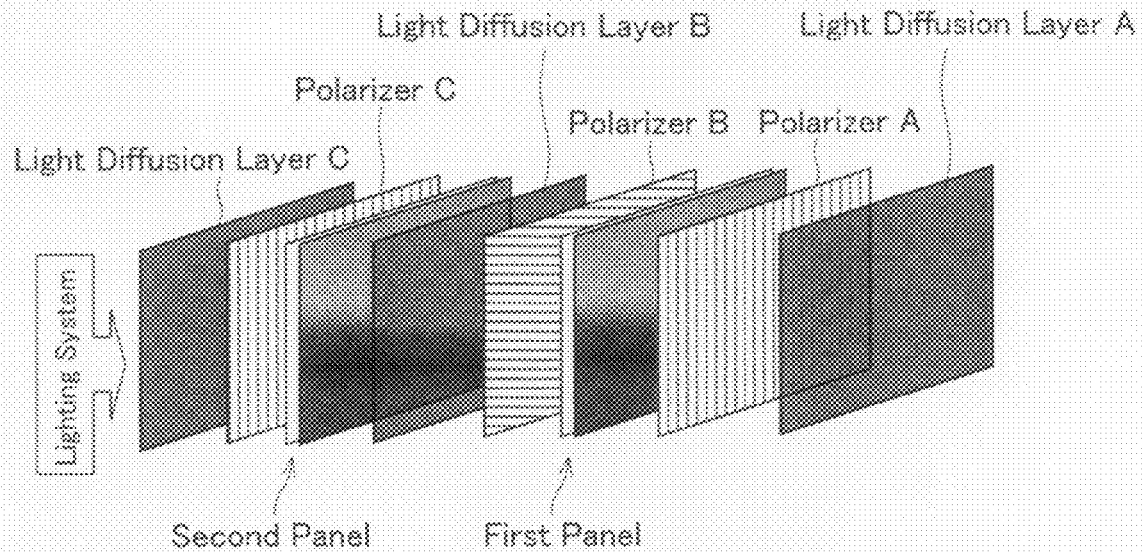
FIG. 18 illustrates a panel structure example with which the experimental results in FIG. 17 were obtained.
Figure 19:
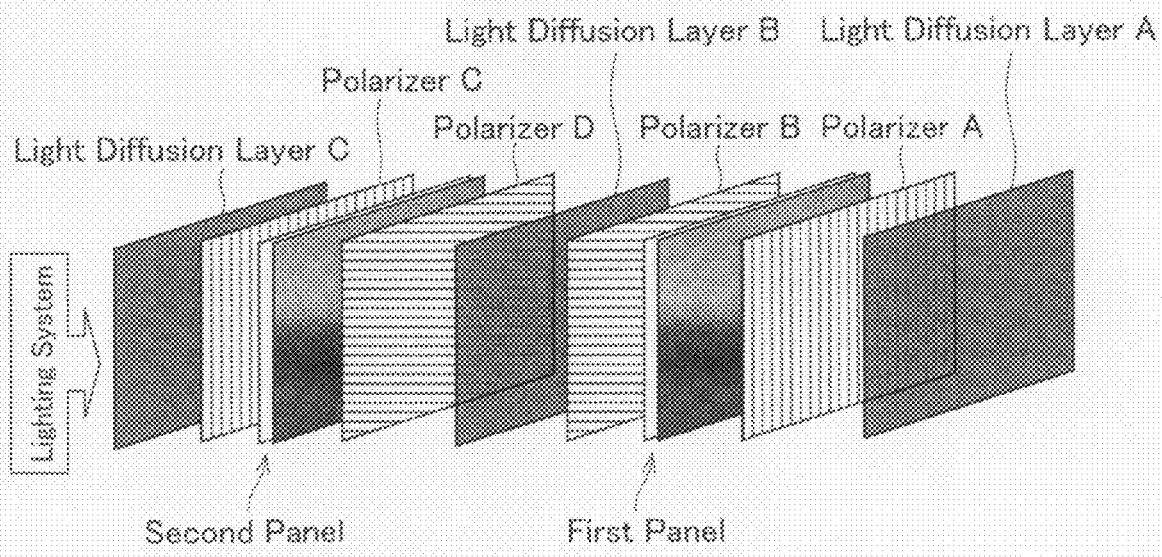
FIG. 19 illustrates a panel structure example with which the experimental results in FIG. 17 were obtained.

FIG. 17 shows the results of the experiments (result 1 to result 3). FIGS. 18, 19 show panel structures (experimental systems) used in the experiments. Two test panel models were used: (1) a 37-inch WXGA-format panel (Resolution=1366× RGB×768; Pixel dimensions (width×height)=200 μm×600 μm) and (2) a 37-inch full HDTV ("Full HD"; Resolution=1920×RGB×1080; Pixel dimensions (width×height)=142.25 μm×426.75 μm). In each version, a color panel was disposed on the front side, and a black and white panel was disposed on the back side. Both were attached to the backlight. The B&W panel was identical to the color panel, except that the B&W panel contained no color layer. The panels were evaluated visually. Haze was measured using an MDH 2000 (manufactured by Nippon Denshoku Industries Co., Ltd.) in accordance with JIS K 7361-1: 2000. Effects of the combination of the black and white panel and the color panel and the driving methods for the panels will be described later in embodiments. Note that the light diffusion layer was capable of reducing moire pattern occurrences for any combination of a black and white panel and a color panel.

Result 1 in FIG. 17 demonstrates that in the experimental system shown in FIG. 18, pixel moire patterns were mitigated if layer A showed 50% haze even when remaining layers B, C showed 0% haze. If layer A showed 56% haze, the moire patterns were further mitigated. If layer A showed 72% or more haze, the moire patterns were no longer a problem. Result 2 demonstrates that the provision of a diffusion layer on the display plane side of polarizer A enabled sufficiently crisp blacks. The provision of a diffusion layer only in layer B mitigated moire patterns if the haze was 56%. The provision of a diffusion layer in both layers A, B mitigated moire patterns if both layers A, B showed 36% haze. The moire patterns were further mitigated if both layers A, B showed 50% or more haze. The moire patterns were no longer a problem if both layers A, B showed 56% or more haze.

There was difference in moire pattern intensity between sample (1) (37-inch WXGA-format panel) and sample (2) (37-inch Full HD). In both samples, the moire patterns become less intense with increasing haze; the differences were probably caused by resolution and pixel dimensions.

Result 2 in FIG. 17 demonstrates that in the experimental system shown in FIG. 18, moire patterns did not pose any problems if layer A showed 56% haze and layer B showed 56% haze. Under the same conditions, however, blacks appeared less crisp. If layer A showed 56% haze and layer B showed 80% haze, blacks appeared even less crisp. The degradation was probably caused by depolarization by layer B. For better contrast, the haze of layer B was preferably 80% or less.

Result 3 in FIG. 17 demonstrates that in the experimental system shown in FIG. 19 in which the light diffusion layer of layer B was interposed between polarizers, pixel moire patterns were almost completely eliminated if both layer A, B showed 56% haze. Under the same conditions, blacks were sufficiently crisp.

Based on these results of experiments, the following will specifically describe an light diffusion layer arrangement and its effects.

Figure 20:
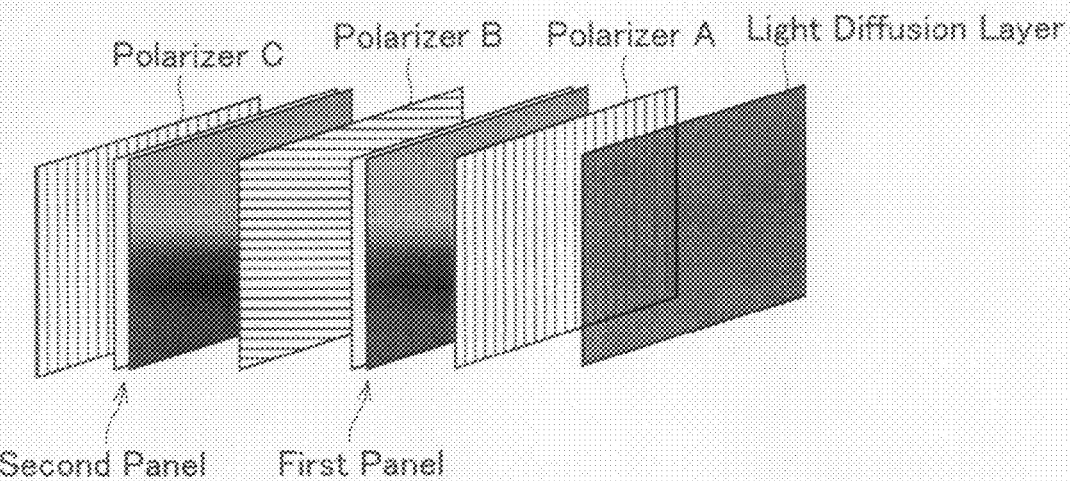
FIG. 20 illustrates an embodiment of the present invention in which a light diffusion layer is placed before a polarizer of the first panel as an example.
Figure 21:
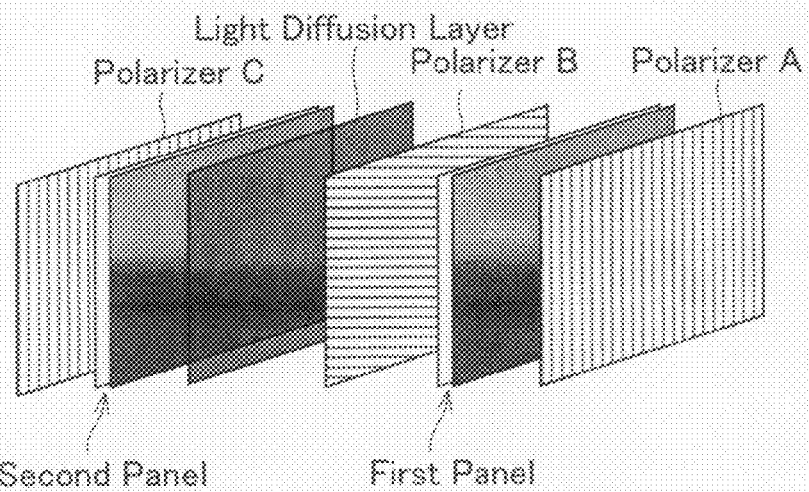
FIG. 21 illustrates an embodiment of the present invention in which a light diffusion layer is placed before the second panel as an example.
Figure 22:
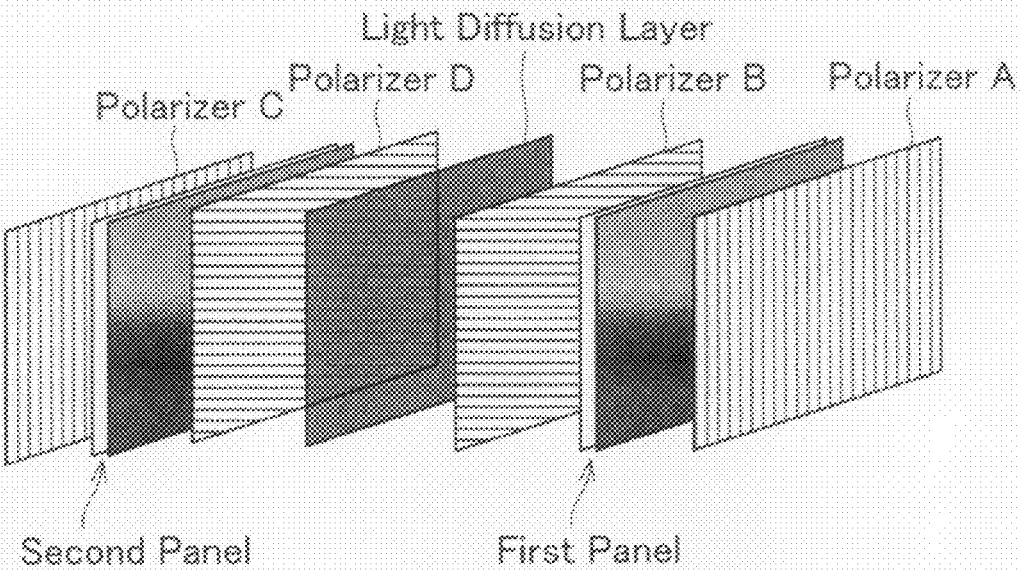
FIG. 22 illustrates an embodiment of the present invention in which a light diffusion layer is placed between a polarizer of the first panel and a polarizer of the second panel as an example.

The light diffusion layer might be placed, for example, further outside polarizer A as shown in FIG. 20. Alternatively, as shown in FIG. 21, the light diffusion layer might be placed between the second panel and polarizer B. Most preferably, another polarizer D was placed between the second panel and polarizer B, and the light diffusion layer was placed between polarizers D, B as shown in FIG. 22. Polarizers D, B formed parallel Nicols.

The light diffusion layer was fabricated by adding silica beads or other transparent particles of aluminum oxide, titanium oxide, etc. to a base material, such as an acrylic-based setting resin layer, a TAC (triacetyl cellulose) film, or a PET (polyethylene terephthalate) film, and setting the mixture.

In the configuration shown in FIG. 20, large moire patterns with cyclic intervals on the order of millimeters to centimeters or greater needed to be smudged. Results 1, 2 in FIG. 17 demonstrate that effects were observed when layer A showed 50% or more haze. Preferably, a light diffusion layer with 42% haze and another with 56% haze were joined to form a light diffusion layer which showed 73% haze and delivered the most suitable quality as a display.

In the configuration shown in FIG. 21, fine structural information with cyclic intervals on the order of about tens to hundreds of micrometers needed to be smudged. Result 2 in FIG. 17 demonstrates that effects were observed when the light diffusion layer had 56% haze.

However, in the configuration shown in FIG. 21, the loss of crispness in blacks due to depolarization by panels had a negative correlation with moire pattern mitigating effects. Therefore, it was difficult to use a light diffusion layer which showed strong haze.

Result 3 in FIG. 17 demonstrates that the configuration shown in FIG. 22 mitigated moire patterns as much as the configuration shown in FIG. 21 and produced blacks as crisp as, or even crisper than, the configuration shown in FIG. 20.

Results 1, 2 in FIG. 17 demonstrate that in the configuration shown in FIG. 18, a combination of diffusion layers B, A, both showing 36% to 50% haze, which causes relatively weak depolarization, mitigated moire patterns and produced crisp blacks, achieving a high quality display. Diffusion layer C might be omitted.

The light diffusion layer might be a transparent layer with a rough surface. In that case, the configuration of the portion which contacts an air layer shown in FIG. 20 was inexpensive, but still capable of reliable light diffusion effects.

The light diffusion layer might contain diffusion particles being dispersed therein, the particles differing in refractive index from a base material having a 370 nm or greater average particle diameter. When that was the case, light with 555 nm or near wavelengths, to which the human eye was most sensitive in the visible range and by which human visual recognition was dominantly affected, had a wavelength of 555/1.5=370 nm in a member which had a refractive index of 1.5. The member scattered the light by refraction.

The light diffusion layer might contain diffusion particles being dispersed therein, the particles differing in refractive index from a base material having a 520 nm or greater average particle diameter. When that was the case, light with a 780 nm wavelength, which was on the upper edge of the visible range, had a wavelength of 780/1.5=520 nm in a member which had a refractive index of 1.5. The member scattered the whole visible range of light by refraction.

The light diffusion layer might contain diffusion particles being dispersed therein, the particles differing in refractive index from a base material having a 3.7 µm or greater average particle diameter. When that is the case, every wavelength in the whole visible range of light was equally scattered in a stable manner by refraction if the average particle diameter was 10 times larger than the visible ray scattering condition.

Figure 23:
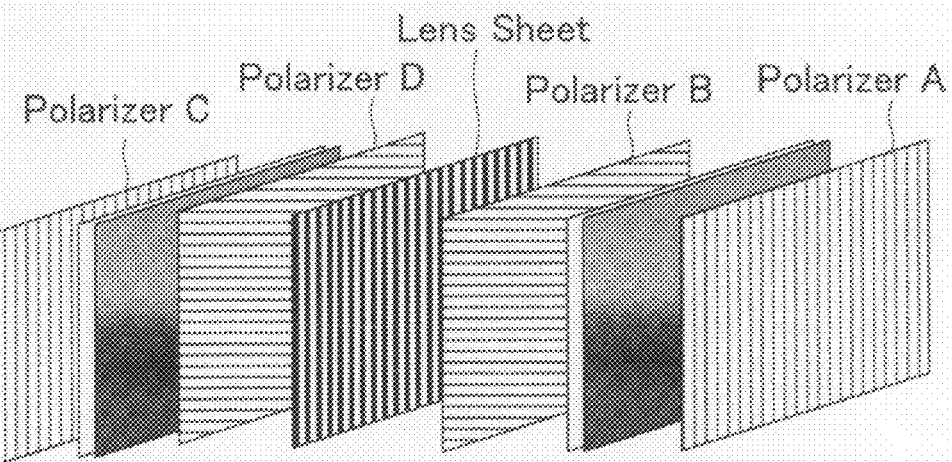
FIG. 23 illustrates an embodiment of the present invention in which a lens sheet as a light diffusion layer is placed between a polarizer of the first panel and a polarizer of the second panel as an example.

The present invention was applicable to structures other than those in which light was diffused in all directions as shown in FIG. 23. A layer might be used which well diffused light in a direction perpendicular to a structure which dominated moire pattern creation or in a direction parallel to moire stripes. A specific example was a layer (lens sheet) of a prism shape parallel to those structures or stripes. The layer might be used in combination with the aforementioned diffusion layer.

Haze is created, for example, by increasing the density of scattering particles, increasing the refractive index of the scattering particles, optimizing an average particle diameter, or increasing the thickness of base material. Any degree of haze, from 0% to near 98% m, is available with any of these methods.

Embodiment 2

In the present embodiment, at least one of the inner transparent substrates is rendered thinner than the outer transparent substrates so as to restrain moire pattern occurrences in the liquid crystal display containing a combination of liquid crystal panels.

Figure 24:
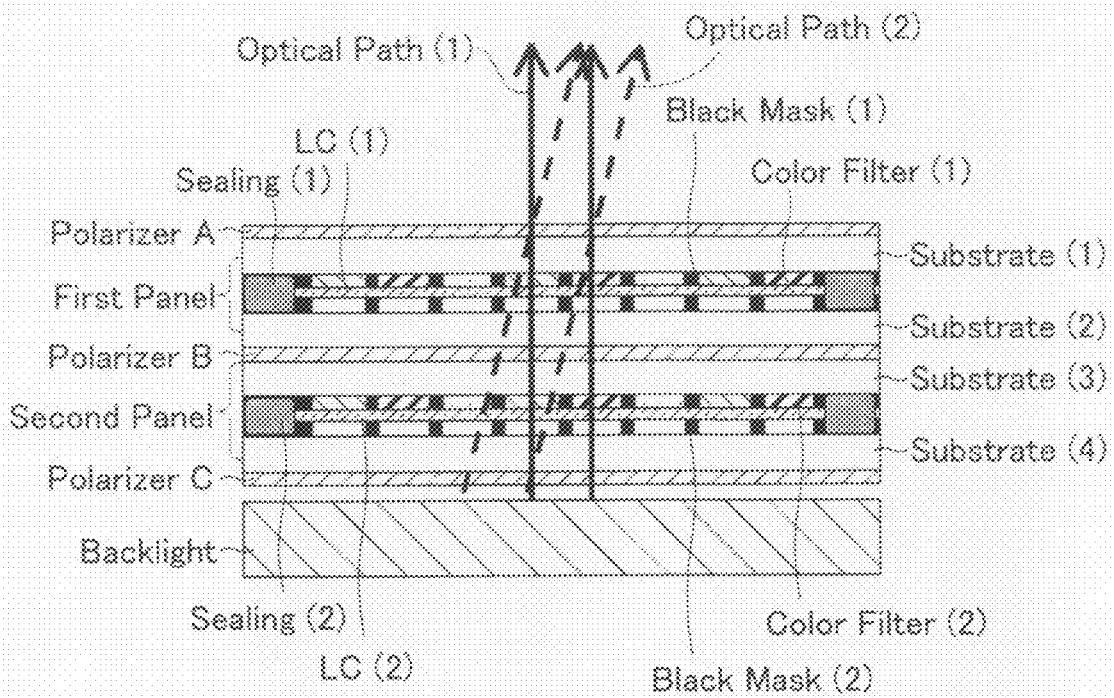
FIG. 24 is a schematic cross-sectional view of the mechanism of moire patterns occurring in a liquid crystal display with two liquid crystal panels.

FIG. 24 shows the same liquid crystal display 100 as the one in FIG. 3 with optical paths added.

The liquid crystal display 100 in FIG. 24 has two possible optical paths depending on viewing angle: optical path (1) for the viewer in the front direction and optical path (2) for the viewer at an oblique angle. The light traveling along optical path (1) appears normal to the viewer. Meanwhile, the light traveling along optical path (2) may appear off-color or produce a non-uniform image depending on the angle and the type of image because the light passes an adjacent pixel in the second panel. This is the moire attributable to parallax.

Figure 25:
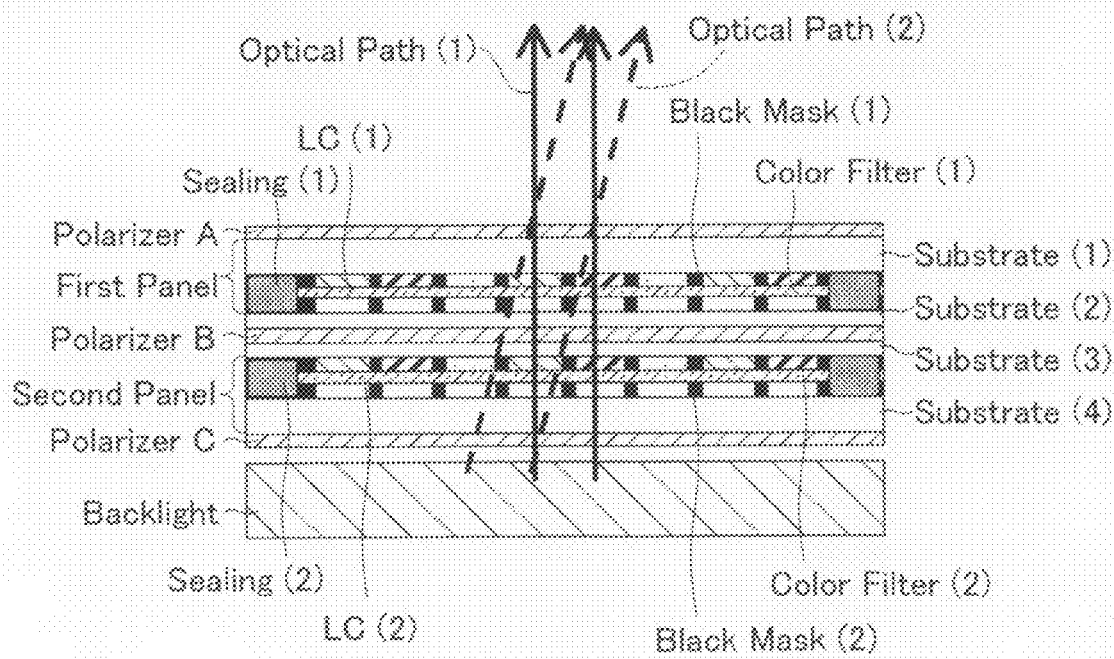
FIG. 25 is a schematic cross-sectional view of a structure of a liquid crystal display with two liquid crystal panels in which the occurrence of moire patterns is restrained.

In the example shown in FIG. 25, the inner substrates (2), (3) are thinner than the outer substrates (1), (4). The black mask (BM) in the second panel better blocks the light along the same oblique optical path as the one in FIG. 24. That widens the range of angle at which images appear normal when compared to the case in FIG. 24. Thus, the moire pattern occurrences at oblique angles attributable to parallax are restrained.

If the problems caused by parallax are the only problems that should be addressed, they can be addressed, for example, by making the inner substrates (2), (3) from glass with a large refractive index.

The mechanical strength of the panels can be secured by the outer substrates (1), (4).

If glass substrates are to be used, thin glass substrates available on the market may be used straightly. Feasible thicknesses for the substrates may vary depending on manufacturing lines or liquid crystal panel sizes. As an example, 0.4-mm thick glass may be used as the substrates 3, 4, and a 0.7-mm thick glass as the substrates 1, 4.

The glass may be polished or etched. Glass can be etched by publicly known techniques (e.g. Japanese Patents 3524540 and 3523239). Typically, a chemical treatment solution such as a 15% aqueous solution of hydrofluoric acid is used. Any parts which should not be etched including the terminal faces are coated with an acid-proof protective material. The glass is then immersed in the chemical treatment solution for etching, after which the protective material is removed. The etching reduces the thickness of the glass to about 0.1 mm to 0.4 mm.

In the present embodiment, the internal glass substrates (substrates 2, 3) are etched so that they are thinner than the outer substrates (substrates 1, 4) before the manufacture of the liquid crystal display 100 shown in FIG. 22. Since the two panels are joined with an about 0.2-mm thick polarizer being interposed, it is easier to maintain the strength of the liquid crystal display by way of the inner substrates with reduced thickness rather than by way of the outer substrates with reduced thickness.

The present example restrains moire pattern occurrences attributable to parallax, maintains the strength of the liquid crystal display, and reduces the weight of the display even with double panels. The present embodiment may be used in combination with, for example, embodiment 1.

Embodiment 3

Figure 26:
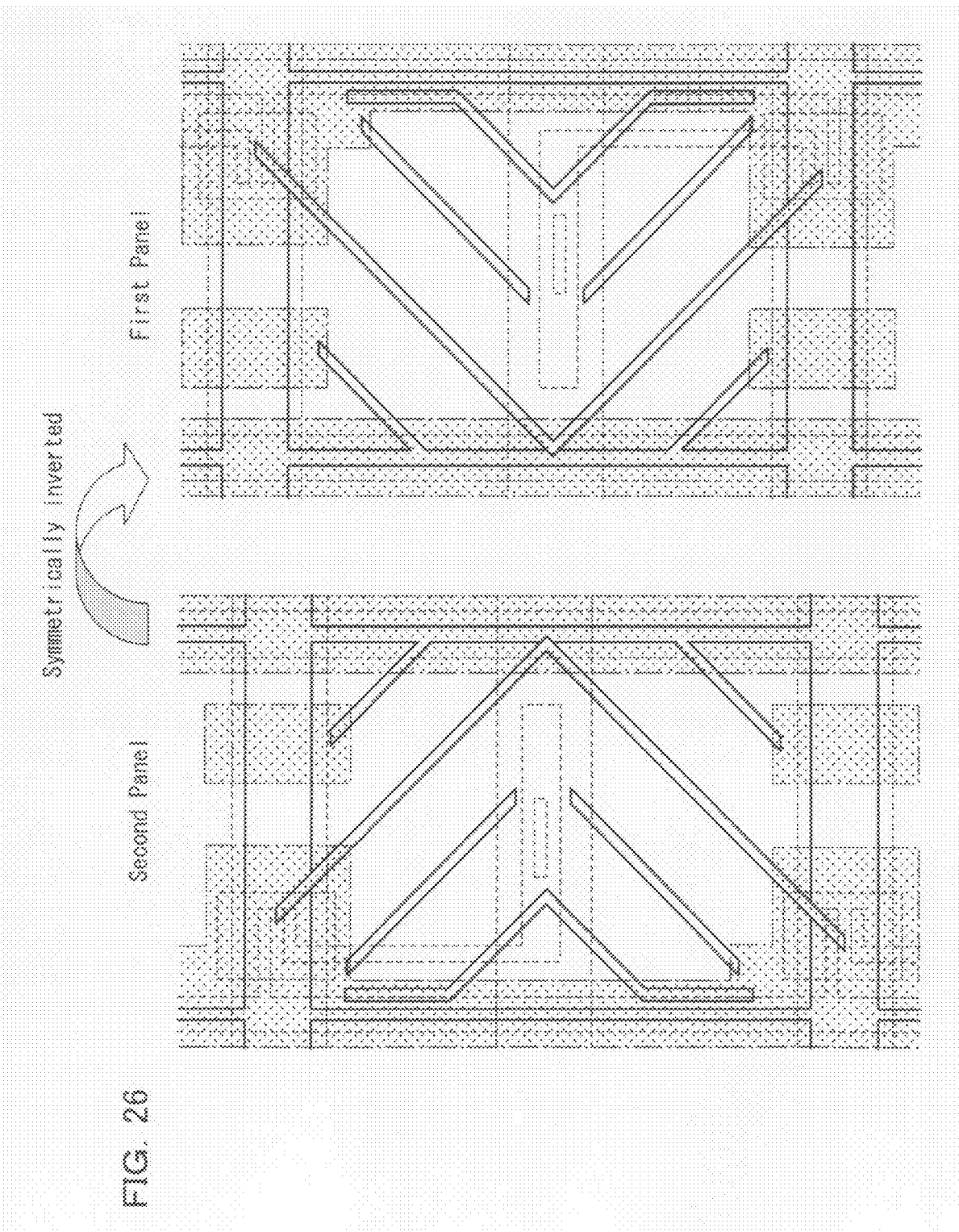
FIG. 26 illustrates an embodiment of the present invention, an example of moire prevention.

When the liquid crystal display 100 is configured as shown in FIG. 1 and polarizers and panels are combined as shown in FIG. 2, it becomes possible to restrain the degree of mutual non-synchronous interference of fine structures (e.g. alignment controlling projections), having equivalent cycles, which are provided on the adjacent panels, by forming the first panel and the second panel so that the pixel pattern on the first panel and the pixel pattern of the second panel are inverted symmetrically with each other as shown in FIG. 26. That restrains moire pattern occurrences attributable to structural interference, thereby preventing degradation of display quality attributable to moire patterns.

FIGS. 27(a) to 27(d) show examples of the pixels of the first panel overlapping those of the second panel.

The alignment controlling projections and electrode slits transmit almost no light. Therefore, if the pixels are not inverted, there is a large change in transmittance between FIG. 27(a) where there is no deviation and FIG. 27(b) where there is a deviation.

Figure 27:
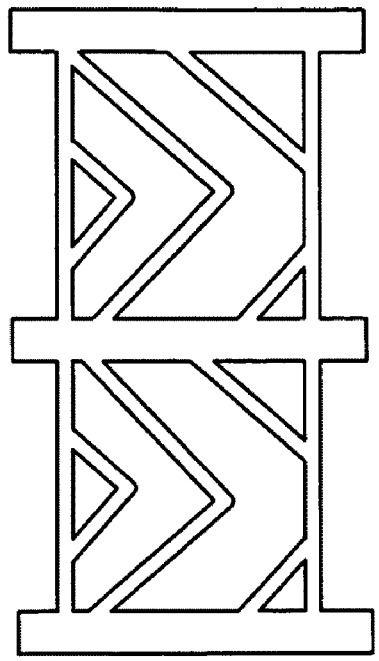
FIG. 27(a) illustrates an embodiment of the present invention, an example of moire prevention.
FIG. 27(b) illustrates an embodiment of the present invention, an example of moire prevention.
FIG. 27(c) illustrates an embodiment of the present invention, an example of moire prevention.
FIG. 27(d) illustrates an embodiment of the present invention, an example of moire prevention.
Figure 27:
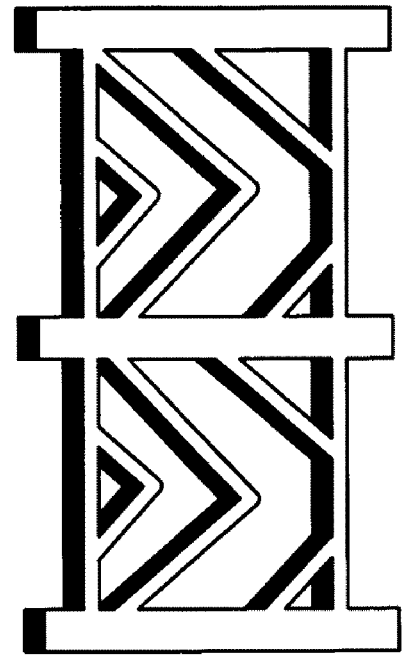
Figure 27:
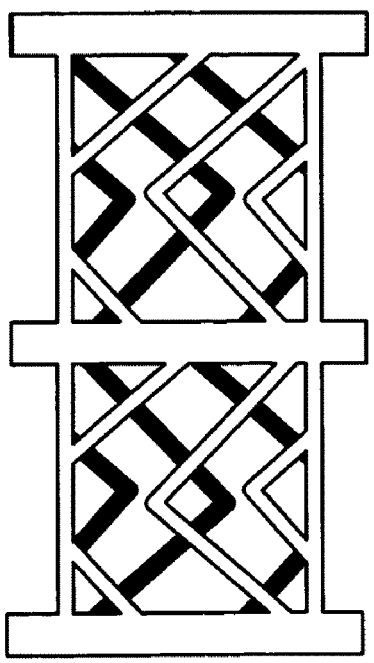
Figure 27:
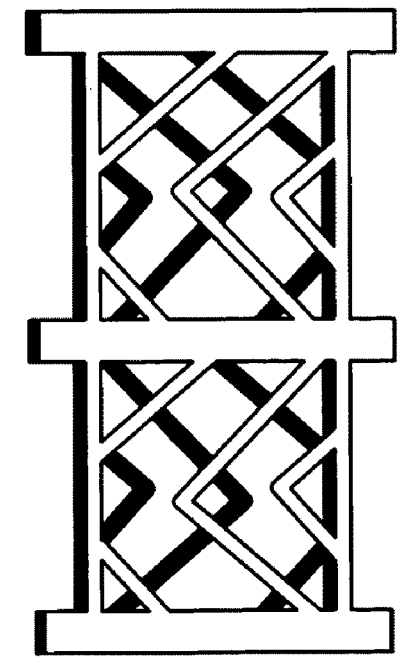

The state in which the pixels are not inverted and there is no deviation as in FIG. 27(a) can be said to be the best state in which the transmittance is high and there are no moire pattern occurrences. In fact, however, the pixels deviate as shown in FIG. 27(b). The pixel deviation decreases transmittance and causes moire patterns.

Accordingly, the pixel structures are inverted. Due to the inversion, the area of parts where the projections, electrode slits, etc. overlap does not change between the state with no deviation in FIG. 27(c) and the state with deviation in FIG. 27(d). Therefore, the transmittance does not change much.

In the state in which the pixels are inverted and there is no deviation as in FIG. 27(c), the transmittance is high and there are no moire pattern occurrences attributable to pixel deviation. In fact, however, there is small pixel deviation as shown in FIG. 27(d).

However, moire pattern occurrences are cancelled, provided that the pixels are inverted, even if a small pixel deviation occurs.

The present embodiment is applicable not only to alignment controlling projection slits, but any asymmetric structures with respect to one pixel which change the transmittance.

In the liquid crystal display 100, at least some of the components of the first and second panels are set up structurally symmetric with respect to a point, a line, or a plane, optical canceling is possible. Moire pattern occurrences are thus restrained.

The symmetric layout is provided not necessarily by the symmetrically structured panels, but by inverting two panels with an identical structure as a whole.

Optical canceling also available if the components of the pixels of stacked panels (e.g. TFTs, source bus lines, gate bus lines) have a symmetric layout.

Embodiment 4

In the previous embodiments, the two panels in the liquid crystal display 100 each have a color filter. In the present embodiment, only one of the panels has a color filter. The change enables skipping an RGB formation step when compared with a color filter being provided in each of the two panels, which is advantageous in terms of cost. Since only one of the liquid crystal panels includes a color filter, color mixture does not occur when the light having transmitted one of the liquid crystal panels passes through the other liquid crystal panel. Accordingly, moire pattern occurrences attributable to color mixture are restrained.

Figure 28:
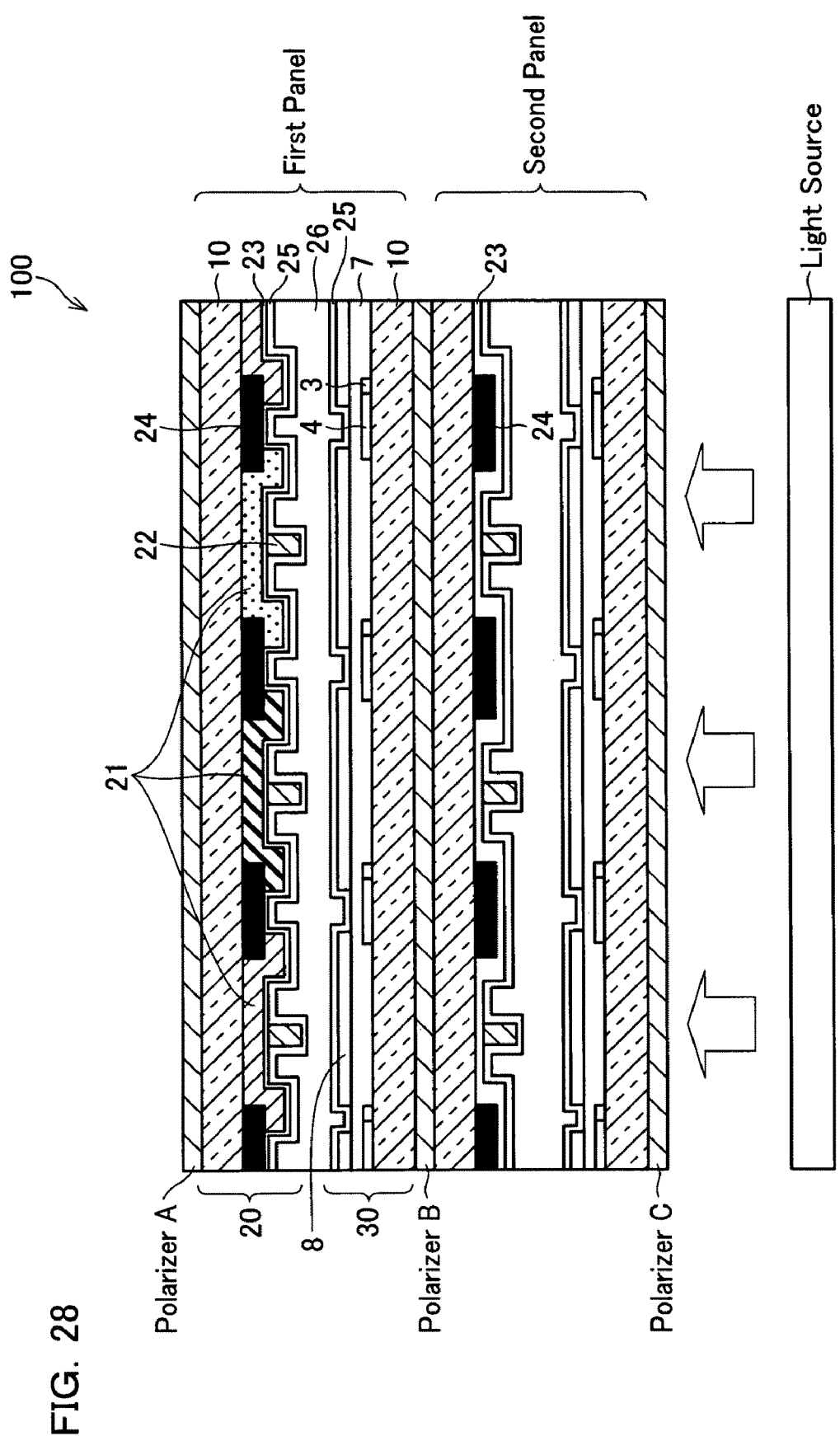
FIG. 28 is a schematic cross-sectional view of a liquid crystal display, illustrating an embodiment of the present invention.
Figure 29:
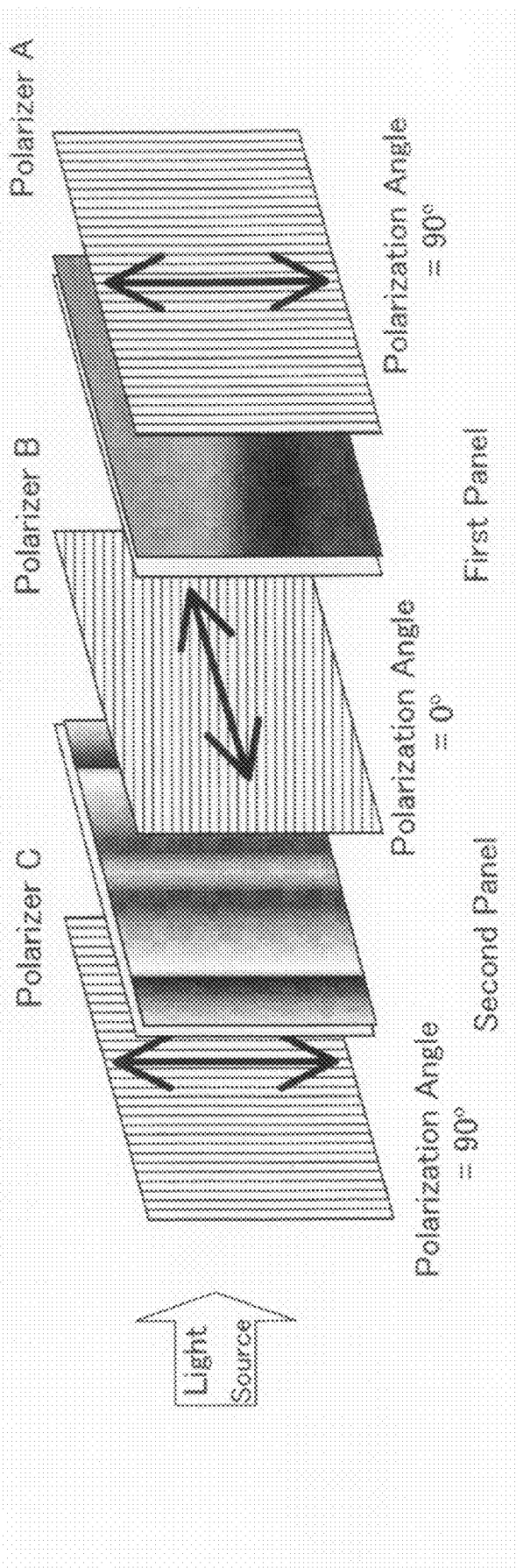
FIG. 29 illustrates the positional relationship of polarizers and panels in the liquid crystal display shown in FIG. 28.

In reference to FIGS. 28, 29, the present embodiment will be described. FIG. 28 is a schematic cross-sectional view of a liquid crystal display of the present embodiment in accordance with the present invention. FIG. 29 shows the configuration of a liquid crystal display including polarizers.

The liquid crystal display 100 shown in FIG. 28 differs from the liquid crystal display 100 shown in FIG. 1 in that the second panel has no color filter 21 and it is only the first panel that includes a color filter 21.

If the same color reproducibility with conventional examples should be maintained, the color filter 21 of the first panel is as thick as the color filter 21 in conventional, single-panel structures. The color filter 21 of the first panel here is 1.8 μm. The second panel containing no color filter 21 is driven based on the first panel containing a color filter 21. For example, the pixel of the second panel exactly below a blue pixel of the first panel is driven based on the signal for the blue pixel on the first panel. For example, identical signals may be supplied.

Conversely, the color filter 21 may be provided in the second panel. The panels are otherwise structured and operate the same way as the basic configuration, that is, the liquid crystal display 100 shown in FIG. 1; the description is not repeated.

The liquid crystal display 100 configured as above requires a single process to fabricate the RGB (three primary colors [red, green, blue]) color filter 21, whilst the basic configuration, or the liquid crystal display 100 shown in FIG. 1, needs two or more process, which is advantageous in terms of cost. Since only one of the liquid crystal panels includes a color filter, color mixture does not occur when the light having transmitted one of the liquid crystal panels passes the other liquid crystal panel. Accordingly, moire pattern occurrences attributable to color mixture are restrained. The present embodiment may be used in combination with, for example, embodiments 1, 2.

Figure 30:
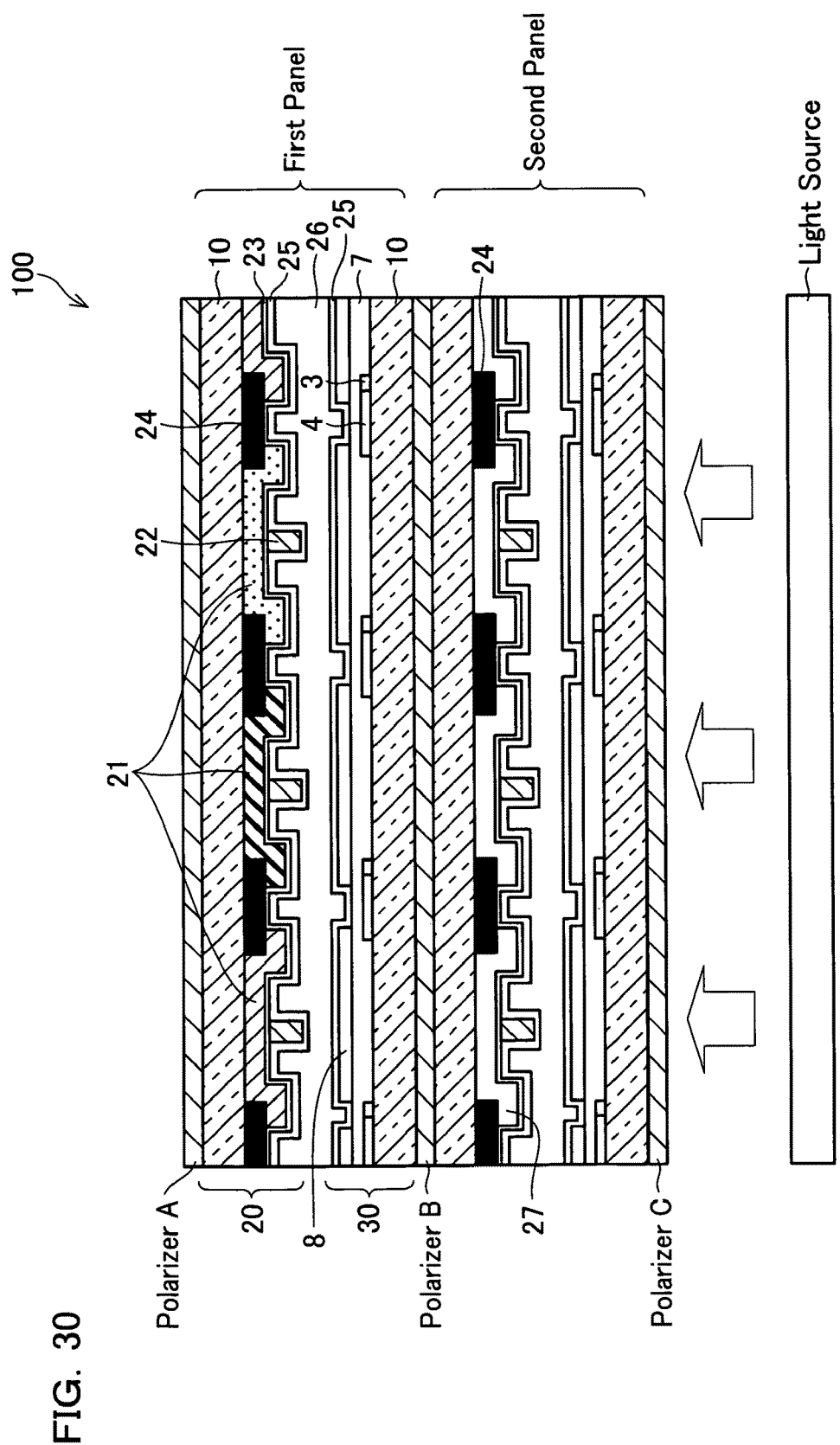
FIG. 30 is a schematic cross-sectional view of a liquid crystal display, another embodiment of the present invention.

Now, in reference to FIG. 30, another example of the present embodiment will be described. FIG. 30 is a schematic cross-sectional view of a liquid crystal display of an embodiment in accordance with the present invention.

In the liquid crystal display 100 shown in FIG. 28, if a black matrix layer (hereinafter, "BM") 24 is formed of resin in the panel containing no color filter 21 and the BM resin is thick, alignment may be disturbed near edges of the BM (for your information, a resin BM is thicker than a metal BM to compensate for its poor light blocking ability)

The problem is addressable in the liquid crystal display 100 shown in FIG. 30 by forming a transparent layer 27 containing no color pigment at a place where the color filter 21 is formed. The transparent layer 27 may be made from any material, but preferably from a highly transparent, non-colored material.

For example, the transparent layer 27 is preferably made from a negative, acrylic-based photosensitive resin solution photosensitivity containing no color pigment. When that is the case, the photo mask originally meant for use in forming a pattern for the color filter 21 mentioned in relation to the manufacturing method of the color filter substrate 20 in the liquid crystal display 100 shown in FIG. 1 may be used also to form a pattern for the transparent layer 27. Alternatively, a dedicated photo mask designed for one-shot exposure may be used. Also, a negative photosensitive resin may be used with the BM as a mask, and exposure and development done on the back surface.

In FIG. 30, the overlapping parts of the color filter 21 which extend on the BM 24 are emphasized. A typical acrylic-based photosensitive resin, when applied, is generally far thinner on the BM 24 than other places (where there is no BM 24 underneath). Alignment is likely to be disturbed by the overlapping parts. However, in the liquid crystal display 100 shown in FIG. 30, alignment is not disturbed by the overlapping parts.

In the present embodiment (in which the transparent layer 27 is formed), the resin BM 24 has almost the same cross section as it does when the color filter 21 is formed. Alignment is therefore less likely to be disturbed along the edges of the resin BM 24.

Figure 31:
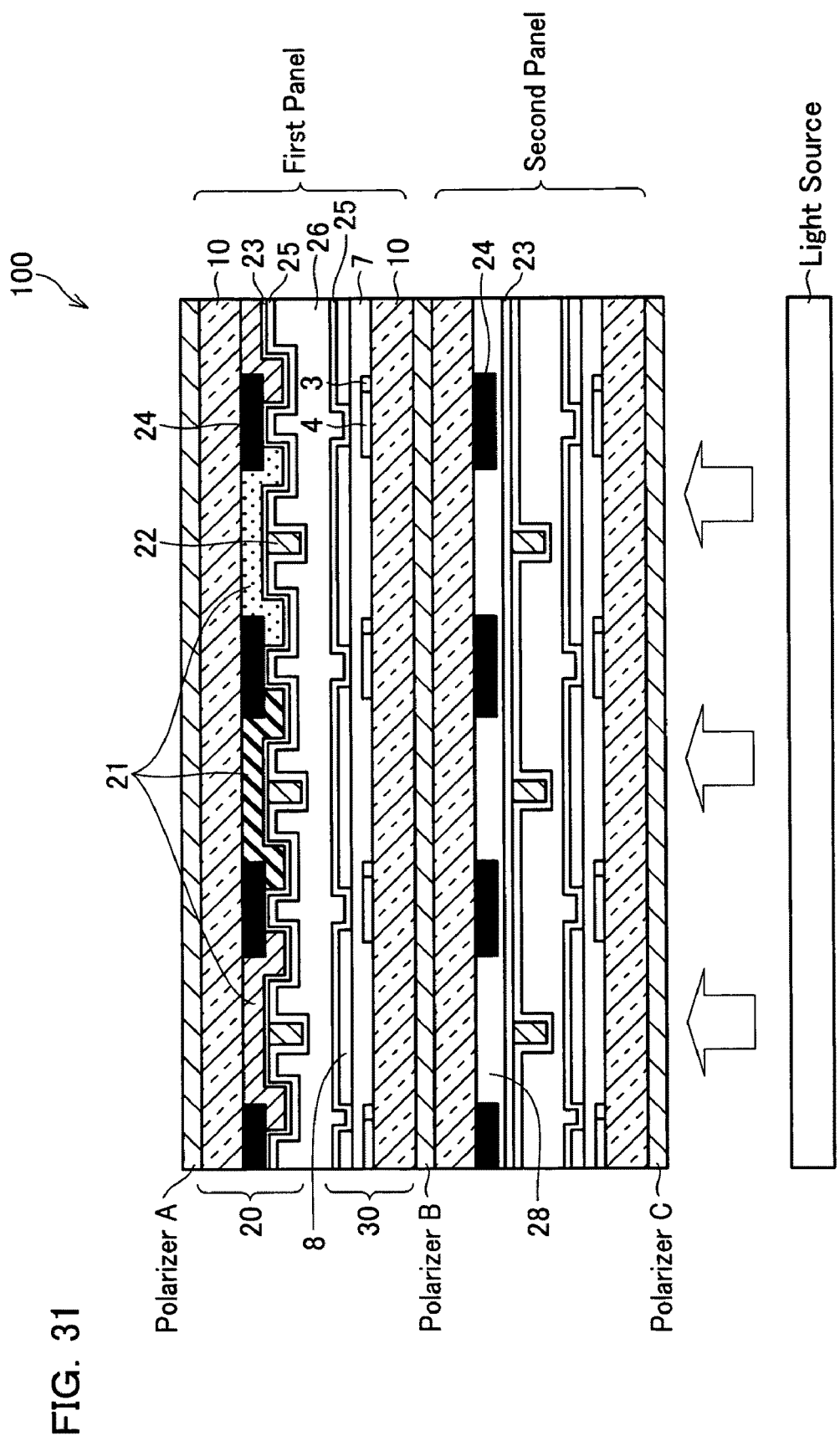
FIG. 31 is a schematic cross-sectional view of a liquid crystal display, a further embodiment of the present invention.

In reference to FIG. 31, another example of the present embodiment will be described. FIG. 31 is a schematic cross-sectional view of a liquid crystal display of an embodiment in accordance with the present invention.

The example has the same objective of preventing alignment from being disturbed by the thick resin BM 24 as the liquid crystal display 100 shown in FIG. 30. A planarization film 28 is used in this example.

The planarization film 28 is used to reduce steps, and hence surface irregularities. The planarization film 28 is formed by applying and curing a material called a planarization material or overcoat material. There are a variety of planarization materials or overcoat materials available on the market. Some of them have high planarizing capability and high transparence. Some of the materials do not require use of a photo mask and facilitates exposure and development when compared to the liquid crystal display 100 shown in FIG. 30.

The use of the planarization film 28 as the thick resin BM 24 reduces the steps formed by the resin BM and prevents alignment from being disturbed along the edges of the resin BM.

In the present embodiment, the dimensions of the dot in the panel containing no color filter (hereinafter, the "black and white panel") may be 3 times as long (n=3) in the direction of the gate bus lines and as long (m=1) in the direction of the source bus lines as the dot in the panel containing a color filter (hereinafter, "the color panel").

The structure reduces the source drivers to ⅓, and hence related cost.

Figure 32:
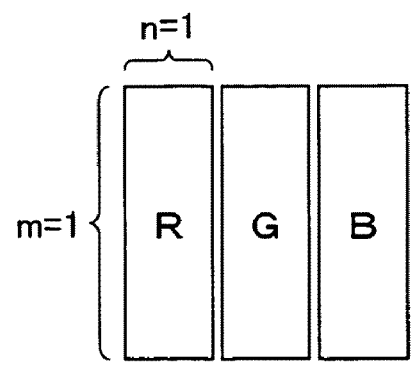
FIG. 32 illustrates a pixel used to produce a color display on a liquid crystal display.
Figure 33:
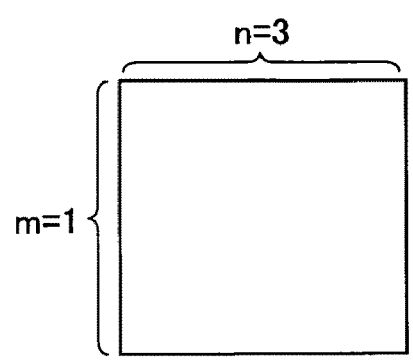
FIG. 33 illustrates a single pixel of the same size as the pixel shown in FIG. 32.

If both panels have a color filter, there is one dot for each RGB in each panel as shown in FIG. 32. In contrast, if only one of the panels has color filter, there is no need to form a color filter in the remaining panel in which the dimensions of a single dot are changed to 3 times as long (n=3) in the direction of the gate bus lines and as long (m=1) in the direction of the source bus lines as the single dot shown in FIG. 32 as shown in FIG. 33.

Each dot in the black and white panel structured as above is driven based on a maximum gray level in the gray level data for the corresponding three dots in the color panel.

Figure 34:
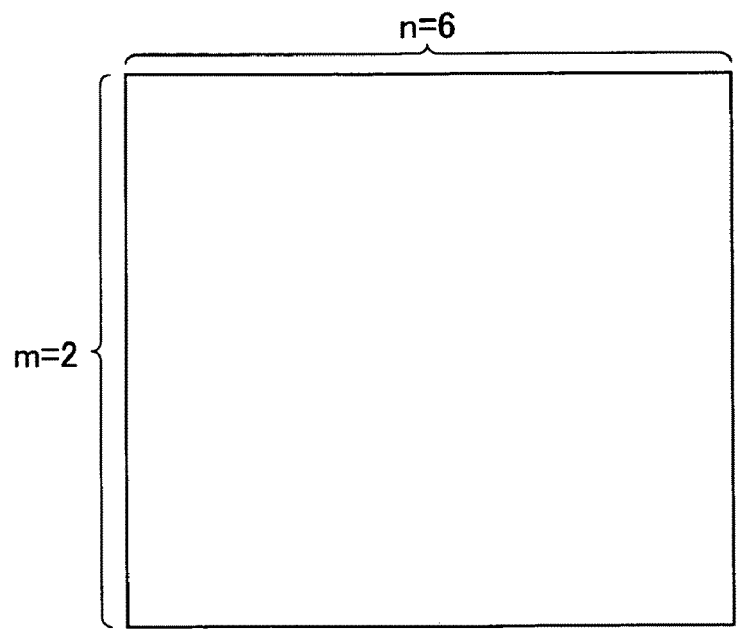
FIG. 34 illustrates an expanded pixel twice as large as the pixel shown in FIG. 33.

In another example of the present embodiment, the dot dimensions of the black and white panel are determined so that n=6 and m=2 as shown in FIG. 34. That reduces the size of the source driver to ⅙ and the size of the gate driver to ½.

Each dot in the black and white panel structured as above is driven to be equal to a maximum gray level in the gray level data for corresponding 12 dots in the color panel.

Since only one of the two panels contains a color filter as described in the foregoing, there is no need to form a color filter in the other panel. That reduces related cost.

In the one of the two panels which contains no color filter, the opposite substrate facing the active matrix substrate 30 may include at least a black matrix. The inclusion lowers leak current in the TFT elements 3 in the active matrix substrate 30.

The black matrix may include a light-transmitting resin layer around its openings. When that is the case and if the BM is made of resin, the arrangement prevents alignment from being disturbed at the edges of the BM by the large thickness.

A light-transmitting resin layer (planarization film) may be included so that the layer can cover the black matrix and the openings of the black matrix.

When that is the case and if the BM is made of resin, the arrangement prevents alignment from being disturbed at the edges of the BM by the large thickness. Besides, the exposure and development process using a mask may be omitted.

Embodiment 5

Figure 35:
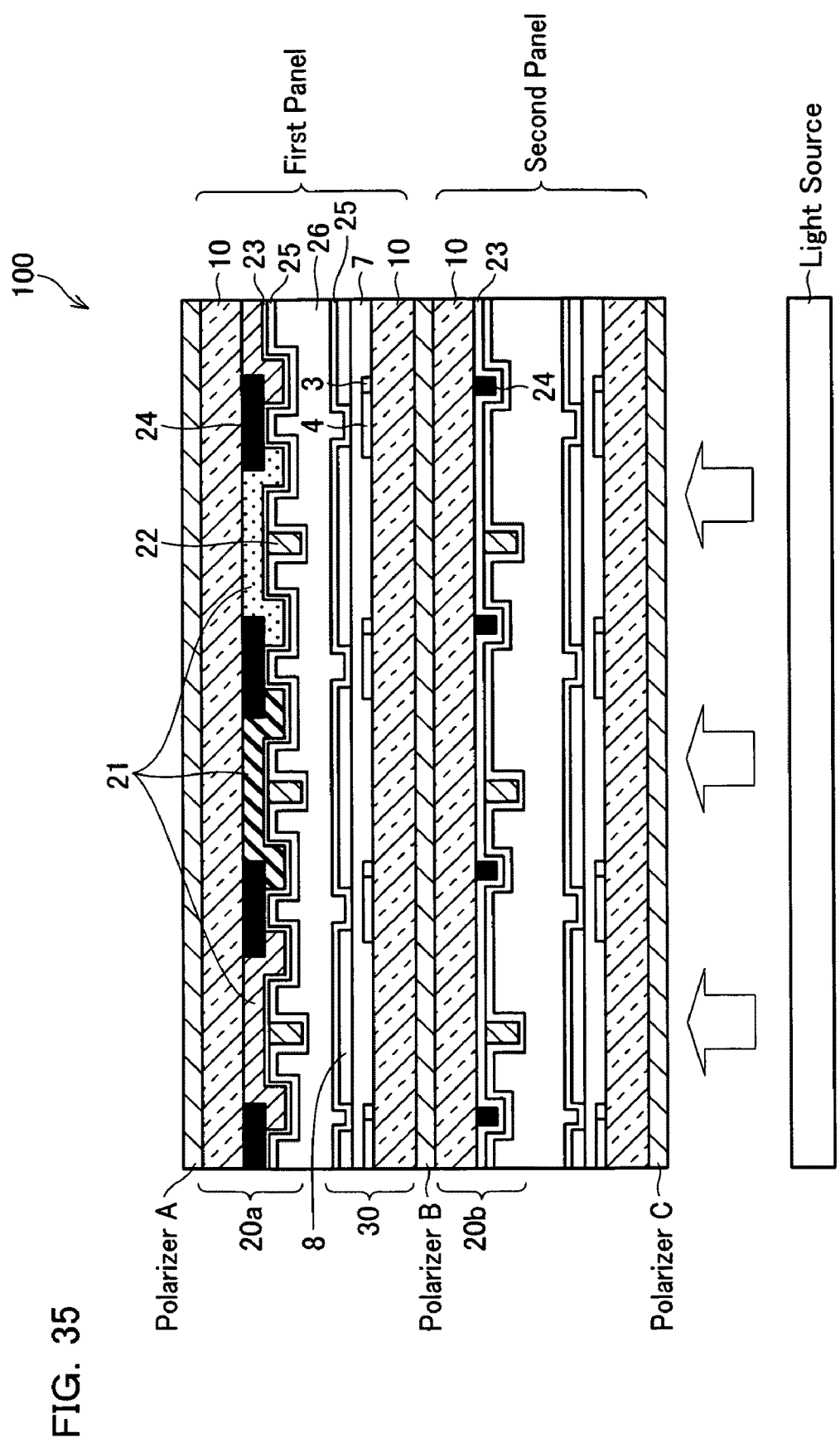
FIG. 35 is a schematic cross-sectional view of a liquid crystal display, another embodiment of the present invention.
Figure 36:
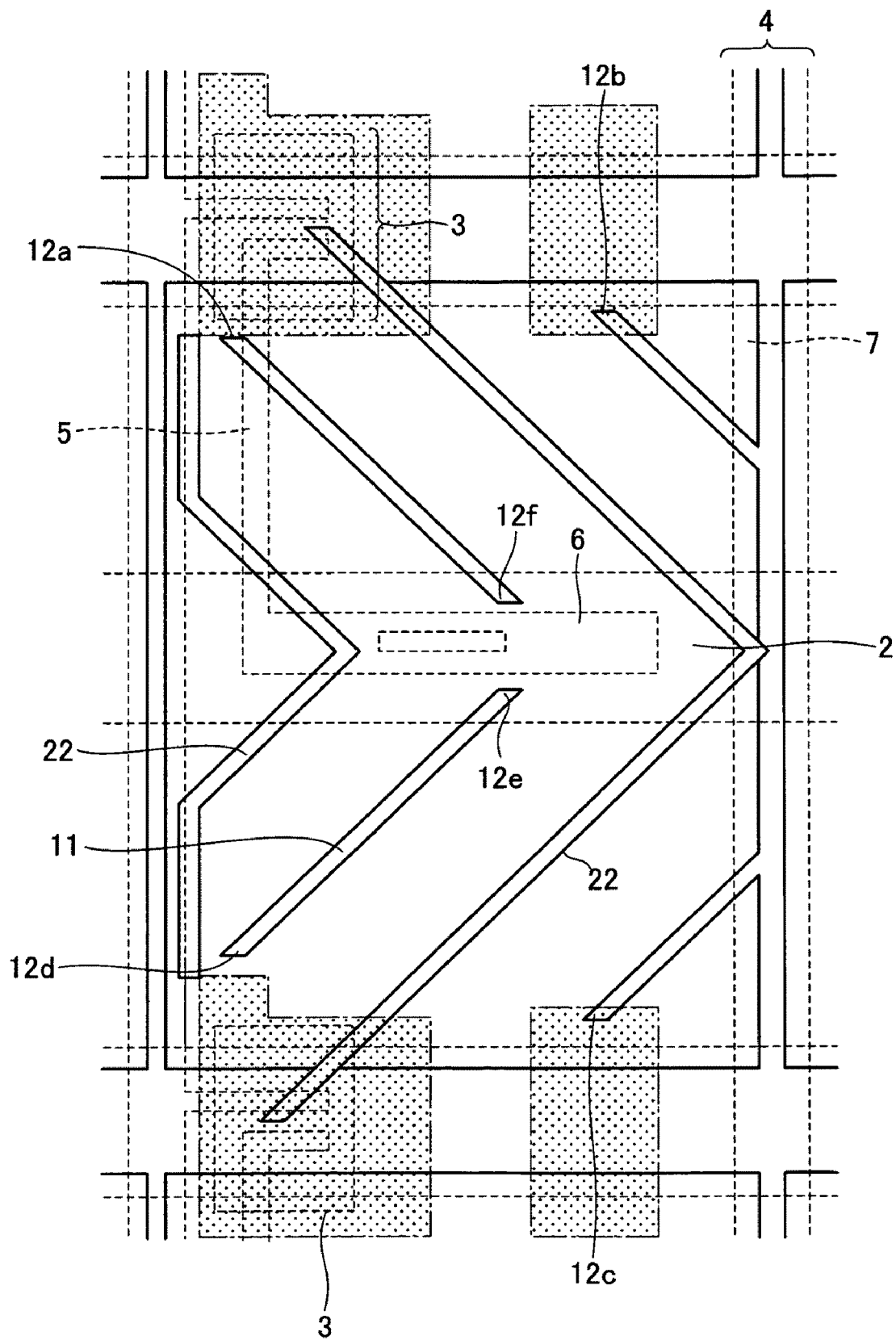
FIG. 36 is a plan view of a pixel in the liquid crystal display shown in FIG. 35.

The following will describe another embodiment of the present invention in reference to FIGS. 35 and 36. The present invention is by no means limited by the present embodiment.

The same description as about the liquid crystal display 100 shown in FIG. 1 (basic configuration) will be reduced to a minimum. The present embodiment will focus only on essential features. Members common for the first and second panels are assigned identical numeral references; description of the members is omitted.

The present embodiment will be described in reference to FIGS. 35, 36.

FIG. 35 is a schematic cross section of the liquid crystal display 100 of an embodiment in accordance with the present invention. The polarizer structure has the same structure as the structure shown in FIG. 29.

FIG. 36 is a plan view of a pixel in the second panel of the liquid crystal display shown in FIG. 35: an island-shaped BM (black matrix) 24b and an alignment controlling projection 22, both provided on the opposite substrate 20b, overlap the active matrix substrate.

The pixels in the first panel are driven according to a display signal. The corresponding pixels in the second panel which are located at positions that match the pixels in the first panel when the panels are viewed normal to the panels are driven in a manner associated with the first panel. When the part (construction 1) constructed of polarizer A, the first panel, and polarizer B is in a transmitting state, the part (construction 2) constructed of polarizer B, the second panel, and polarizer C is also in a transmitting state. When construction 1 is in a non-transmitting state, construction 2 is also in a non-transmitting state.

The first and second panels may be fed with the same image signal. Alternatively, the first and second panels may be fed with separate, but associated signals. The pixels in the panels are located so that they appear to be at matching positions when viewed normal to the panels.

The active matrix substrate 30 is manufactured by the same method as described in relation to the liquid crystal display 100 (basic configuration). Description is omitted.

The color filter substrate 20a of the first panel is manufactured by the same method as described in relation to the liquid crystal display 100 (basic configuration). Description is omitted.

The following will describe a manufacturing method for the opposite substrate 20b in the second panel.

On top of the transparent substrate 10 are formed an island-shaped black matrix (BM) 24b, an opposite electrode 23, an alignment film 25, and alignment controlling projections 22.

A negative, acrylic-based photosensitive resin solution containing dispersed fine carbon particles is applied to the transparent substrate 10 by spin coating. The resin is then dried to form a black photosensitive resin layer. More specifically, a BM pattern is formed like an island as shown in FIG. 36 so that the pattern shields from light anomalous alignment regions which occur in slits 12a, 12b, 12c, 12d which are electrical connection sections for the pixel electrode slits. Also, a light blocking section (BM) is formed like an island at positions opposite the TFT elements 3 to prevent increases in leak current induced by external light hitting the TFT elements 3.

Furthermore, the opposite electrode 23 is formed of a transparent electrode, such as ITO, by sputtering. A positive, phenolnovolak-based photosensitive resin solution is then applied by spin coating. The solution is dried, exposed to light using a photo mask, and developed to form the vertical alignment controlling projections 22. That completes the manufacture of the opposite substrate 20b.

The BM in the second panel is formed like an island in the description above. The BM of at least one of the panels needs be formed like an island; the BM in the first panel may be formed like an island.

Since at least one of the two panels includes an island-shaped black matrix as described in the foregoing, no stripe BM is required. That reduces moire patterns attributable to BM interference.

Embodiment 6

The following will describe another example of the present embodiment in reference to FIGS. 37 to 41.

Figure 37:
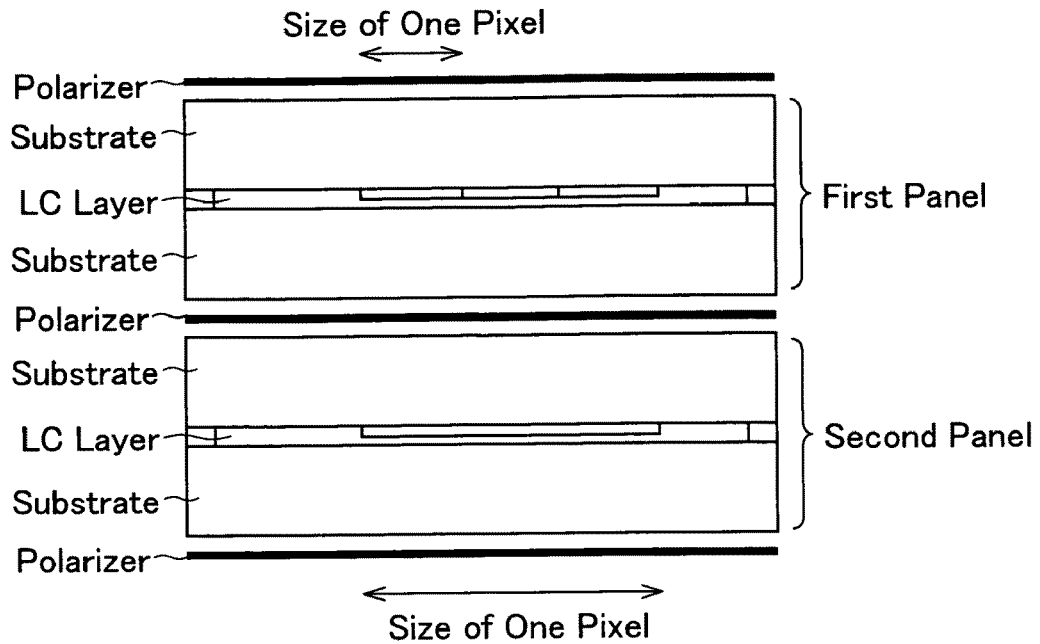
FIG. 37 is a schematic cross-sectional view of a liquid crystal display, illustrating moire prevention.
Figure 39:
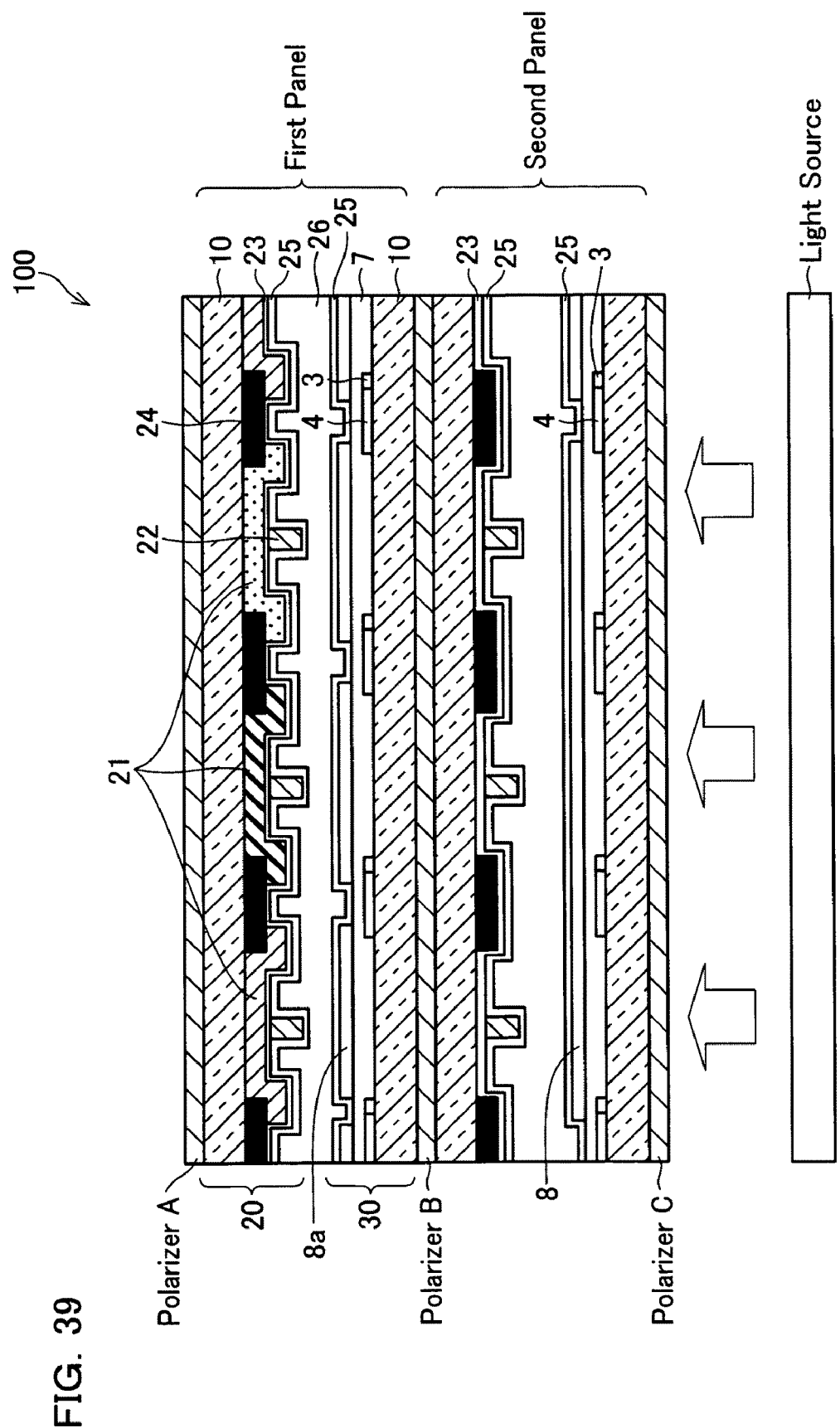
FIG. 39 is a schematic cross-sectional view of a liquid crystal display, illustrating another embodiment of the present invention.
Figure 40:
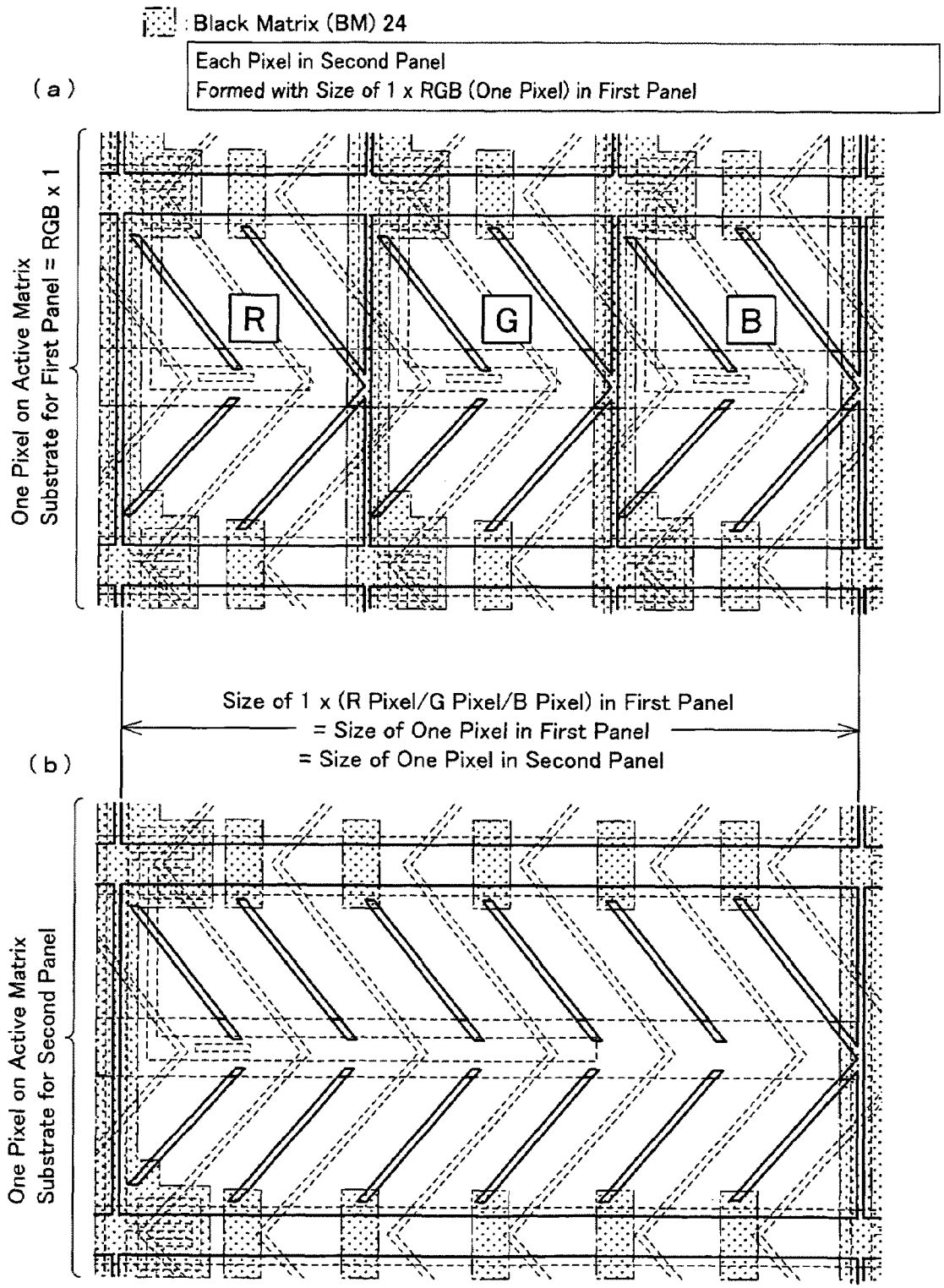
FIG. 40 is a plan view of the structure of a pixel on a color panel (a); and a plan view of the structure of a pixel on a black and white panel (b) in the liquid crystal display shown in FIG. 39.

FIG. 37 shows a panel structure for a 1 by 1 pixel (counting a set of RGB dots as one pixel): in the present embodiment, the size of a single dot in the first panel containing a color filter is one third the size of a single pixel in the second panel containing no color filter. FIG. 39 is a detailed cross-sectional view for FIG. 37. FIG. 40 is a plan view of a panel (a) containing a color filter and a panel (b) containing no color filter. Referring to FIG. 40, a dot is defined as the smallest unit in which a gray level is reproduced from a data signal; a pixel as a unit structured from a plurality of color dots; and a pixel electrode as an electrode constituting part of a pixel.

Signal processing is carried out so as to produce identical gray level data for three dots in the panel containing no color filter (hereinafter, "black and white panel"). The three corresponding dots in the panel containing a color filter (hereinafter, "color panel") constitutes one RGB pixel.

Signal processing is carried out so as to produce, for the black and white panel (second panel), gray level data representing a maximum gray level of the three color panel dots.

Figure 38:
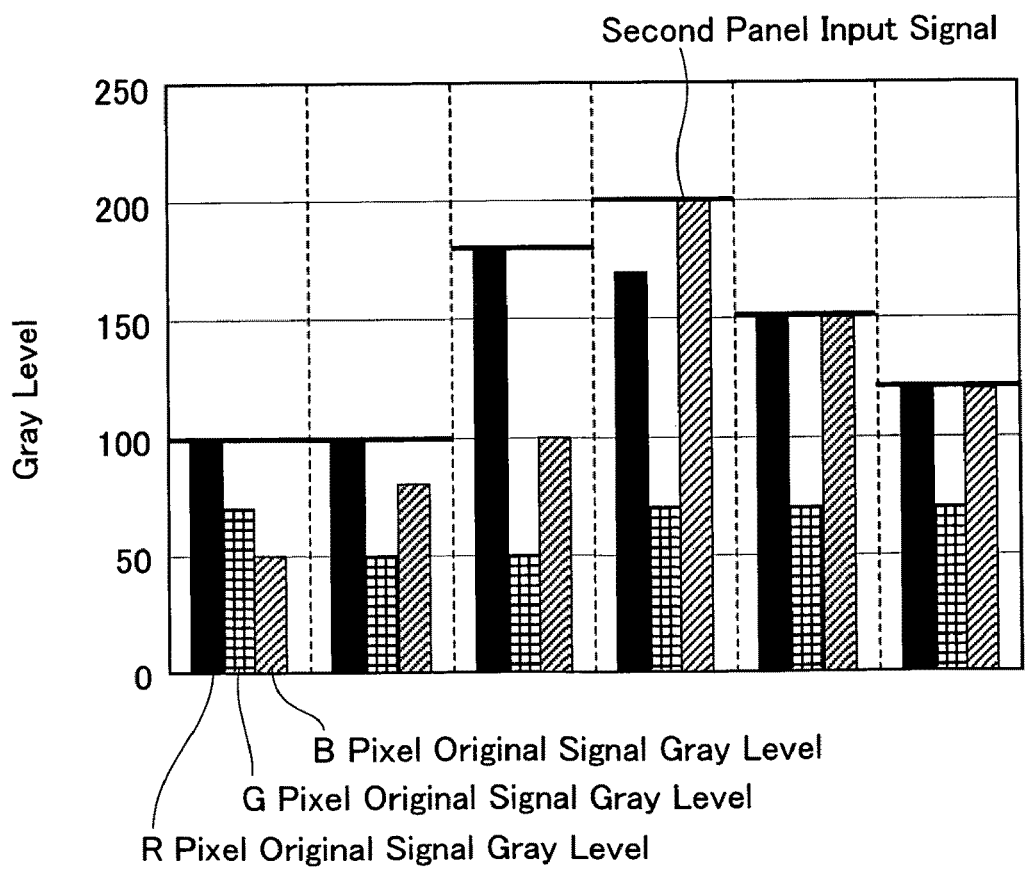
FIG. 38 is a graph representing gray levels available with 2 by 2 pixels in the liquid crystal display shown in FIG. 37.

FIG. 38 is a graph representing gray levels under these conditions.

Therefore, the gray level data for the dots in the panel containing no color filter is all identical. The gray level data is either equal to the maximum gray level data for the corresponding dots in the panel containing a color filter or results of computation reflecting that maximum gray level.

Figure 41:
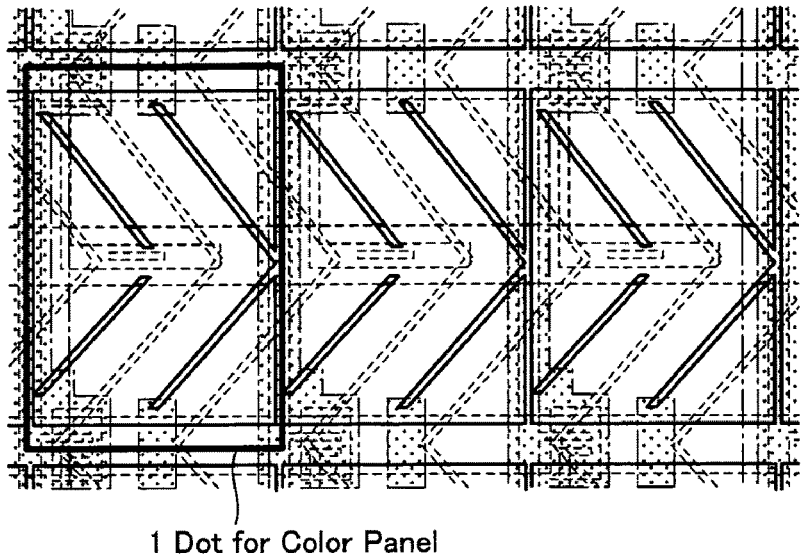
FIG. 41(a) illustrates another moire prevention example.
FIG. 41(b) illustrates another moire prevention example.
Figure 41:
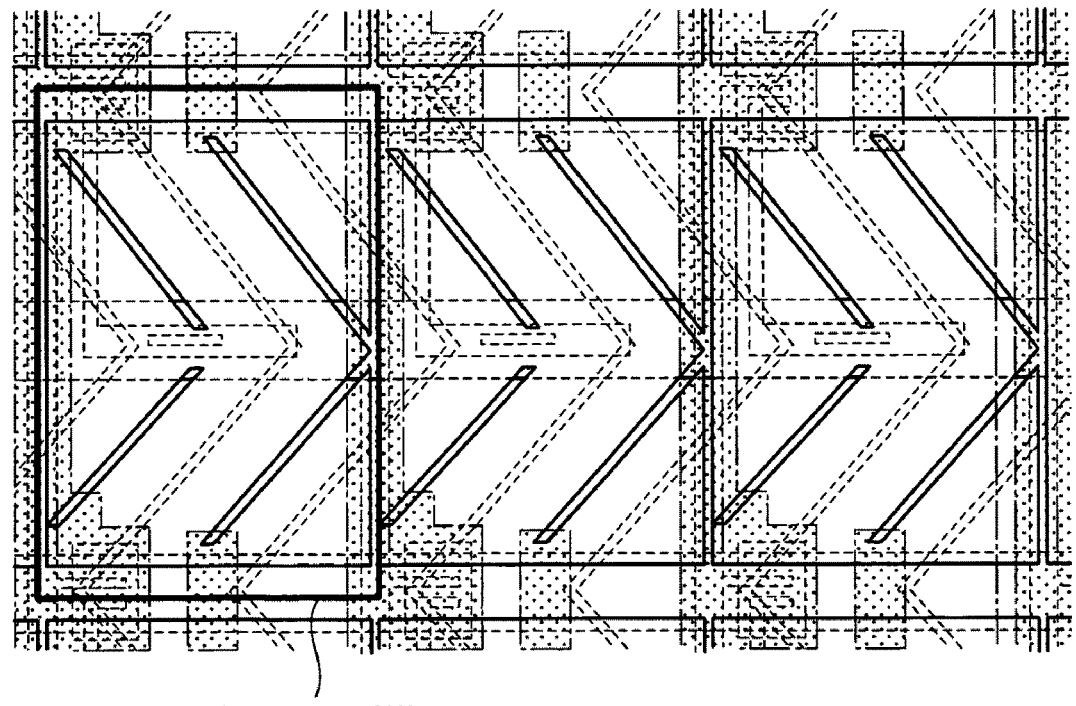

The dots in the panel containing no color filter and the corresponding dots in the panel containing a color filter are integral multiples of one pixel with RGB constituting a single unit. Neither groups of dots are necessarily integral multiples. The size of a dot in the black and white panel may be a real number times the size of a dot in the color panel. FIG. 41 shows an example where the ratio is 1.4. FIG. 41(a) shows a dot in a panel containing a color filter; FIG. 41(b) shows a dot in a panel containing no color filter. A whole number ratio is however results in clear dot outlines and preferable for displays of text and drawings including many straight lines. The present embodiment may be used in combination with, for example, embodiment 1.

Embodiment 7

Figure 42:
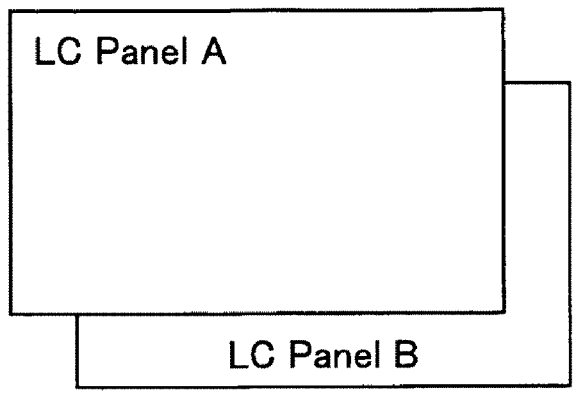
FIG. 42(a) illustrates another moire prevention example.
FIG. 42(b) illustrates another moire prevention example.
FIG. 42(c) illustrates another moire prevention example.
Figure 42:
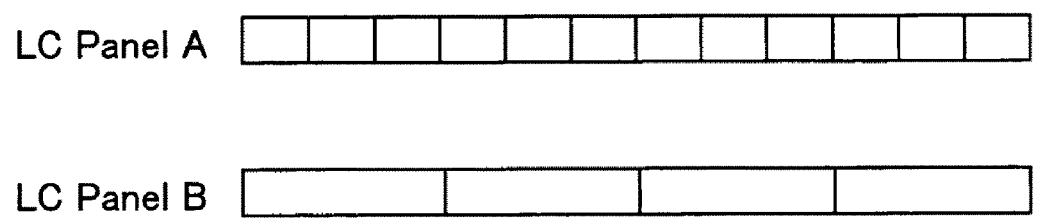
Figure 42:
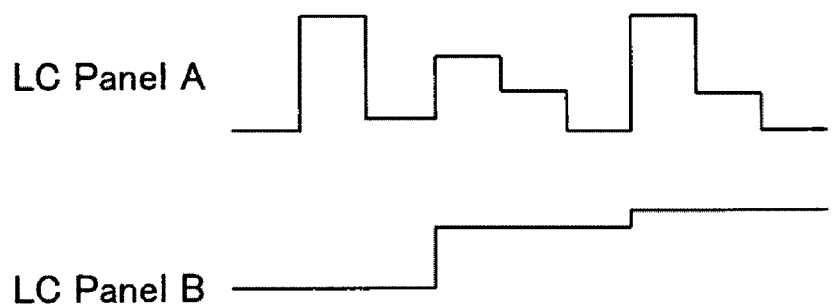
Figure 43:
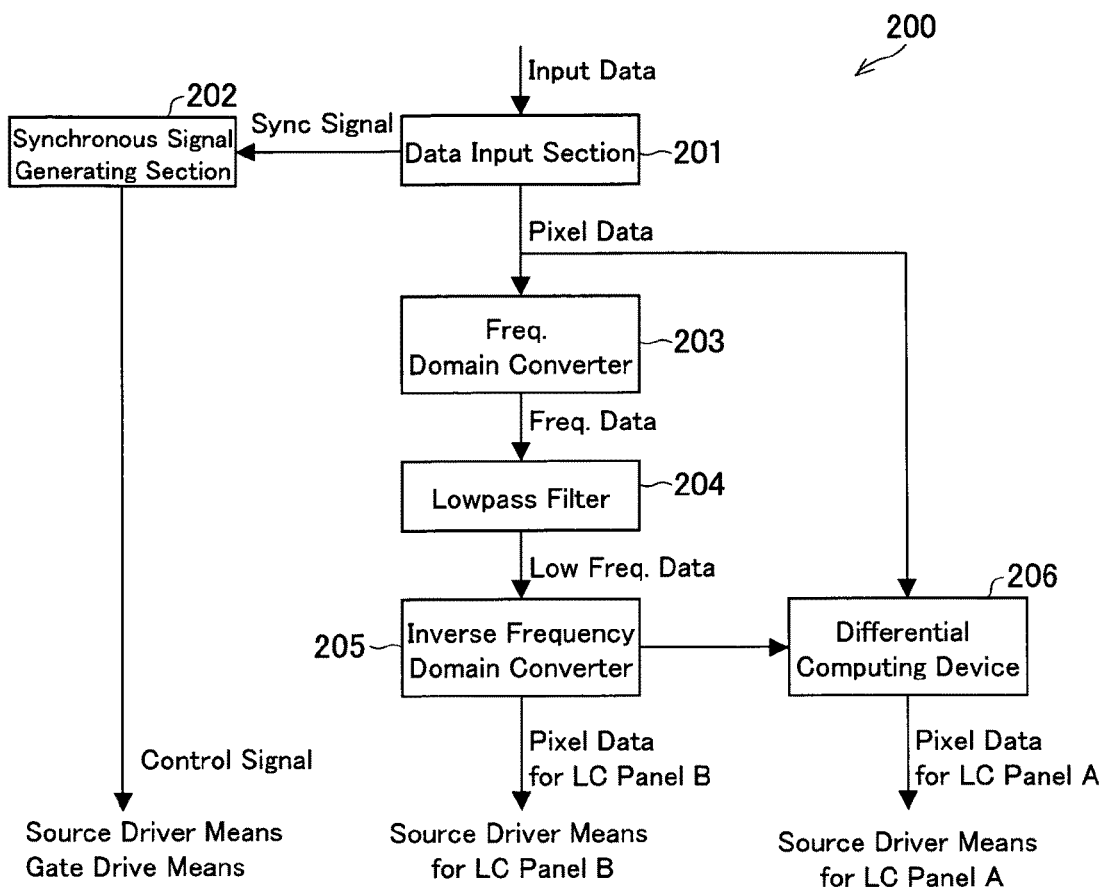
FIG. 43 is a block diagram of a display controller which implements the moire prevention measure shown in FIG. 42.

The following will describe another embodiment of the present invention in reference to FIGS. 42 and 43. The first panel is liquid crystal panel A, and the second panel is liquid crystal panel B.

Two liquid crystal panels are stacked on top of one another for use as shown in FIG. 42(a). Assume that the resolution of liquid crystal panel B is lower than the resolution to be displayed as shown in FIG. 42(b).

Accordingly, the spatial frequencies of the display data for liquid crystal panels A and B are changed as shown in FIG. 42(c) so as to reduce interference between the image on liquid crystal panels A and the image on liquid crystal panel B. That reduces moire patterns.

Different space frequencies are given as shown in FIG. 42(c) through the following control.
(1) Convert input data to spectral data through DCT, FFT, etc.
(2) Extract low frequency components using lowpass filters.
(3) Convert the low frequency components back to original spatial data through inverse DCT, inverse FFT, etc. for a display on liquid crystal panel B. To accommodate the low resolution, skip a number of samplings of data.
(4) The actual display data is the display on liquid crystal panel A×the display on liquid crystal panel B.

From these procedures, the display on liquid crystal panel A is determined from the difference between display data and the display on liquid crystal panel B.

The description above is based on one dimensional data. The display on the liquid crystal panel is two dimensional, and the actual display is produced from two-dimensional data.

LC panel B may have the same structure as LC panel A as far as resolution is concerned. Then, an identical signal may be fed to a plurality of source bus lines in liquid crystal panel B to lower the display resolution of liquid crystal panel B.

Specific control is implemented by a display controller 200 containing, for example, a data input section 201, a synchronous signal generating section 202, a frequency domain converter 203, a lowpass filter 204, an inverse frequency domain converter 205, and a differential computing device 206 as shown in FIG. 43.

The data input section 201 separates input data to a synchronous signal and pixel data for individual pixels. The section 201 is arranged to supply the synchronous signal to the succeeding stage, or the synchronous signal generating section 202 and supply the pixel data to the succeeding stages, or the frequency domain converter 203 and the differential computing device 206.

The synchronous signal generating section 202 generates, from the synchronous signal from the data input section 201, control signals by which source drive means and gate drive means are controlled.

For example, the following three control signals are generated to control the source drive means.
(1) source start pulse
(2) source latch pulse
(3) source clock
The following two control signals are generated to control the gate drive means.
(1) gate start pulse
(2) gate shift clock The frequency domain converter 203 is arranged to convert the pixel data from the data input section 201 to spatial frequency domain and supply the spatial frequency domain data to the succeeding stage, or the lowpass filter 204. The frequency domain conversion is typically done by two-dimensional FFT conversion, two-dimensional DCT conversion, etc.

The lowpass filter 204 is arranged to filter the frequency data from the frequency domain converter 203, passing only low frequency data, and supply the low frequency data to the succeeding stage, or the inverse frequency domain converter 205.

The inverse frequency domain converter 205 is arranged to inverse convert the low frequency data (opposite to the frequency domain converter 203), supplying the data after the inverse conversion as pixel data for liquid crystal panel B to the source drive means for the liquid crystal panel B and the differential computing device 206.

The inverse frequency domain converter 205 carries out, as the inverse frequency conversion, inverse two-dimensional FFT conversion, inverse two-dimensional DCT conversion, etc. A number of sampling points of data are skipped to match the pixels in liquid crystal panel B.

The differential computing device 206 is arranged to compute differences between data from the data input section 201 (raw data) and the data for liquid crystal panel B from the inverse frequency domain converter 205, correct pixel data for liquid crystal panel A so that the display becomes original data, and supply the pixel data after the correction to the source drive means for liquid crystal panel A.

In the present embodiment, in the case of pixel sets, a case has been described where liquid crystal panel B has a lower resolution than liquid crystal panel A as shown in FIG. 42(b). This is by no means limiting. The embodiment is applicable to liquid crystal panels A, B having the same resolution.

Embodiment 8

Figure 44:
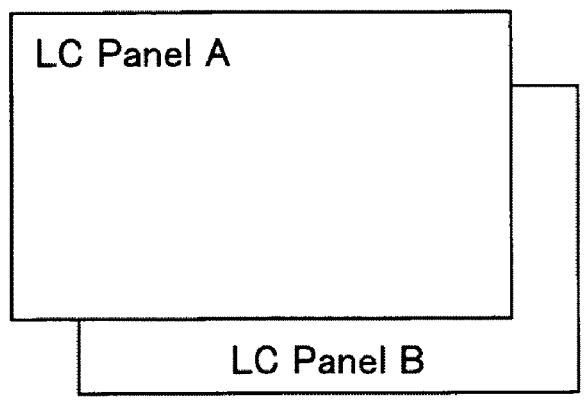
FIG. 44(a) illustrates another moire prevention example.
FIG. 44(b) illustrates another moire prevention example.
FIG. 44(c) illustrates another moire prevention example.
Figure 44:
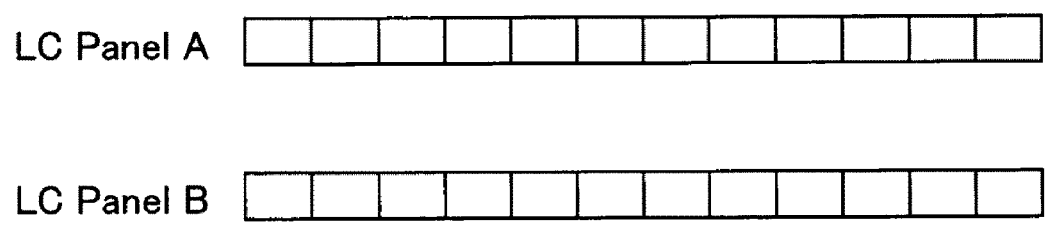
Figure 44:
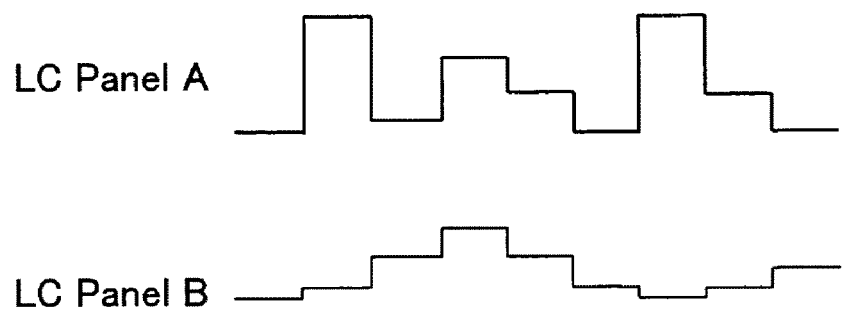
Figure 45:
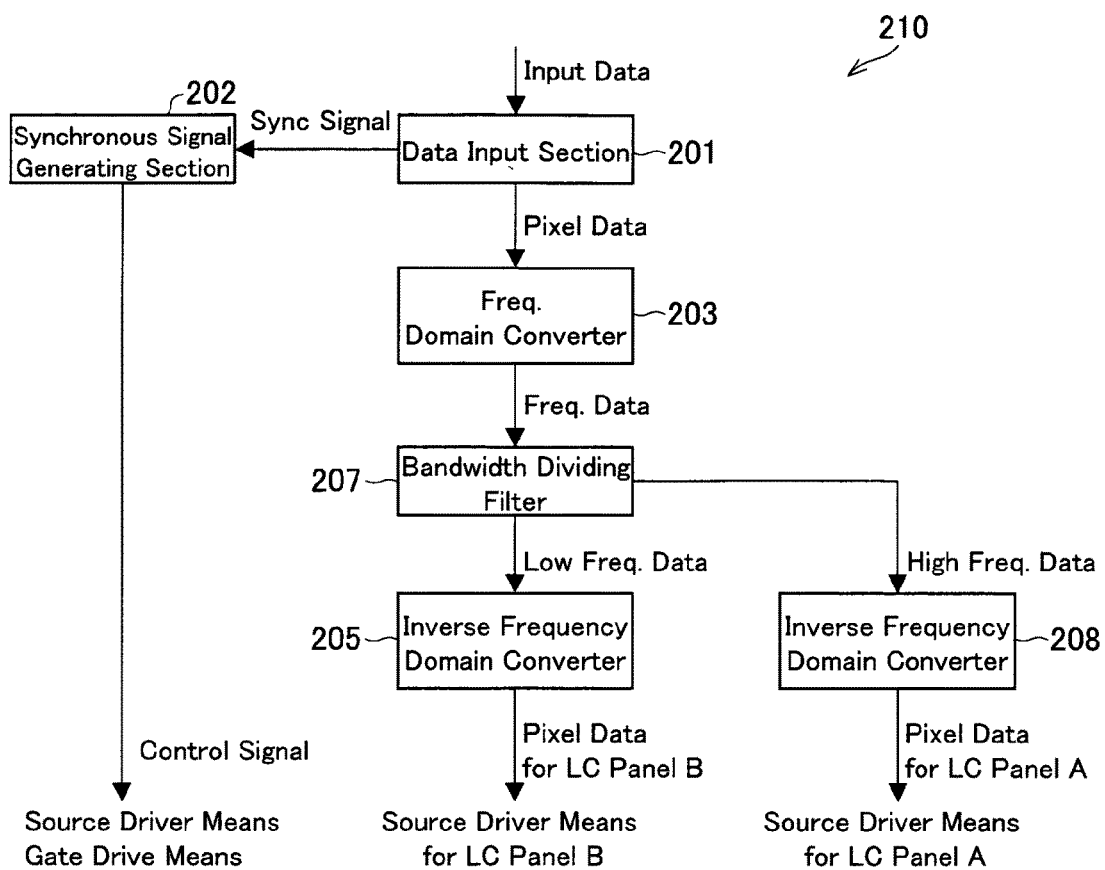
FIG. 45 is a block diagram of a display controller which implements the moire prevention measure shown in FIG. 44.

The following will describe another embodiment of the present invention in reference to FIGS. 44 and 45. The first panel is liquid crystal panel A, and the second panel is liquid crystal panel B.

Two liquid crystal panels are stacked on top of one another for use as shown in FIG. 44(a).

The present embodiment assumes that the liquid crystal panels have the same resolution as shown in FIG. 44(b). If images are displayed from the same display data on liquid crystal panels A, B, interference may occur between the images, and moire patterns may occur as a result.

Accordingly, the spatial frequencies of the display data for liquid crystal panels A and B are changed as shown in FIG. 44(c) so as to eliminate interference between liquid crystal panels A and B. That reduces moire patterns.

Different spatial frequencies are given as shown in FIG. 44(c) through the following control.
(1) Convert input data to spectral data through DCT, FFT, etc.
(2) Divide into high frequency components and low frequency components using dividing filters.
(3) Convert the high frequency components back to original spatial data through inverse DCT, inverse FFT, etc. for a display on liquid crystal panel A.
(4) Convert the low frequency components back to original spatial data through inverse DCT, inverse FFT, etc. for a display on liquid crystal panel B.

From these procedures, the display on liquid crystal panel A is determined from the difference between display data and the display on liquid crystal panel B.

The description above is based on one dimensional data. The display on the liquid crystal panel is two dimensional, and the actual display is produced from two-dimensional data.

Specific control is implemented by a display controller 210 containing, for example, a data input section 201, a synchronous signal generating section 202, a frequency domain converter 203, a bandwidth dividing filter 207, an inverse frequency domain converter 205, and an inverse frequency domain converter 208 as shown in FIG. 45.

The data input section 201 separates input data to a synchronous signal and pixel data for individual pixels. The section 201 is arranged to supply the synchronous signal to the succeeding stage, or the synchronous signal generating section 202 and supply the pixel data to the succeeding stage, or the frequency domain converter 203.

The synchronous signal generating section 202 generates, from the synchronous signal from the data input section 201, control signals by which source drive means and gate drive means are controlled.

For example, the following three control signals are generated to control the source drive means.

(1) source start pulse
(2) source latch pulse
(3) source clock

The following two control signals are generated to control the gate drive means.

(1) gate start pulse
(2) gate shift clock

The frequency domain converter 203 is arranged to convert the pixel data from the data input section 201 to spatial frequency domain and supply the spatial frequency domain data to the succeeding stage, or the bandwidth dividing filter 207. The frequency domain conversion is typically done by two-dimensional FFT conversion, two-dimensional DCT conversion, etc.

The bandwidth dividing filter 207 is arranged to divide data into high frequency components and low frequency components, supplying low frequency data to the inverse frequency domain converter 205 connected to the source drive means for liquid crystal panel B and the high frequency data to the inverse frequency domain converter 208 connected to the source drive means for liquid crystal panel A.

If the frequency data is simply divided into two sets of components, a lowpass filter and a highpass filter may be used.

The bandwidth dividing filter, as opposed to lowpass and highpass filters, is capable of dividing data into a plurality of frequency ranges and hence advantageously compatible for each sets of panels.

The inverse frequency domain converter 205 is arranged to inverse convert the low frequency data (opposite to the frequency domain converter 203), supplying the data after the inverse conversion as pixel data for liquid crystal panel B to the source drive means for liquid crystal panel B.

The inverse frequency domain converter 208 is arranged to inverse convert the high frequency data (opposite to the frequency domain converter 203), supplying the data after the inverse conversion as pixel data for liquid crystal panel A to the source drive means for liquid crystal panel A.

The inverse frequency domain converters 205, 208 carry out, as the inverse frequency conversion, inverse two-dimensional FFT conversion, inverse two-dimensional DCT conversion, etc.

Embodiment 9

The present embodiment reduces, by a driving scheme, moire patterns caused by displacement in the viewing angle direction of two liquid crystal display panels stacked on top of one another. Display control means is implemented by the following steps.

(1) Find a maximum value $P_{(i,j)max}$ in gray levels for the RGB pixels in input data.

(2) Next, carrying out smoothing on the pixel maximum values $P_{(i,j)max}$ using a Gaussian filter, moving average, or another smoothing filter to such an extent that results are not less than or equal to the pixel maximum values $P_{(i,j)max}$. In other words, the smoothing is done so that $P'_{(i,j)} \geq P_{(i,j)max}$ where $P'_{(i,j)}$ is a value obtained from the smoothing. Depending on the smoothing process actually used, γ-correction may be carried out. The panel containing no color filter is driven by the signal obtained from the smoothing process above.

Figure 46:
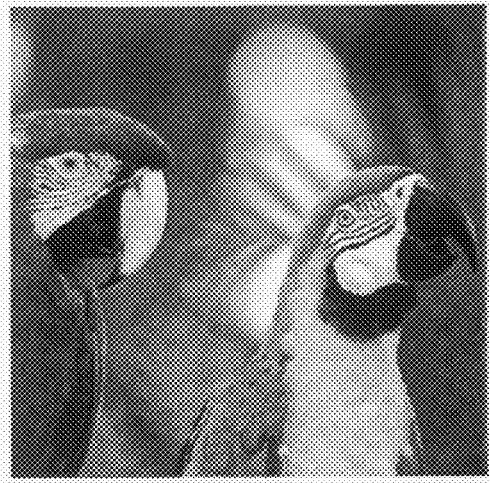
FIG. 46 is an image reproduced from a raw image signal, as an example.
Figure 47:
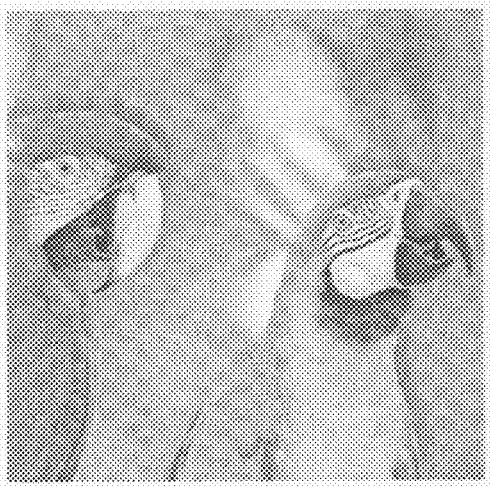
FIG. 47(a) is an image reproduced from the same raw image signal as in FIG. 46, but on a panel with a color filter, as an example.
FIG. 47(b) is an image reproduced from the same raw image signal as in FIG. 46, but on a panel with no color filter, as an example.
Figure 47:
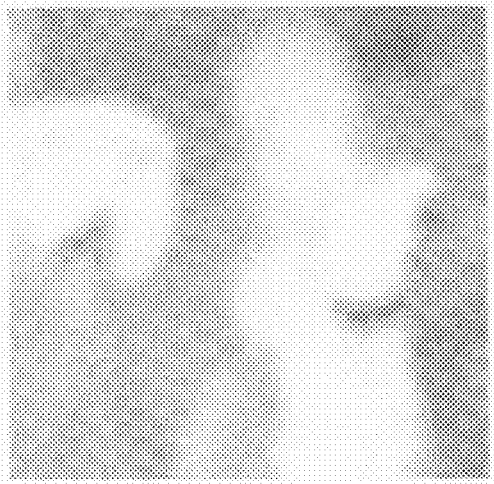

FIG. 47(b) shows an image obtained by smoothing (blurring) the input data shown in FIG. 46 as above. The panel containing a color filter is fed with values obtained by increasing gray levels in the input data by an inverse ratio of gray levels in input data and signal levels $P'_{(i,j)}$ for a dot corresponding panel containing no color filter. FIG. 47(a) shows an image processed as above and displayed on a panel containing a color filter.

The above driving method allows only marginal luminance and chromaticity changes even if chromaticity and luminance of input data are expressed by two panels, the pixels in a panel containing no color filter have small luminance difference from adjacent pixels, and therefore the pixels of the upper and lower panels are displaced depending on viewing angle. The method thus addresses moire pattern occurrences attributable to viewing angles.

Now, signal processing for the panel containing no color filter, that is, the black and white panel will be described in more detail.

Figure 53:
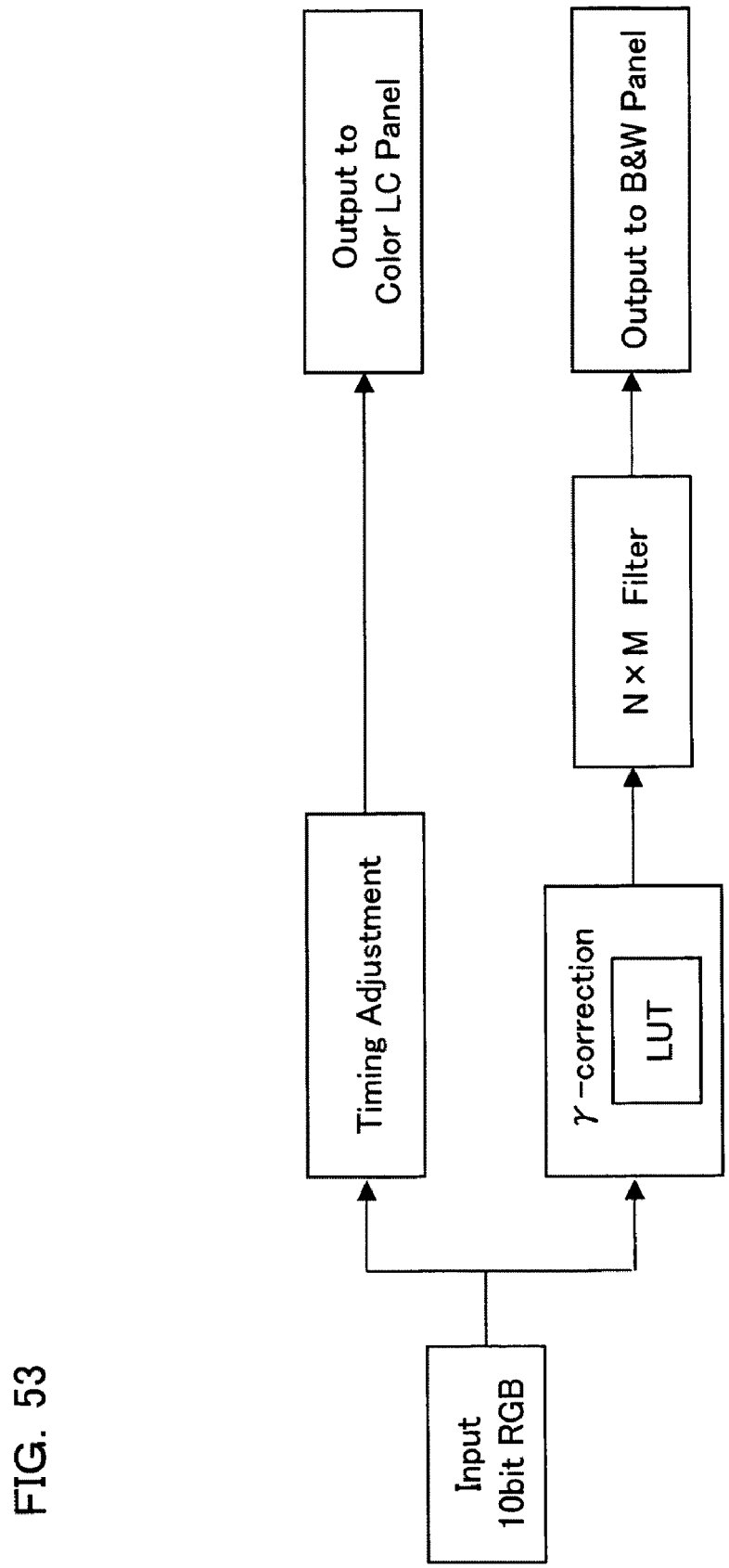
FIG. 53 is a block diagram illustrating signal processing by a liquid crystal panel.
Figure 54:
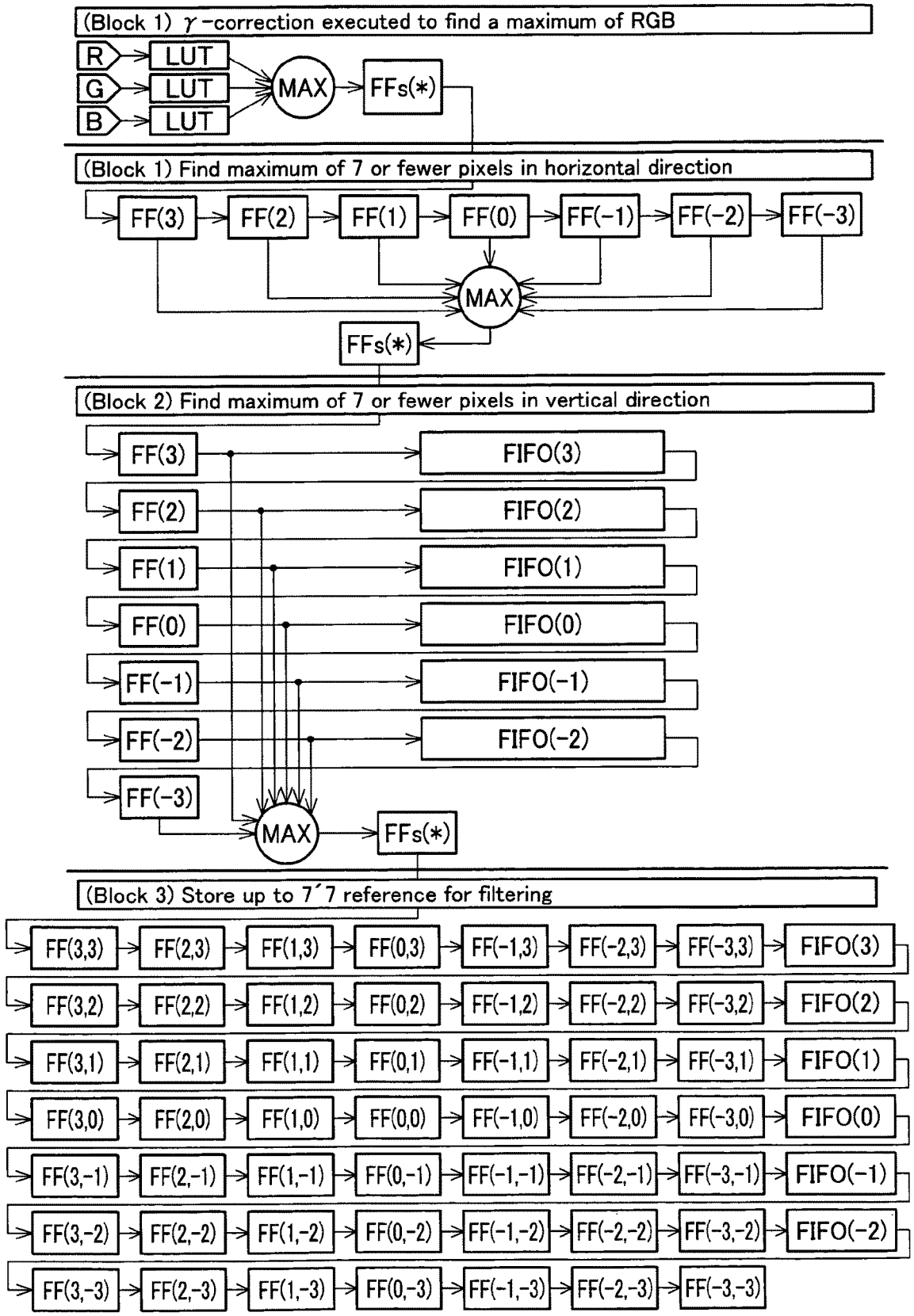
FIG. 54 illustrates a flow of data on a data line in the block diagram shown in FIG. 53.

FIG. 53 is a block diagram for the signal processing. Input signals described by a signal processing system are RGB digital signals. To handle YPbPr TV signals, the signals are converted in advance to RGB signals. FIG. 54 is a flow diagram for data lines. The following description will be given in reference to the flow diagram.

First, input signals are γ-corrected. This is to render γ of output signals equal to the intended γ. The γ-correction is carried out by referring to a LUT. The gray levels given by the LUT need to have at least the same number of bits as the input signal. Typically, 10 bits (1024 gray levels) is needed for HD-SDI TV signals.

Next, a maximum value is found in each RGB set of data.

Next, smoothing is carried out. The size of the smoothing is determined in advance considering parallax D when viewed at an oblique angle.

D parallax is given by the following equations:

$$D \text{ parallax} = D_{gap} \times \tan(\sin^{-1}(1/n) \times \sin(\theta))$$

where θ is an oblique angle, Dgap is the distance between the liquid crystal layer in the color liquid crystal panel and the liquid crystal layer in the black and white liquid crystal panel, and n is the average refractive index of material in the gap. The maximum value of θ is 90°. Practically, θ needs to be no less than 45° to 60°. The actual smoothing distances DN, DM are decided so as to obtain a value close to the D parallax calculated from the equation.

In the present example, Dgap is about 1.8 mm, and the refractive index n of the gap is 1.5. The D parallax is 0.9 mm at a practically necessary angle of 45° and 1.4 mm at 60°. Since the pixel size is about 0.43 mm for a 37-inch full HD (resolution=1920×1080) of the present example, a 7×7 matrix (N=7, M=7) is used from one side 1.4 mm/0.43 mm≈3. Since the refractive index n is never less than 1.3 with current materials, the average $D_{ave}$ of $D_N$ and $D_M$ has a maximum value of 2.2 mm and is preferably less than or equal to this value.

Next, the algorithm by which is determined a value of a given pixel (xn, yn) starts with finding a maximum value in the matrix. In other words, the algorithm finds a maximum value for 7 pixels, xn−3 to xn+3. Then, a maximum is found for 7 pixels, yn−3 to yn+3. The values are registered in 7×7 matrix format, and an average value for those values is designated an ultimate value.

Here, a Gaussian distribution may be created by changing a computation filter table for average values.

That mitigates image displacement caused by dark parts of the black and white panel coming out to bright parts due to parallax.

Another preferred algorithm decides a maximum value $N_{MAX} \times M_{MAX}$ for an N×M matrix in advance, finds, for example, a difference $E_{NM}$ between a maximum gray level and a minimum gray level in a 5×5 matrix ($N_{MAX}=5$, $M_{MAX}=5$), and corrects smoothing size based on $E_{NM}$. In other words, if $E_{NM} \leq 10$, N=1, M=1; if $11 \leq ENM \leq 100$, N=3, M=3; and if $101 \leq E_{NM}$, N=5, M=5. These values are recorded in registers as flags. The maximization and averaging are carried out on each of given pixels (xn, yn) using a N×M matrix. This processing reduces blurring attributable to smoothing.

In the process above, synchronization needs to be made with the color panel. However, signals are delayed by about 2 lines in the signal processing for the 5×5 matrix and by three lines in the signal processing for a 7×7 matrix. Thus, a corresponding delay is desirably introduced on the part of the color panel.

Embodiment 10

The present embodiment will describe use of polarizer performance (polarizing capability) to improve contrast.

The inventors have found from results of experiments that even if the polarizers positioned to form crossed Nicols have the same polarizing capability, the effects of the polarizers on improvement of contrast, that is, the amount of leaking light from the crossed Nicols, are not uniform. Polarizing capability is an indicator for polarizing capability (capability to produce linearly polarized light) and given by the following equation:

$$P \text{ (polarizing capability)} = \{(Tp-Tc)/(Tp+Tc)\}^{1/2} \times 100 \text{ (\%)}$$

where Tp is a parallel transmittance, and Tc is a cross transmittance.

Polarizing capability generally increases with increasing polarizer thickness.

Figure 55:
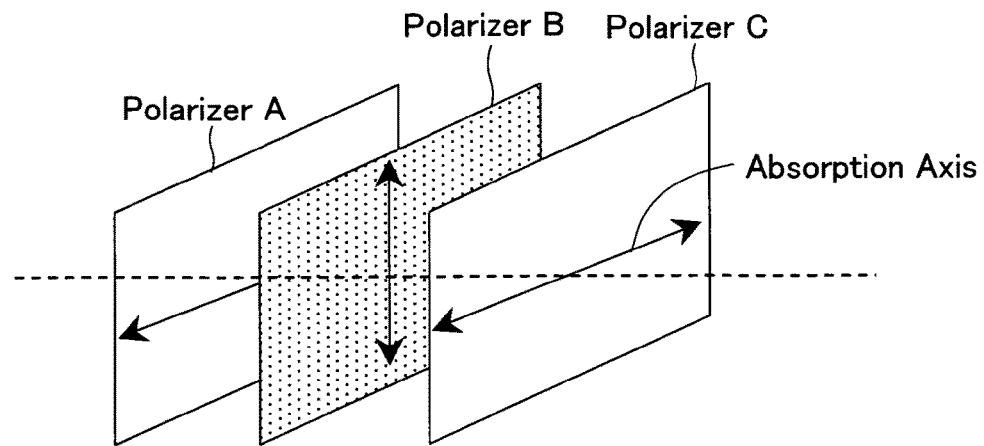
FIG. 55(a) shows an example of the positioning of polarizers, which illustrates polarization enhancement for reduced crossed Nicols leakage.
FIG. 55(b) shows another example of the positioning of polarizers, which illustrates polarization enhancement for reduced crossed Nicols leakage.
Figure 55:
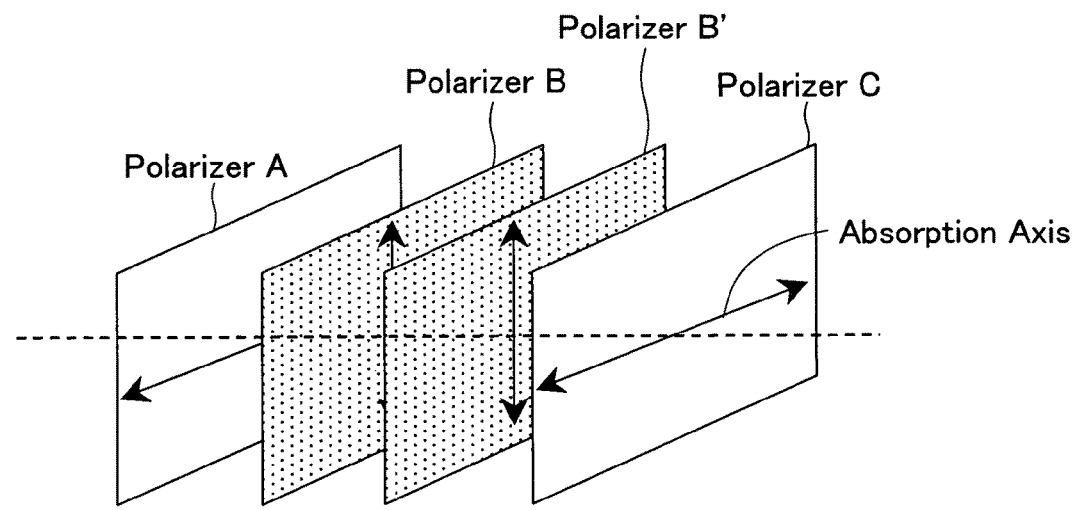
Figure 56:
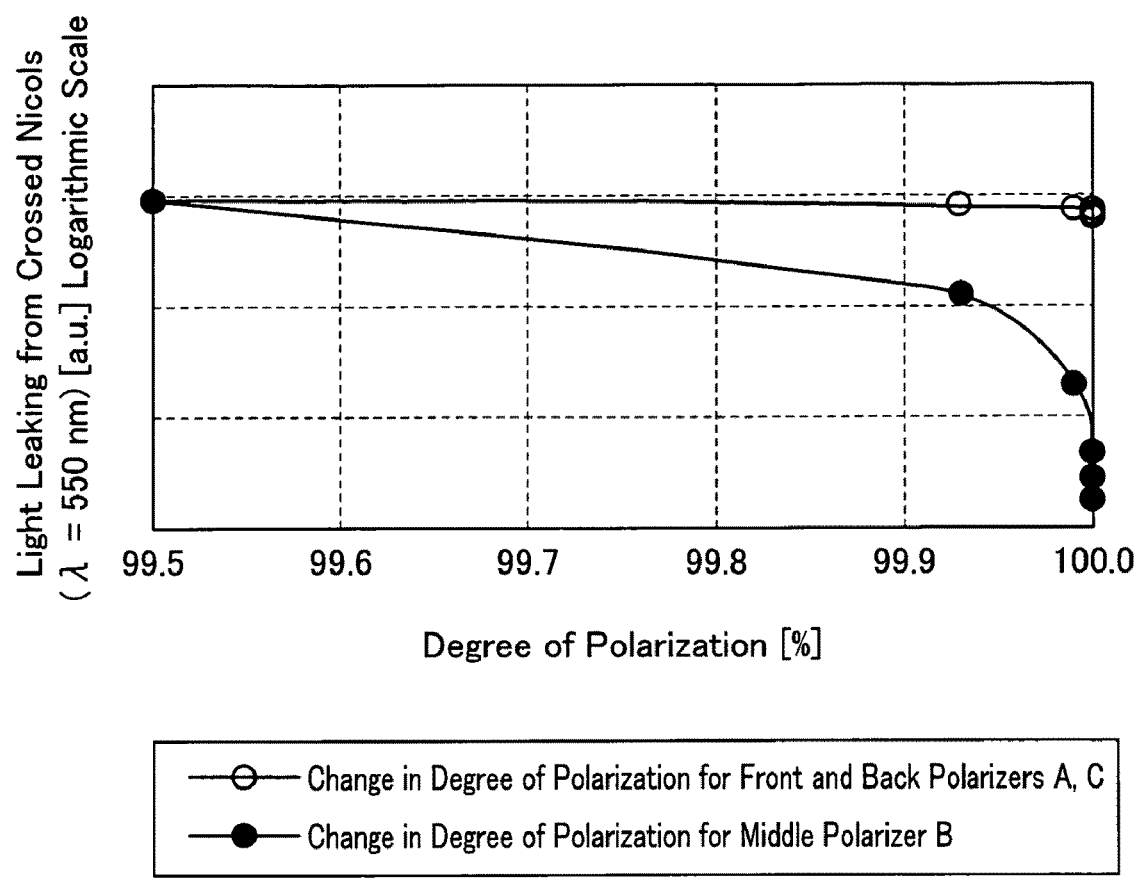
FIG. 56 is a graph representing a relationship between the degree of polarization and crossed Nicols leakage.

For example, three polarizers (polarized light absorbing layers) A, B, C are arranged so that each adjacent pair of polarizers forms crossed Nicols as shown in FIG. 55(*a*). FIG. 56 is a graph representing computed amounts of leaking light for crossed Nicols under the two sets of conditions below.
Set of Conditions 1: The thicknesses of polarizers A, C are changed, whilst the thickness of polarizer B is fixed.
Set of Conditions 2: Only the thickness of polarizer B is changed, whilst the thicknesses of polarizers A, C are fixed.
The graph in FIG. 56 shows the polarizing capability (%) on the horizontal axis and the amount of leaking light for crossed Nicols (crossed Nicols leakage: wavelength=550 nm) on the vertical axis. The graph demonstrates that under set of conditions 1, the crossed Nicols leakage changes little with an increase in the thicknesses of polarizers A, C and also that under set of conditions 2, the crossed Nicols leakage decreases with an increase in the thickness of polarizer B. It would be appreciated that the crossed Nicols leakage depends largely on the thickness of polarizer B which is positioned in the middle.

Therefore, when three polarizers (polarized light absorbing layers) A, B, C are arranged as shown in FIG. 55(*a*), the polarizing capability is increased by increasing the thickness of polarizer B located in the middle, which in turn lowers crossed Nicols leakage and enables the reproduction of deep blacks. As a result, contrast is further improved.

There is a tradeoff between polarizing capability and transmittance of a polarizer. An excessively high polarizing capability leads to decreases in transmittance. Striking a good balance between polarizing capability and transmittance enables improvements in contrast with decreases in transmittance being restrained to a minimum.

Polarizing capability is improved by increasing the thickness of a polarizer. This is by no means limiting. Alternatively, the middle polarizer may be replaced with a double polarizer structure (polarizers B, B') as shown in FIG. 55(*b*) without significantly affecting effects. In the structure, the two middle polarizers are positioned so that their absorption axes are parallel. Two or more polarizers may be substituted for the middle polarizer provided that their absorption axes are parallel.

Generally, a polarizer is made of a polarizer to which iodine is adsorbed. If iodine adsorption is not uniform, the polarizer may cause irregular color density in black display (hereinafter, "irregular polarizer coloring").

Increasing the polarizing capability of a polarizer as mentioned earlier is one method for lowering irregular polarizer coloring. Table 2 shows relationships between irregular polarizer coloring, relative polarization performance, and contrast in the polarizer structure shown in FIGS. 55(*a*), (*b*).

TABLE 2

| Relative polarization performance | Degree of polarization (%) | | Contrast | Irregular coloring |
|---|---|---|---|---|
| A = B = C | A | 99.993 | 20,000:1 | Poor: Noticeable |
|  | B | 99.993 |  |  |
|  | C | 99.993 |  |  |
| A = B < C | A | 99.993 | 40,000:1 | Fair: Slightly noticeable |
|  | B | 99.997 |  |  |
|  | C | 99.993 |  |  |
| A = C < B + B' (double layer) | A | 99.993 | 200,000:1 | Very good: Unnoticeable |
|  | B | 99.997 |  |  |
|  | B' | 99.993 |  |  |
|  | C | 99.993 |  |  |

Table 2 demonstrates that when all polarizers A, B, C had the same polarization performance (polarizing capability) of 99.993%, the contrast was 20,000:1. Irregular polarizer coloring was clearly observed.

Accordingly, the polarizing capability of polarizer B located in the middle was set to 99.997%, and those of remaining polarizers A, C to 99.993% as shown in FIG. 55(*a*). The resultant contrast was 40,000:1. This represents an improvement over the polarizers sharing the polarizing capability; however, a low degree of irregular polarizer coloring was observed.

A double polarizer structure (polarizers B, B') was substituted for the middle polarizer as shown in FIG. 55(*b*). The polarizing capability of polarizer B was set to 99.997%, and those of remaining polarizers A, B', C to 99.993%. The resultant contrast was 200,000:1. This represents a great improvement in contrast; no irregular polarizer coloring was observed at all.

As described in the foregoing, a double middle polarizer structure enables improvement in contrast and elimination of irregular polarizer coloring, which contributes to display quality improvement.

Therefore, in a liquid crystal display containing: two or more liquid crystal panels stacked, a light diffusion layer having light diffusing properties provided on at least one of the liquid crystal panels, and polarized light absorbing layers positioned to form crossed Nicols sandwiching the liquid crystal panels, contrast is further improved by incorporating the following structure.

Of polarizers A, B, C (polarized light absorbing layers) positioned to form crossed Nicols, crossed Nicols leakage is lowered by setting the polarizing capability of internal polarizer B than the polarizing capability of external polarizers A, C to at least a predetermined value or greater. In this case, the predetermined value is preferably as close to 100% as possible and determined in relation with transmittance.

The polarizing capability of polarizer B is preferably set to a value higher than the polarizing capability of other polarizers A, C.

The polarizing capability may be improved by increasing the thickness of polarizer B. In that case, polarizer B is preferably thicker than other polarizers A, C.

Alternatively, the polarizing capability may be improved by using two polarizers B, B'. In that case, polarizers B, B' may have the same polarizing capability or different polarizing capabilities. Polarizers B, B' may have the same polarizing capability as other polarizers A, C. The two middle polarizers may be replaced with three or more polarizers. The number of polarizers stacked may be suitably determined in connection with transmittance.

Embodiment 11

Figure 48:
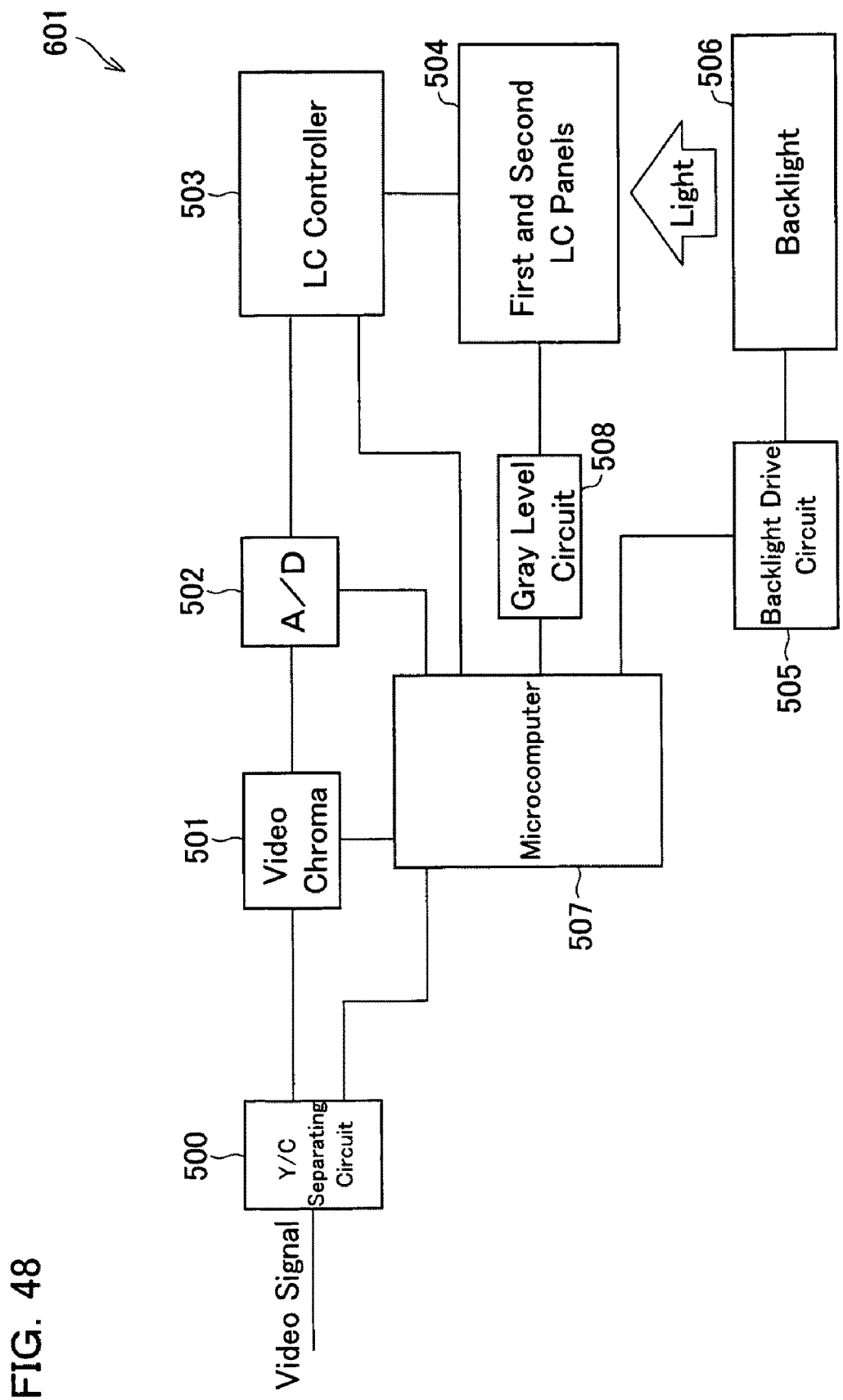
FIG. 48 is a schematic block diagram of a television receiver incorporating the liquid crystal display of the present invention.
Figure 49:
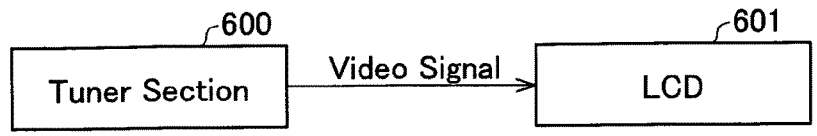
FIG. 49 is a block diagram illustrating a relationship between a tuner section and a liquid crystal display in the television receiver shown in FIG. 48.
Figure 50:
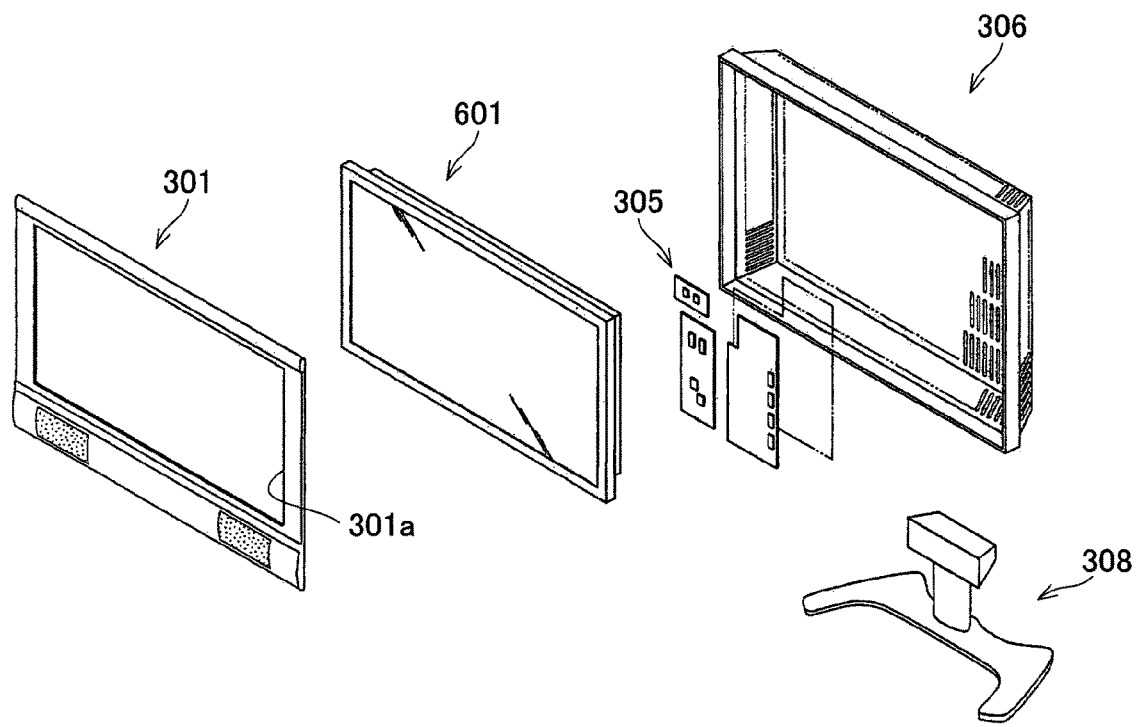
FIG. 50 is an exploded perspective view of the television receiver shown in FIG. 48.

Referring to FIGS. 48 to 50, the following will describe the television receiver to which the liquid crystal display of the present invention is applied.

FIG. 48 shows circuit blocks of a liquid crystal display 601 for the television receiver.

The liquid crystal display 601 includes, as shown in FIG. 48, a Y/C separating circuit 500, a video chroma circuit 501, an A/D converter 502, a liquid crystal controller 503, liquid crystal panels 504, a backlight drive circuit 505, a backlight 506, a microcomputer 507, and a gray level circuit 508.

The liquid crystal panels 504 has a double panel structure including a first liquid crystal panel and a second liquid crystal panel. The panels may be of any of the structures described in the foregoing embodiments.

In the liquid crystal display 601 arranged as above, first, an input video signal (television signal) is supplied to the Y/C separating circuit 500 where the signal is separated into a luminance signal and a color signal. The luminance and color signals are converted to R, G, B, or the three primary colors of light, in the video chroma circuit 501. Furthermore, the analog RGB signals are converted digital RGB signals by the A/D converter 502 for output to the liquid crystal controller 503.

The liquid crystal panels 504 is fed with the RGB signals from the liquid crystal controller 503 at predetermined timings and also with RGB gray level voltages from the gray level circuit 508. From these signals, the panels 504 outputs images. The control of the whole system, including the foregoing processes, is performed by the microcomputer 507.

Various video signals may be used, including a video signal based on television broadcast, a video signal representing images captured on a camera, or a video signal fed over the Internet.

Furthermore, in FIG. 49, a tuner section 600 receives television broadcast and outputs a video signal. A liquid crystal display 601 displays images (video) based on the video signal supplied from the tuner section 600.

If the liquid crystal display arranged as above is a television receiver, for example, the display is structured so that the liquid crystal display 601 is sandwiched by and enclosed in a first housing 301 and a second housing 306 as shown in FIG. 50.

An opening 301a is formed through the first housing 301. The video display produced on the liquid crystal display 601 is visible through the opening 301a.

The second housing 306 provides a cover for the back of the liquid crystal display 601. The housing 306 is provided with an operation circuit 305 for operation of the liquid crystal display 601. The housing 306 has a support member 308 attached to its bottom.

Applying, as described in the foregoing, the liquid crystal display of the present invention to a monitor for the television receiver arranged as above enables the output of high contrast, super high quality video free from moire patterns.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The liquid crystal display of the present invention delivers greatly improved contrast and is therefore suitably applicable, for example, to television receivers and broadcast monitors.

The invention claimed is:

1. A liquid crystal display, comprising two or more liquid crystal panels being stacked, at least one of the panels including a light diffusion layer having a light diffusing property, and further comprising: a vertical alignment liquid crystal layer;

a first substrate and a second substrate facing each other across the liquid crystal layer;

a first electrode provided on a side, of the first substrate, which faces the liquid crystal layer and a second electrode provided on a side, of the second substrate, which faces the liquid crystal layer; and at least one alignment film provided to contact the liquid crystal layer, wherein:

pixel regions are each divided into a first, a second, a third, and a fourth liquid crystal domain, liquid crystal molecules in the liquid crystal layer near a center with respect to a layer plane and a thickness direction exhibiting a tilt direction parallel to a predetermined, first direction in the first liquid crystal domain, a predetermined, second direction in the second liquid crystal domain, a predetermined, third direction in the third liquid crystal domain, and a predetermined, fourth direction in the fourth liquid crystal domain when a voltage is applied across the first and second electrodes;

a difference between any given pair of the first, second, third, and fourth directions is substantially equal to an integral multiple of 90°; and the first, second, third, and fourth liquid crystal domains are adjacent to other liquid crystal domains and are arranged in a 2×2 matrix.

2. The liquid crystal display of claim 1, wherein there are provided polarized light absorbing layers sandwiching the liquid crystal panels so as to form crossed Nicols.

3. The liquid crystal display of claim 1, wherein the liquid crystal panels each produce a display according to a display signal.

4. The liquid crystal display of claim 1, wherein the light diffusion layer is provided on a display plane side of the stacked liquid crystal panels.

5. The liquid crystal display of claim 4, wherein the light diffusion layer provided on the display plane side has a haze value of 56% or greater.

6. The liquid crystal display of claim 4, wherein the light diffusion layer provided on the display plane side has a haze value of 50% or greater.

7. The liquid crystal display of claim 4, wherein the light diffusion layer provided on the display plane side has a haze value of 56% or greater.

8. The liquid crystal display of claim 4, wherein the light diffusion layer provided on the display plane side has a haze value of 72% or greater.

9. The liquid crystal display of claim 1, wherein the light diffusion layer is provided between the stacked liquid crystal panels.

10. The liquid crystal display of claim 9, wherein the light diffusion layer provided between the stacked liquid crystal panels has a haze value of 42% or greater.

11. The liquid crystal display of claim 9, wherein the light diffusion layer provided between the stacked liquid crystal panels has a haze value of 56% or greater.

12. The liquid crystal display of claim 1, wherein at least two of the panels each include a light diffusion layer having a light diffusing property, one of the light diffusion layers being provided on a display plane side of the stacked liquid crystal panels, and another one of the light diffusion layers being provided between the stacked liquid crystal panels.

13. The liquid crystal display of claim 12, wherein the light diffusion layer provided on the display plane side of the stacked liquid crystal panels and the light diffusion layer provided between the stacked liquid crystal panels each have a haze value of 36% or greater.

14. The liquid crystal display of claim 12, wherein the light diffusion layer provided on the display plane side of the stacked liquid crystal panels and the light diffusion layer provided between the stacked liquid crystal panels each have a haze value of 50% or greater.

15. The liquid crystal display of claim 12, wherein the light diffusion layer provided on the display plane side of the stacked liquid crystal panels and the light diffusion layer provided between the stacked liquid crystal panels each have a haze value of 56% or greater.

16. The liquid crystal display of claim 9, wherein the light diffusion layer provided between the stacked liquid crystal panels has a haze value less than 80%.

17. The liquid crystal display of claim 4, wherein there are provided at least two polarized light absorbing layers between the stacked liquid crystal panels, and there is provided a light diffusion layer between the at least two polarized light absorbing layers.

18. The liquid crystal display of claim 1, wherein the light diffusion layer(s) contain(s) particles being dispersed therein, the particles having a different refractive index from a base material.

19. The liquid crystal display of claim 18, wherein the particles have an average particle diameter of 370 nm or longer.

20. The liquid crystal display of claim 18, wherein the particles have an average particle diameter of 520 nm or longer.

21. The liquid crystal display of claim 18, wherein the particles have an average particle diameter of 3.7 µm or longer.

22. The liquid crystal display of claim 1, wherein at least one of substrates constituting the stacked liquid crystal panels, the particular substrate facing an adjacent panel, is thinner than the substrates which do not face the adjacent panel.

23. The liquid crystal display of claim 1, wherein adjacent liquid crystal panels have dots constituted by like elements, the elements in one of the adjacent panels being formed symmetrical to the elements in the other panel.

24. The liquid crystal display of claim 1, wherein only one of the liquid crystal panels includes a color filter.

25. The liquid crystal display of claim 1, further comprising display control means for blurring so that one of the stacked liquid crystal panels displays a blurred image when compared to an image displayed on another liquid crystal panel.

26. The liquid crystal display of claim 1, wherein at least one of the stacked liquid crystal panels has an island-shaped black matrix formed therein.

27. The liquid crystal display of claim 2, wherein the polarized light absorbing layer(s) located internal to an outermost pair of polarized light absorbing layers which forms crossed Nicols has/have a polarizing capability higher than or equal to a predetermined value.

28. The liquid crystal display of claim 27, wherein the polarized light absorbing layer(s) located internal to an outermost pair of polarized light absorbing layers which forms crossed Nicols has/have a higher polarizing capability than the outermost polarized light absorbing layer.

29. The liquid crystal display of claim 28, wherein the polarized light absorbing layer(s) located internal to an outermost pair of polarized light absorbing layers is thicker than the outermost polarized light absorbing layer.

30. The liquid crystal display of claim 28, wherein the polarized light absorbing layer(s) located internal to an outermost pair of polarized light absorbing layers contains a plurality of polarized light absorbing plates being stacked, each plate having the same polarizing capability as the outermost polarized light absorbing layer.

31. The liquid crystal display of claim 1, wherein the liquid crystal panels each have a vertical alignment liquid crystal layer.

32. The liquid crystal display of claim 1, wherein the liquid crystal panels each have alignment controlling projections and/or electrode openings to regulate alignment direction of liquid crystal.

* * * * *